(12) United States Patent
Kimura et al.

(10) Patent No.: US 11,435,563 B2
(45) Date of Patent: Sep. 6, 2022

(54) ZOOM LENS, IMAGING APPARATUS AND IMAGING SYSTEM HAVING THE SAME

(71) Applicant: CANON KABUSHIKI KAISHA, Tokyo (JP)

(72) Inventors: Kohei Kimura, Saitama (JP); Takahiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 16/778,365

(22) Filed: Jan. 31, 2020

(65) Prior Publication Data

US 2020/0257095 A1 Aug. 13, 2020

(30) Foreign Application Priority Data

Feb. 8, 2019 (JP) .............................. JP2019-021641

(51) Int. Cl.
| | | |
|---|---|---|
| *G02B 15/14* | (2006.01) | |
| *G02B 13/18* | (2006.01) | |
| *G03B 5/04* | (2021.01) | |
| *G02B 27/64* | (2006.01) | |
| *G02B 15/20* | (2006.01) | |

(52) U.S. Cl.
CPC ...... *G02B 15/144113* (2019.08); *G02B 13/18* (2013.01); *G02B 15/1461* (2019.08); *G02B 15/20* (2013.01); *G02B 27/646* (2013.01); *G03B 5/04* (2013.01); *G03B 2205/0015* (2013.01); *G03B 2205/0046* (2013.01)

(58) Field of Classification Search
CPC .... G02B 15/144113; G02B 15/145113; G02B 15/145129; G02B 15/1461; G02B 15/16; G02B 15/20; G02B 27/646; G03B 5/04; G03B 2205/0015; G03B 2205/0046
See application file for complete search history.

(56) References Cited

U.S. PATENT DOCUMENTS

| | | |
|---|---|---|
| 9,036,265 B2 | 5/2015 | Hatada |
| 9,684,155 B2 | 6/2017 | Hatada |
| 10,120,170 B2 | 11/2018 | Hatada |

(Continued)

FOREIGN PATENT DOCUMENTS

| | | |
|---|---|---|
| JP | 2007086402 A | 4/2007 |
| JP | 2012133104 A | 7/2012 |

(Continued)

OTHER PUBLICATIONS

Gross "Handbook of Optical Systems", vol. 3, Wiley, p. 378-379, 2007. (Year: 2007).*

*Primary Examiner* — Marin Pichler
(74) *Attorney, Agent, or Firm* — Carter, DeLuca & Farrell LLP

(57) ABSTRACT

A zoom lens comprising, in order from an object side to an image side, a first lens unit having a positive refractive power, a second lens unit having a negative refractive power, a third lens unit having a positive refractive power, and a fourth lens unit having a positive refractive power an interval between adjacent lens units changing and the first to fourth lens units moving during zooming. An image blur is corrected by moving a sub-unit having a negative refractive power as a whole in the third lens unit orthogonally to an optical axis. A predetermined conditions are satisfied.

20 Claims, 36 Drawing Sheets

(56) References Cited

U.S. PATENT DOCUMENTS

| | | |
|---|---|---|
| 10,215,972 B2 | 2/2019 | Gyoda et al. |
| 10,222,594 B2 | 3/2019 | Kimura |
| 2008/0218861 A1* | 9/2008 | Tanaka ............ G02B 15/144113 359/557 |
| 2010/0321792 A1* | 12/2010 | Yamagami ..... G02B 15/144113 359/687 |
| 2014/0368699 A1* | 12/2014 | Morooka ............. G02B 27/646 348/240.2 |
| 2019/0004295 A1 | 1/2019 | Hatada |
| 2019/0079269 A1 | 3/2019 | Kimura |
| 2020/0132974 A1 | 4/2020 | Kimura et al. |

FOREIGN PATENT DOCUMENTS

| | | |
|---|---|---|
| JP | 2014219480 A | 11/2014 |
| JP | 2015118214 A | 6/2015 |
| JP | 2016038502 A | 3/2016 |
| JP | 2017211496 A | 11/2017 |

* cited by examiner

ZOOM LENS, IMAGING APPARATUS AND IMAGING SYSTEM HAVING THE SAME

BACKGROUND OF THE INVENTION

Field of the Invention

The present invention relates generally to a zoom lens, an imaging apparatus, and an imaging system having the same, and more particularly to those suitable for an imaging optical system for an imaging apparatus such as a digital still camera, a video camera, a monitoring camera, and a broadcast camera.

Description of the Related Art

In recent years, the imaging apparatus has been highly advanced, and the entire apparatus has been downsized. An imaging optical system used in the imaging apparatus is demanded to be a zoom lens having a bright F-number, a short overall lens length, a small lens barrel diameter, and high resolution throughout an entire zoom range. Furthermore, it is demanded to have a mechanism that compensates for the image blur (camera shake) generated when the zoom lens shakes (image stabilizing mechanism).

One known positive lead type lens is the zoom lens having an image stabilizing function that compensates for the image blur by moving a part of a lens unit in the zoom lens substantially perpendicularly to an optical axis (see Japanese Patent Laid-Open Nos. ("JPs") 2015-118214 and 2016-38502). JP 2015-118214 discloses the zoom lens that includes, in order from an object side to an image side, a first lens unit to a fourth lens unit having positive, negative, positive, and positive refractive powers, changes an interval between adjacent lens units, and corrects an image blur at rear part having the negative refractive power in the third lens unit during zooming. JP 2016-38502 discloses the zoom lens that includes, in order from the object side to the image side, a first unit to a sixth lens unit having positive, negative, positive, negative, positive, and positive refractive powers, changes an intervals between adjacent lens units, and corrects an image blur in the fourth lens unit during the zooming.

In order to reduce the overall lens length and the lens barrel diameter, a so-called a mirrorless type imaging optical system has been proposed which has a short backfocus and no mechanical member between a final lens surface to an image plane (see JP 2017-211496). JP 2017-211496 discloses the zoom lens that includes, in order from the object side to the image side, a first lens unit to a fifth lens unit having positive, negative, positive, positive, and positive refractive powers, changes an interval between adjacent lens units, and corrects an image blur at front part having the negative refractive power in the fifth lens unit during the zooming.

An improper selection of the image stabilizing unit will not only increase the aberration variation during the image stabilization, but also remarkably degrade an optical performance due to tilt error of the image stabilizing unit that occurs during lens assembly, and it becomes difficult to obtain a satisfactory optical performance over the entire zoom range.

In order to acquire a compact zoom lens having the predetermined zoom ratio, the small aberration variation during the image stabilization, and the high optical performance over the entire zoom range, it is important to properly set number of lens units, the refractive power of each lens unit, and the like.

SUMMARY OF THE INVENTION

The present invention provides a zoom lens, an imaging apparatus, and an imaging system having the same, each of which can easily obtain a high optical performance over an entire zoom range during an image stabilization while reducing an overall lens length and a lens barrel diameter.

A zoom lens according to one aspect of the present invention includes, in order from an object side to an image side, a first lens unit having a positive refractive power, a second lens unit having a negative refractive power, a third lens unit having a positive refractive power, and a fourth lens unit having a positive refractive power. An interval between adjacent lens units is changed and the first to fourth lens units move during zooming. The third lens unit includes a sub-unit having a negative refractive power as a whole that moves in a direction including a component orthogonally to an optical axis for image blur correcting. The following conditional expressions are satisfied:

$$0.2 < f2^2/(f3 \times f4) < 1.0$$

$$2.0 < \beta 4t/\beta 4w < 10.0$$

where f2 is a focal length of the second lens unit, f3 is a focal length of the third lens unit, f4 is a focal length of the fourth lens unit, and β4w and β4t are lateral magnifications at a wide-angle end and a telephoto end of the fourth lens unit.

An imaging apparatus and an imaging system including above zoom lens also constitute another aspect of the present invention.

Further features of the present invention will become apparent from the following description of exemplary embodiments with reference to the attached drawings.

DESCRIPTION OF THE EMBODIMENTS

Figure 1:
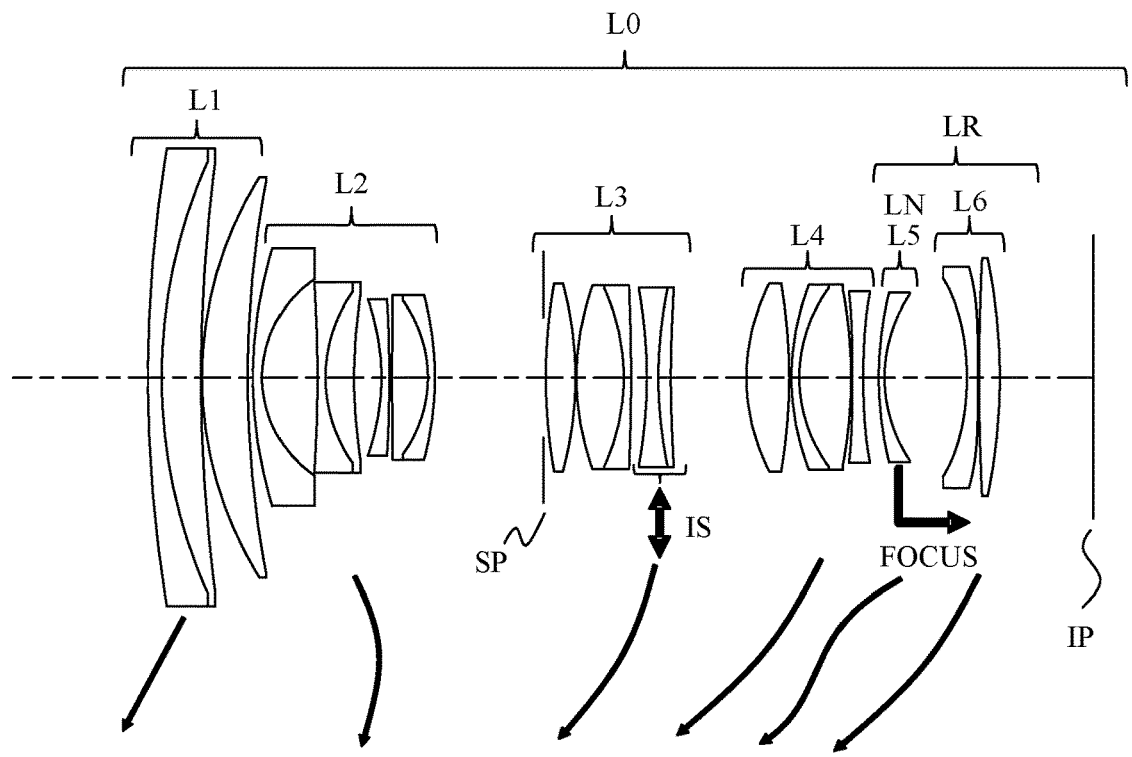
FIG. 1 is a lens sectional view at a wide-angle end of a zoom lens according to Example 1.

Referring now to the accompanying drawings, a description will be given of the embodiments according to the present invention. Corresponding elements in respective figures will be designated by the same reference numerals, and a description thereof will be omitted.

A zoom lens according to the present invention includes, in order from an object side to an image side, a first lens unit having a positive refractive power, a second lens unit having a negative refractive power, a third lens unit having a positive refractive power, and a fourth lens unit having a positive refractive power. During zooming, an interval changes between adjacent lens units and each of the first to fourth lens units moves. A sub-unit having a negative refractive power as a whole in the third lens unit corrects an image blur by moving orthogonally to the optical axis.

Figure 2A:
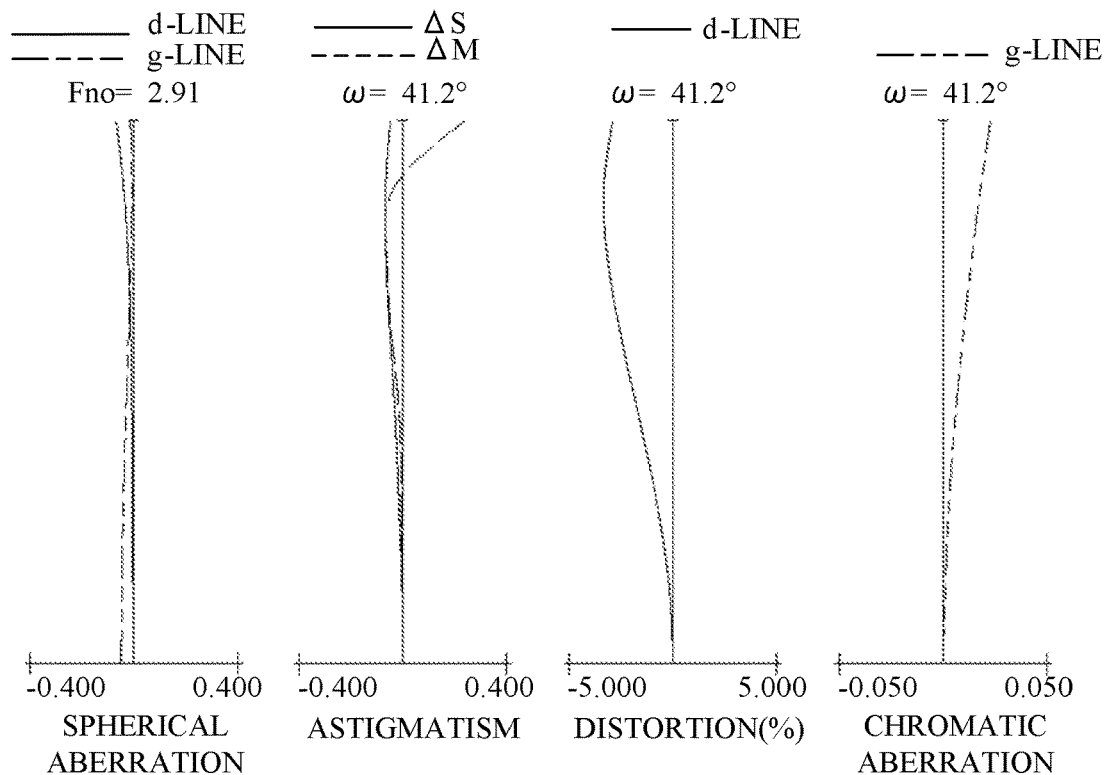
FIGS. 2A to 2C are longitudinal aberration diagrams at the wide-angle end, a middle zoom position, and a telephoto end according to Example 1.
Figure 2B:
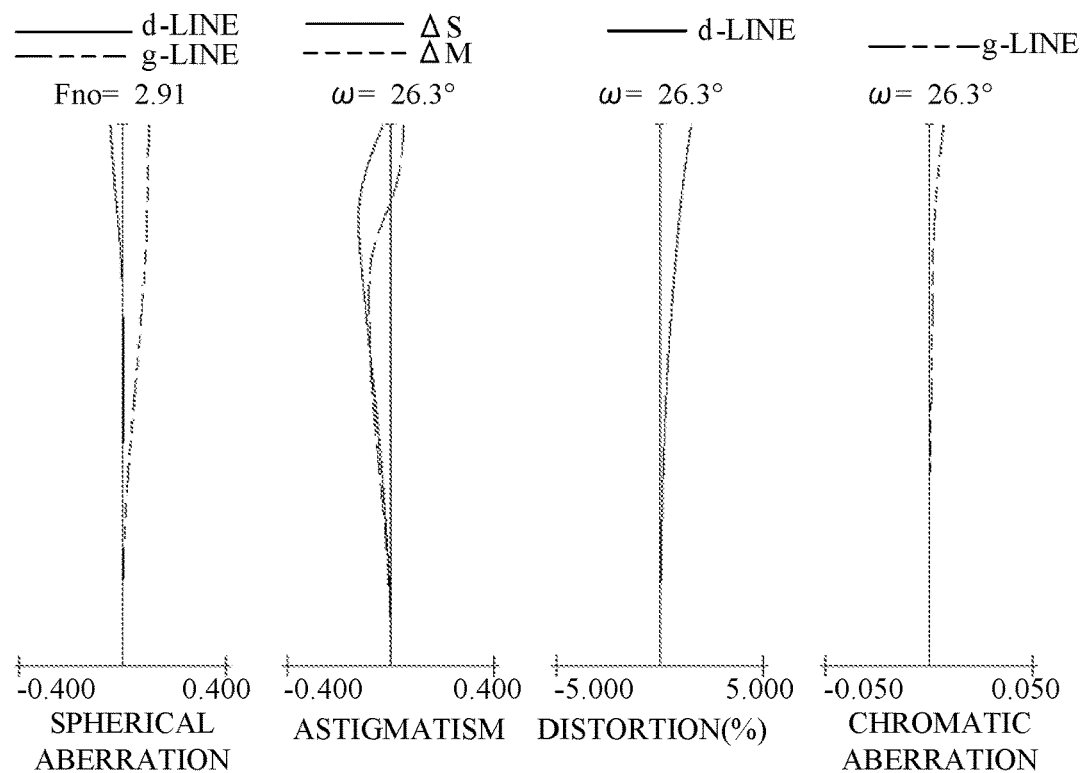
Figure 2C:
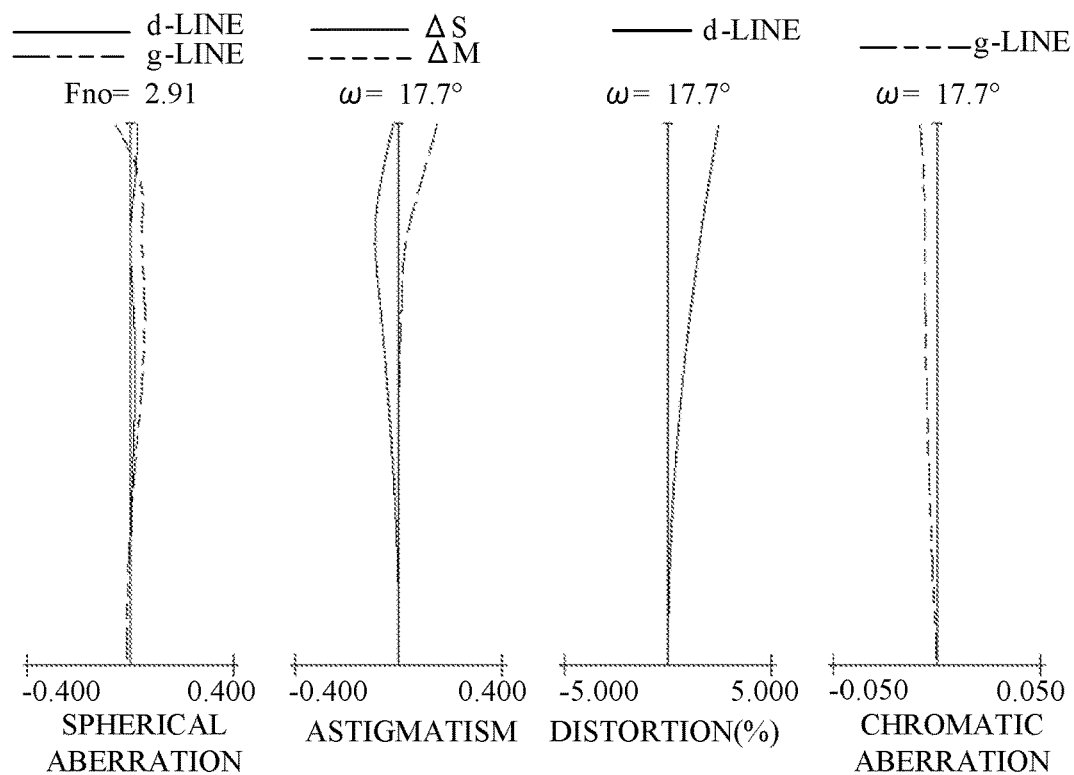
Figure 3A:
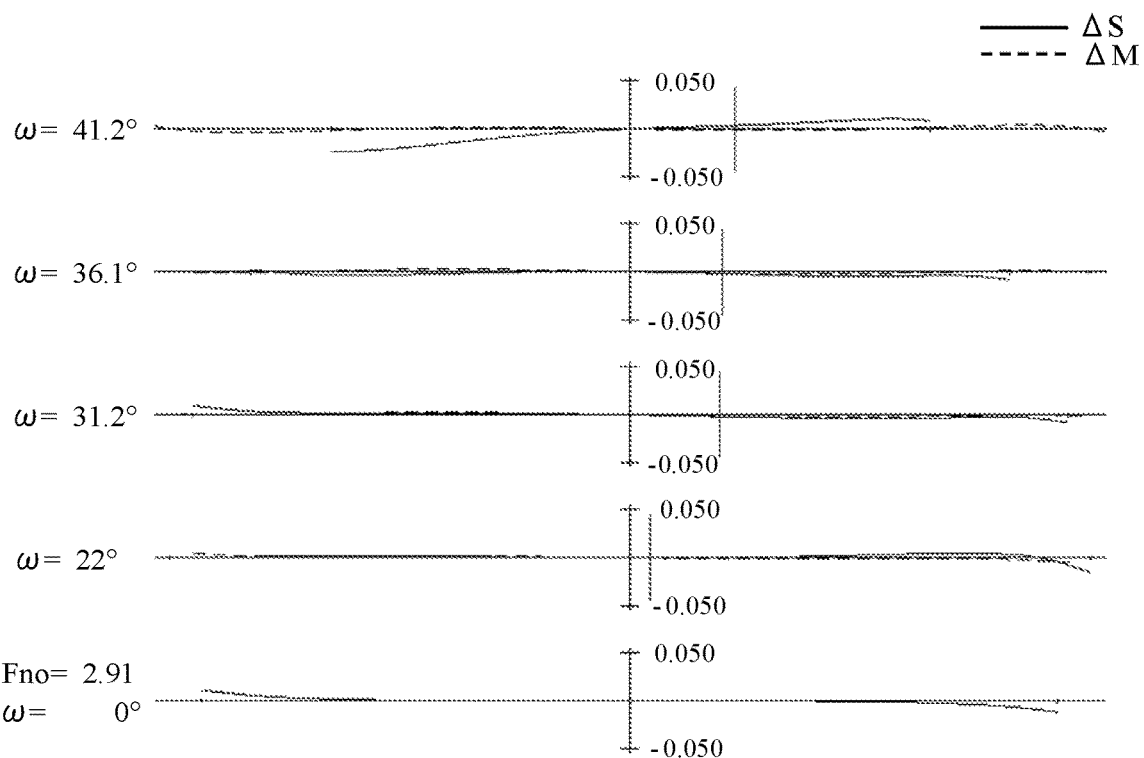
FIGS. 3A to 3C are lateral aberration diagrams at the wide-angle end, the middle zoom position, and the telephoto end according to Example 1.
Figure 3B:
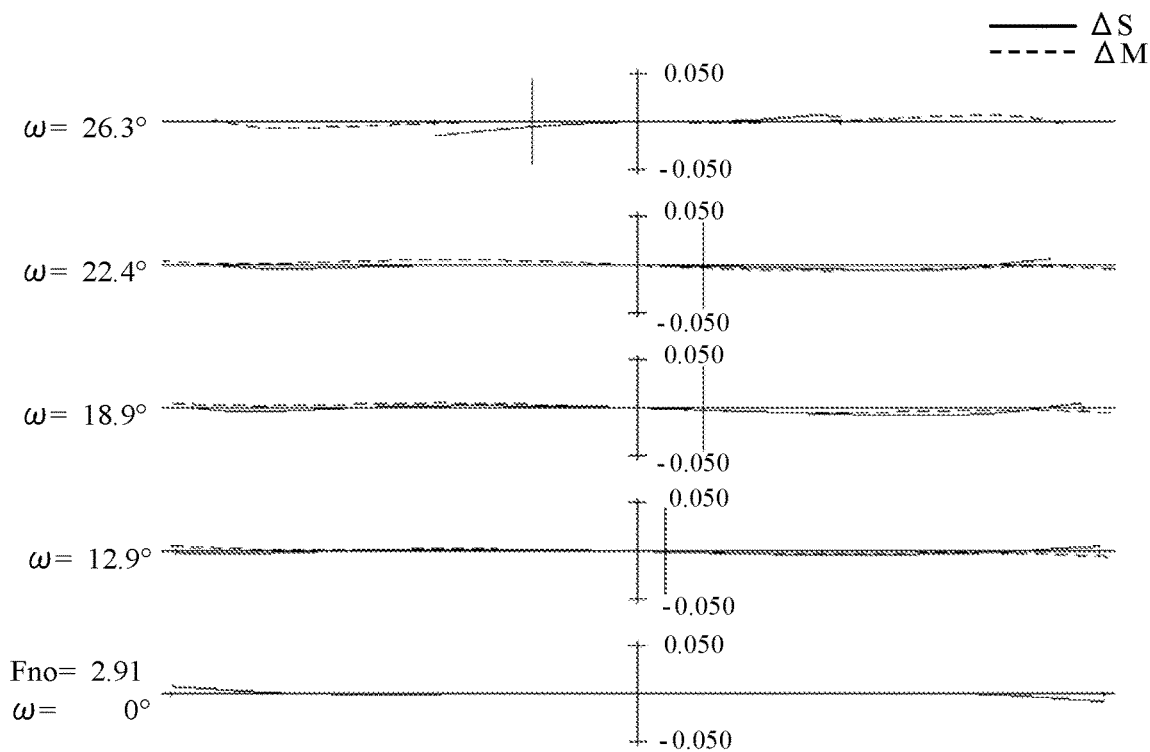
Figure 3C:
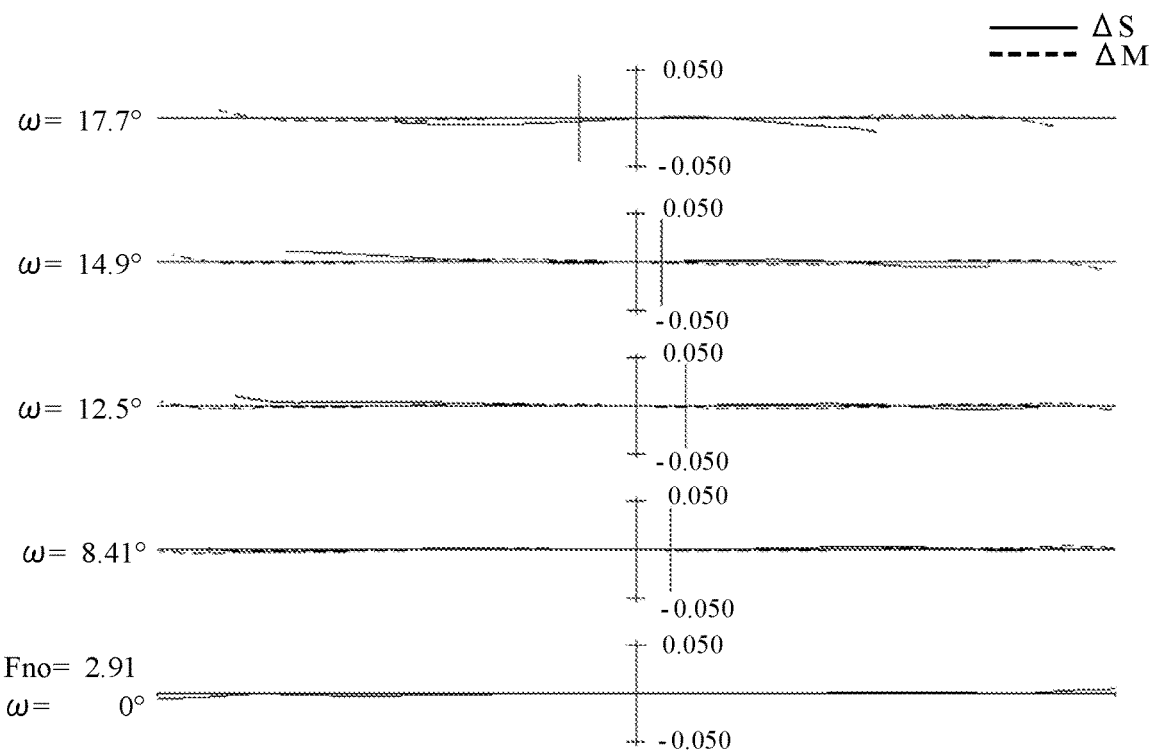
Figure 4A:
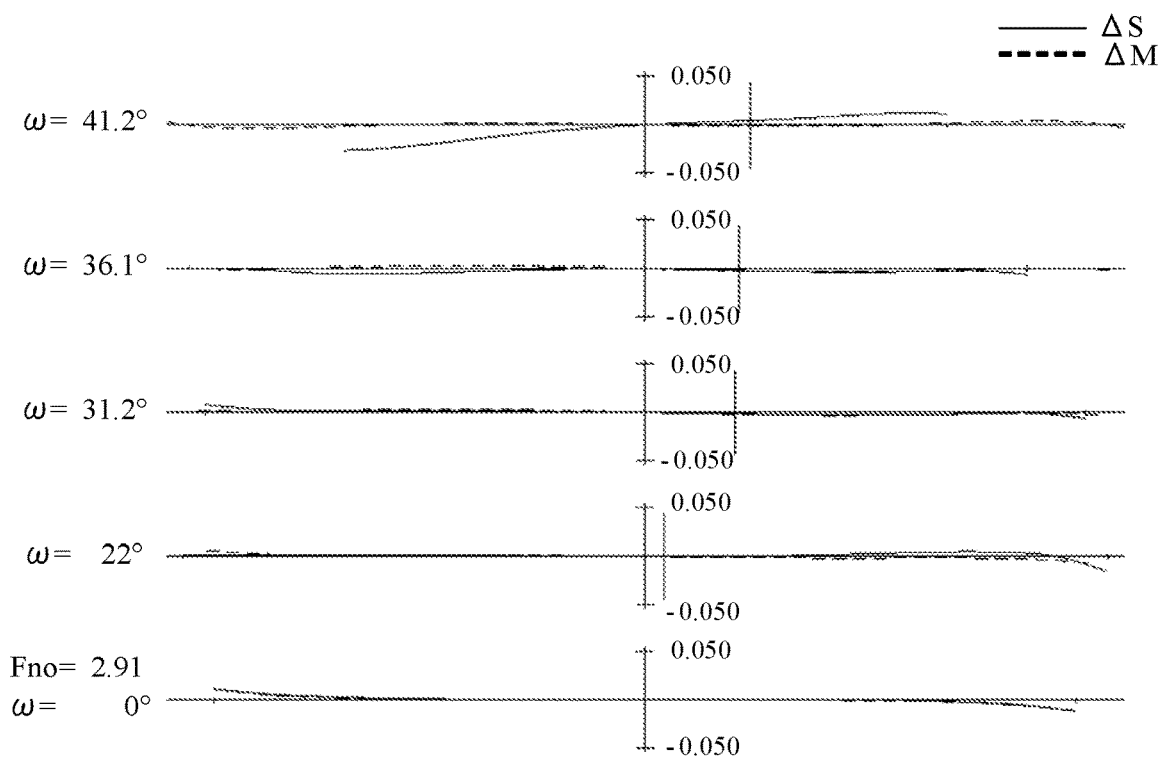
FIGS. 4A to 4C are lateral aberration diagrams at the wide-angle end, the middle zoom position, and the telephoto end during 0.3° image stabilization according to Example 1.
Figure 4B:
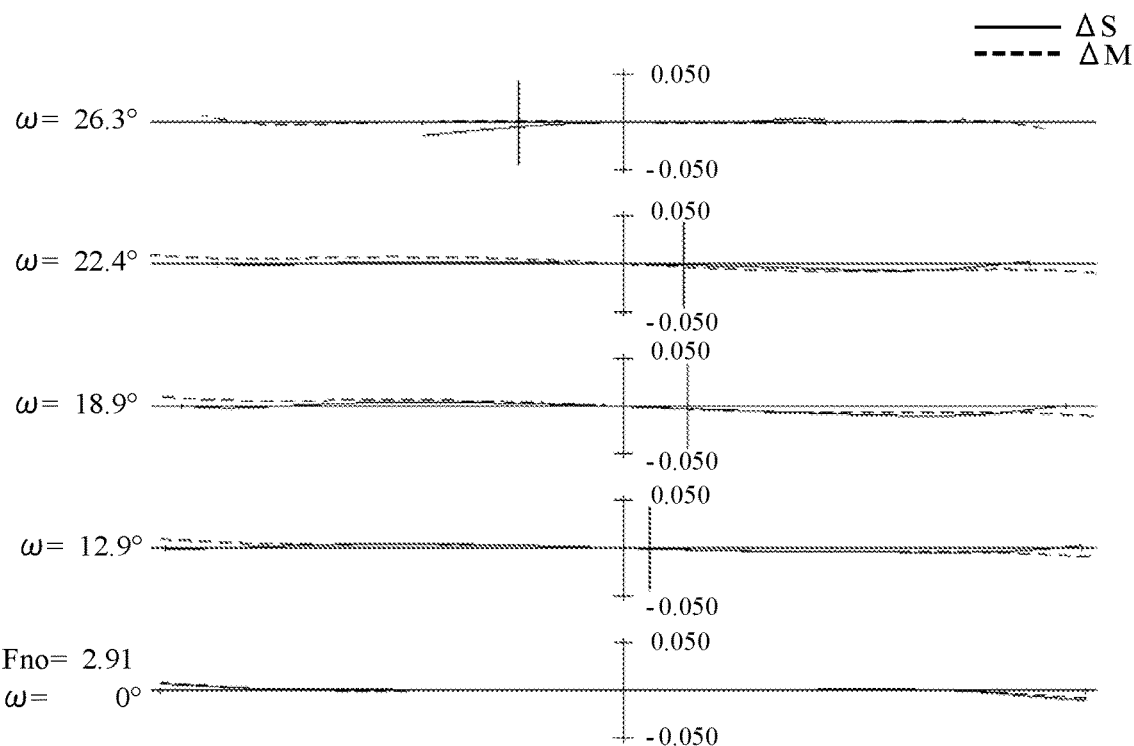
Figure 4C:
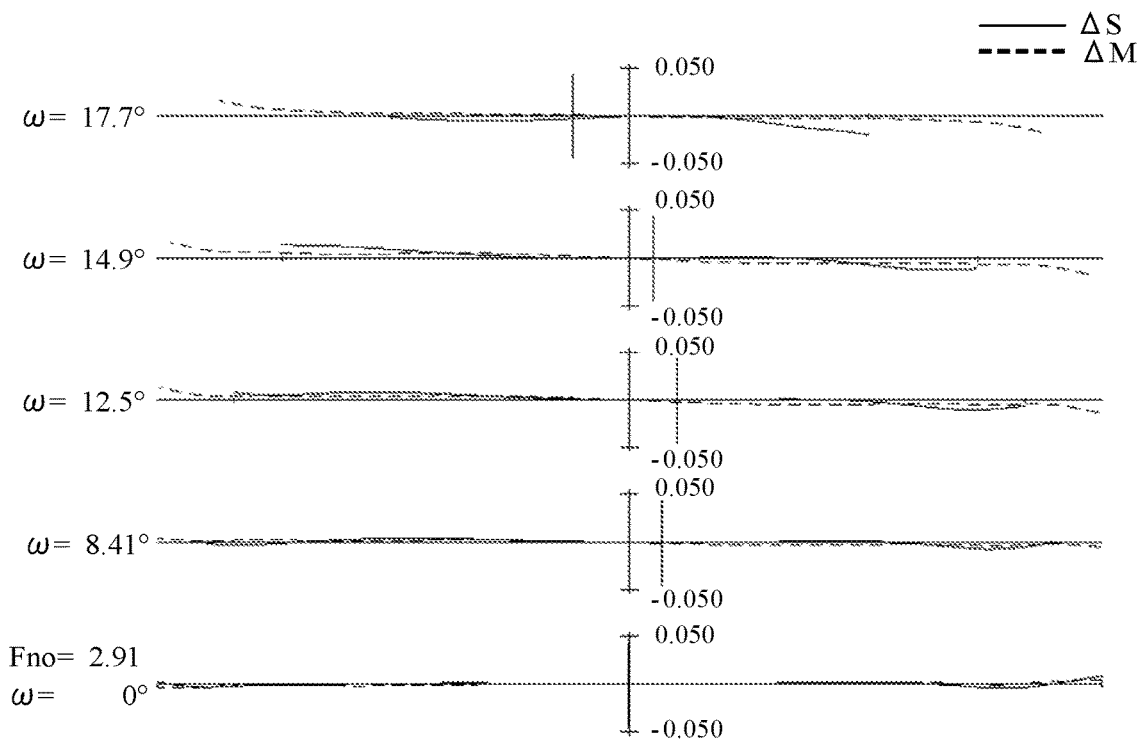

FIG. 1 is the lens sectional view at the wide-angle end (short focal length end) of the zoom lens according to Example 1. FIGS. 2A to 2C are the longitudinal aberration diagrams at the wide-angle end, the middle zoom position, and the telephoto end (long focal length end), respectively, in an in-focus (focused) state on infinity according to Example 1. FIGS. 3A to 3C are the lateral aberration diagrams at the wide-angle end, the middle zoom position, and the telephoto end, respectively, according to Example 1. FIGS. 4A to 4C are the lateral aberration diagrams at the wide-angle end, the middle zoom position, and the telephoto end, respectively, during the 0.3° image stabilization according to Example 1. The zoom lens according to Example 1 is a zoom lens with a zoom ratio of 2.74 and an F-number of 2.91.

Figure 5:
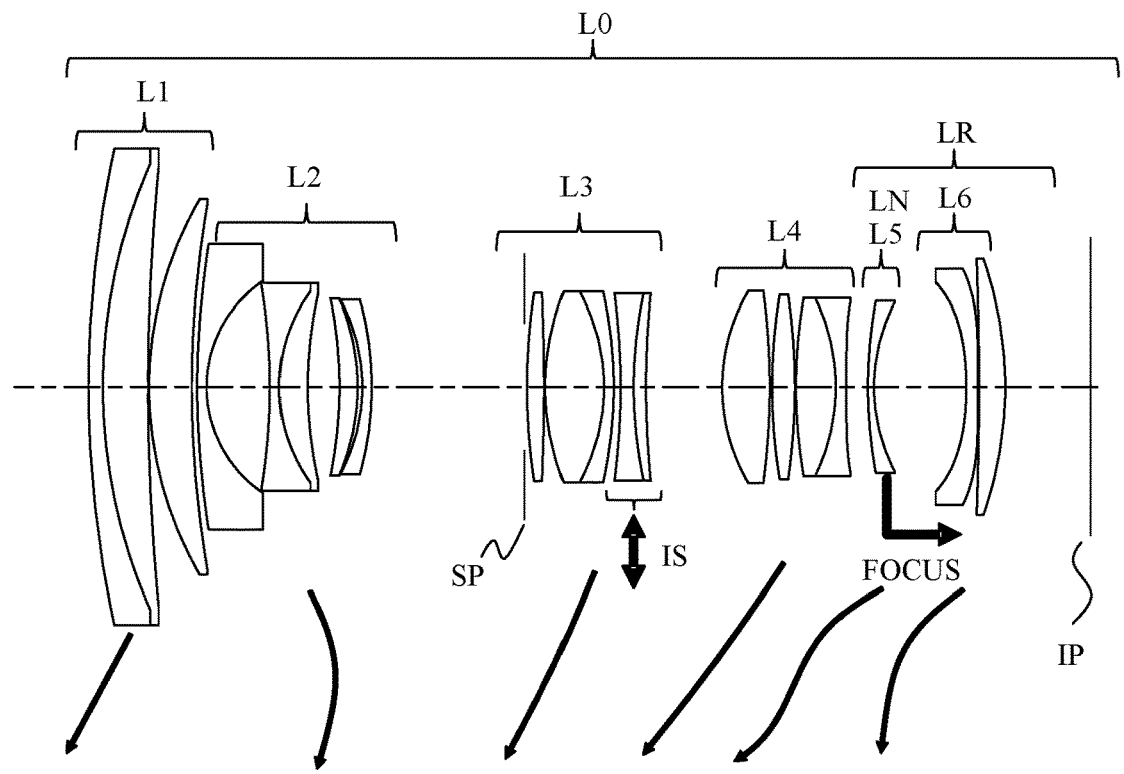
FIG. 5 is a lens sectional view at the wide-angle end of the zoom lens according to Example 2.
Figure 6A:
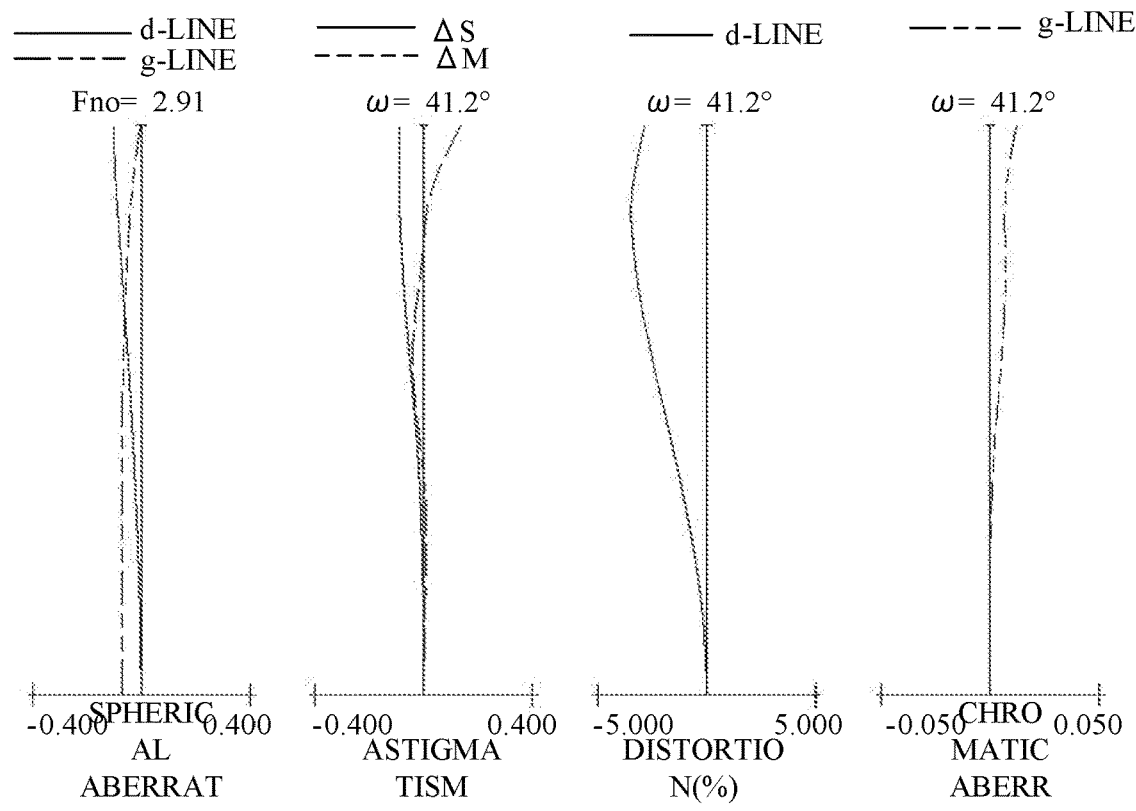
FIGS. 6A to 6C are longitudinal aberration diagrams at the wide-angle end, the middle zoom position, and the telephoto end according to Example 2.
Figure 6B:
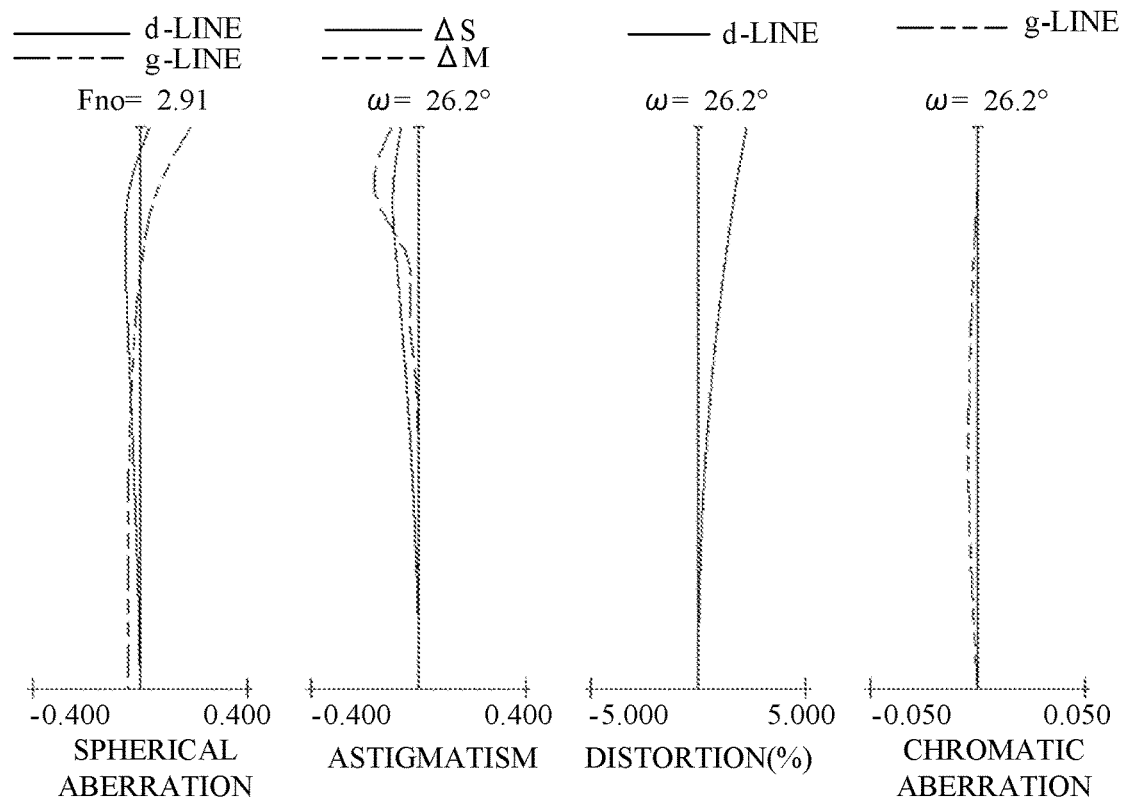
Figure 6C:
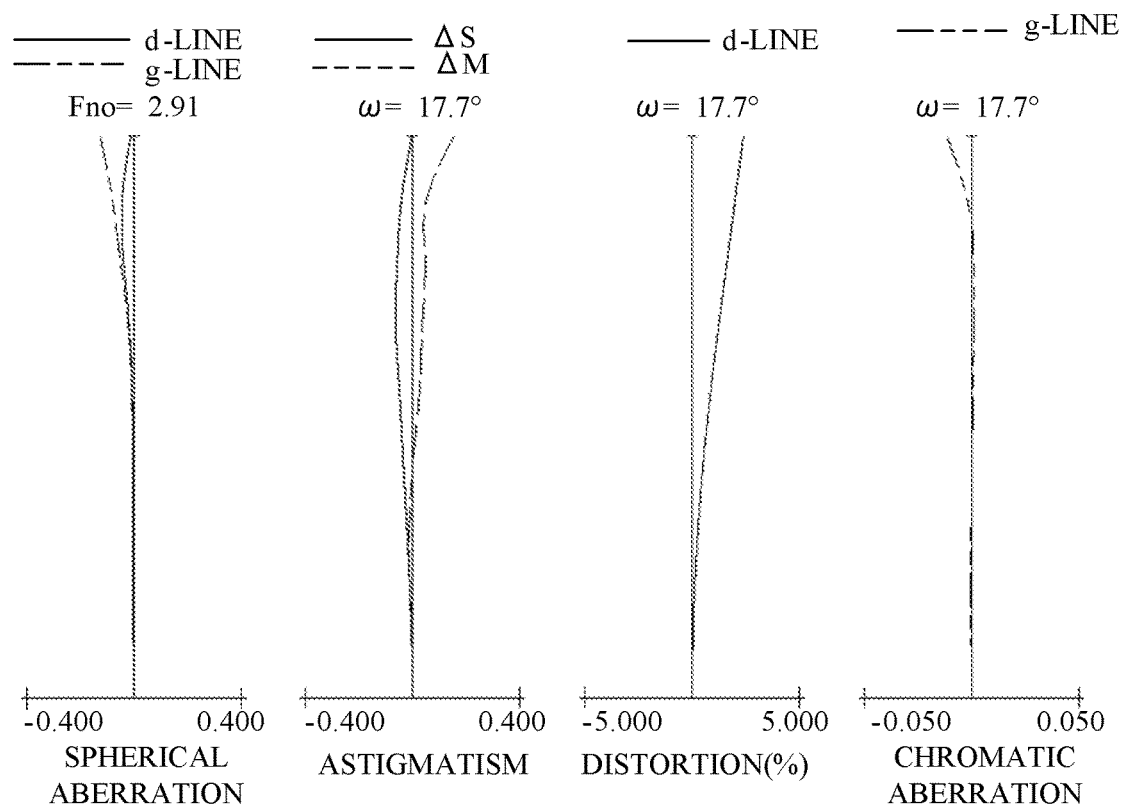
Figure 7A:
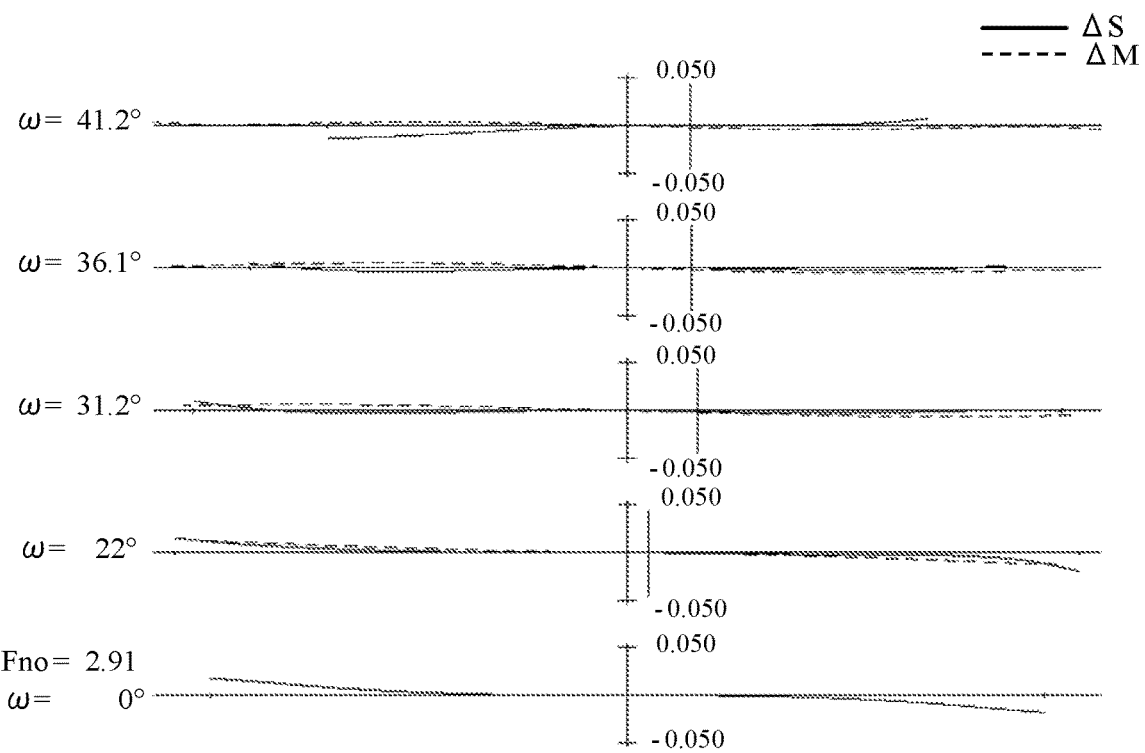
FIGS. 7A to 7C are lateral aberration diagrams at the wide-angle end, the middle zoom position, and the telephoto end according to Example 2.
Figure 7B:
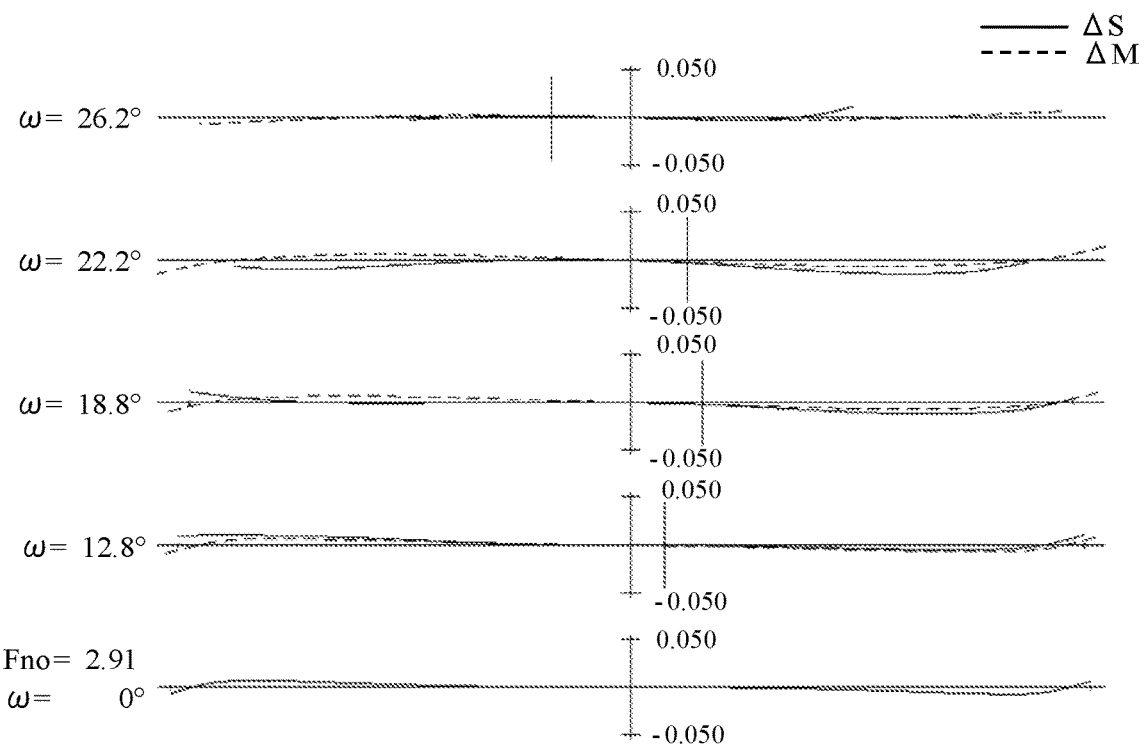
Figure 7C:
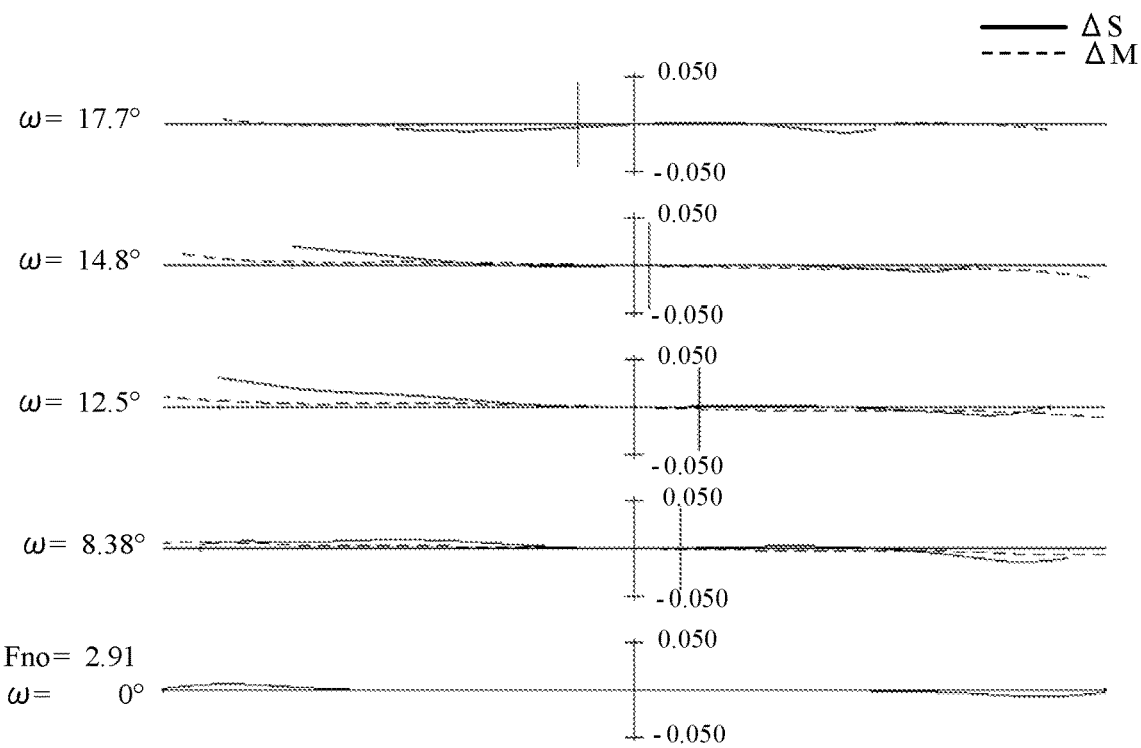
Figure 8A:
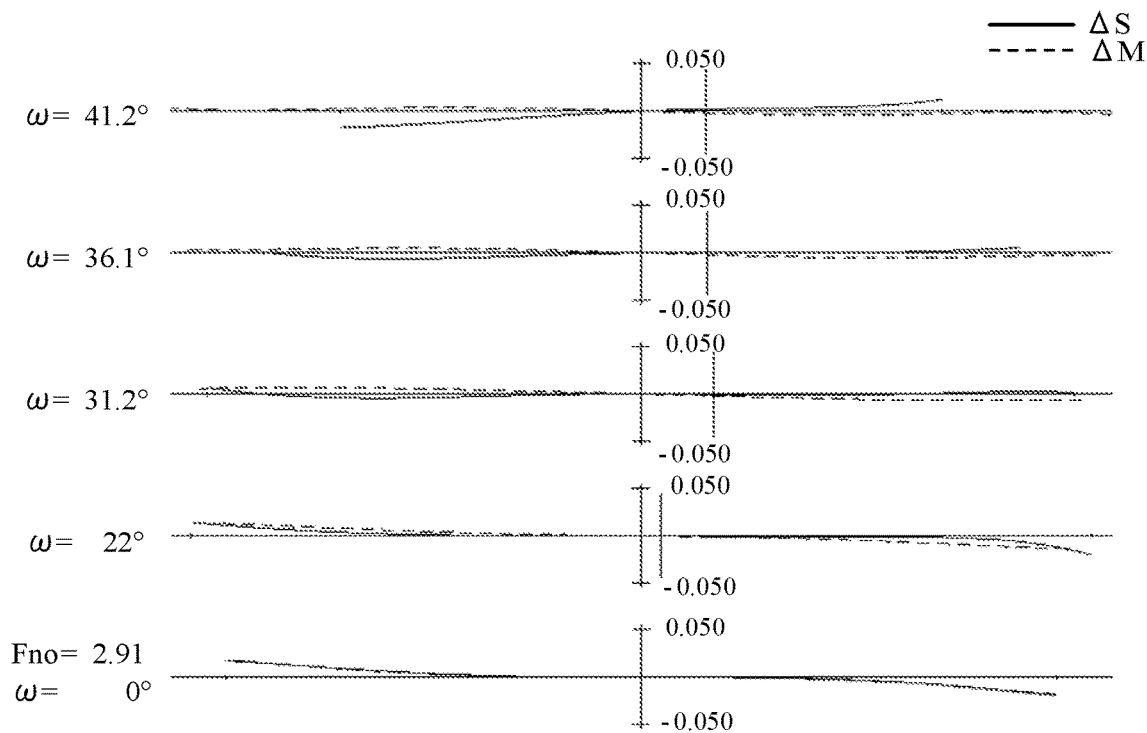
FIGS. 8A to 8C are lateral aberration diagrams at the wide-angle end, the middle zoom position, and the telephoto end during the 0.3° image stabilization according to Example 2.
Figure 8B:
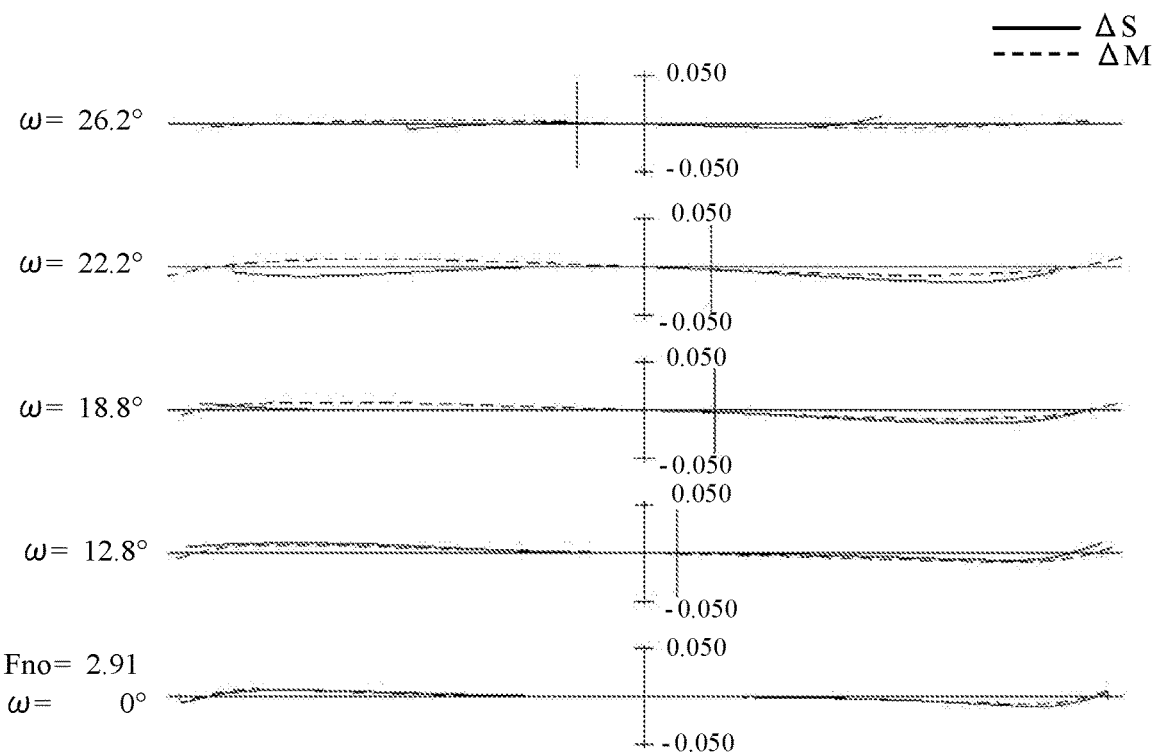
Figure 8C:
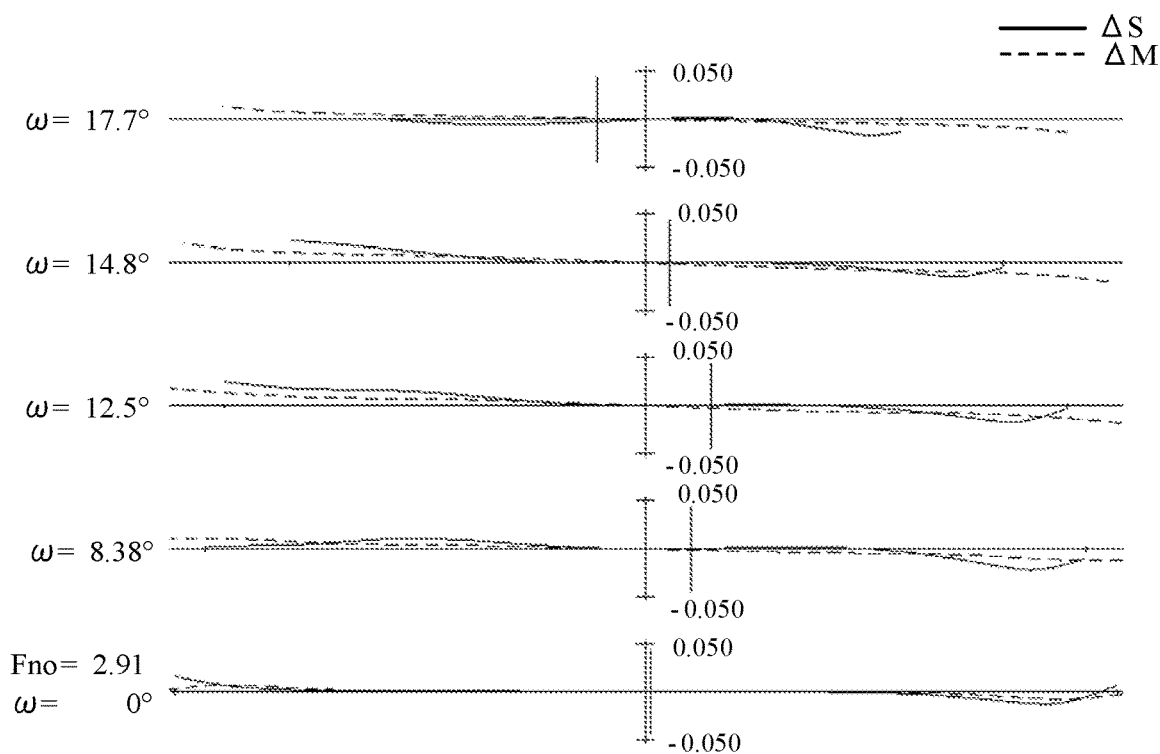

FIG. 5 is the lens sectional view at the wide-angle end of the zoom lens according to Example 2. FIGS. 6A to 6C are the longitudinal aberration diagrams at the wide-angle end, the middle zoom position, and the telephoto end, respectively, in the in-focus state on the infinity according to Example 2. FIGS. 7A to 7C are the lateral aberration diagrams at the wide-angle end, the middle zoom position, and the telephoto end, respectively, according to Example 2. FIGS. 8A to 8C are the lateral aberration diagrams at the wide-angle end, the middle zoom position, and the telephoto end, respectively, during the 0.3° image stabilization according to Example 2. The zoom lens according to Example 2 is a zoom lens with the zoom ratio of 2.75 and the F-number of 2.91.

Figure 9:
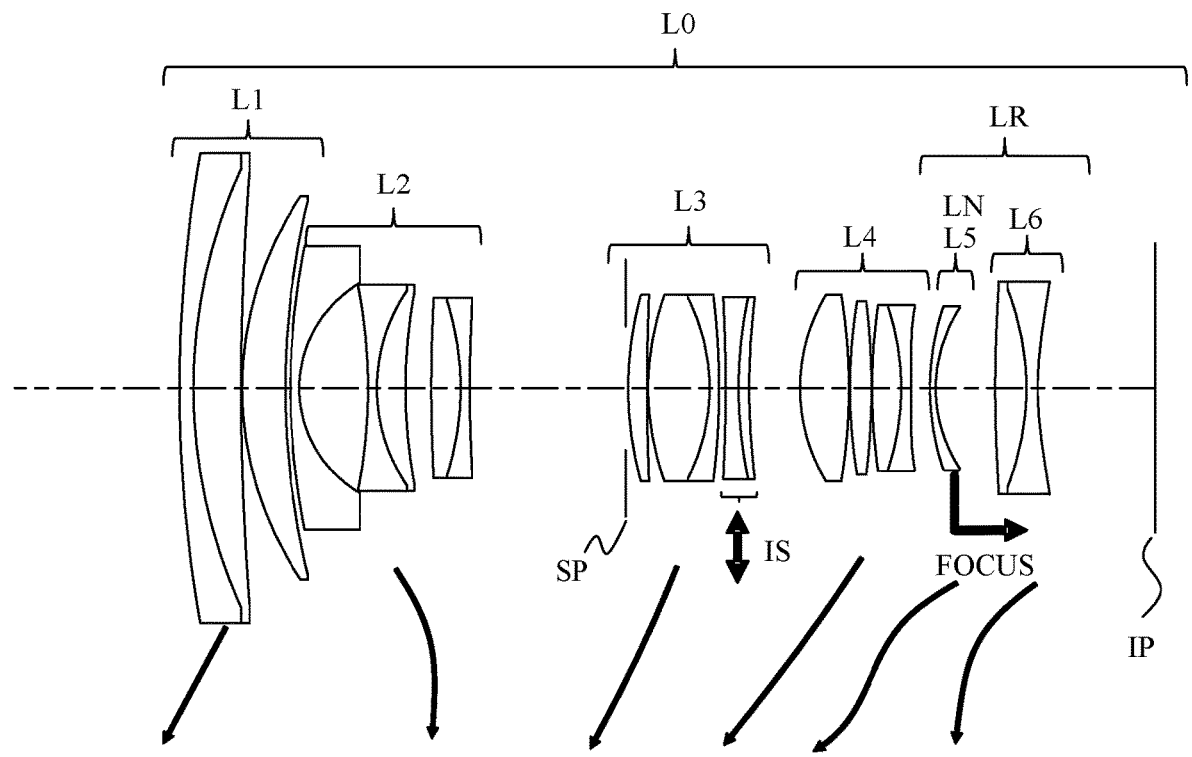
FIG. 9 is a lens sectional view at the wide-angle end of the zoom lens according to Example 3.
Figure 10A:
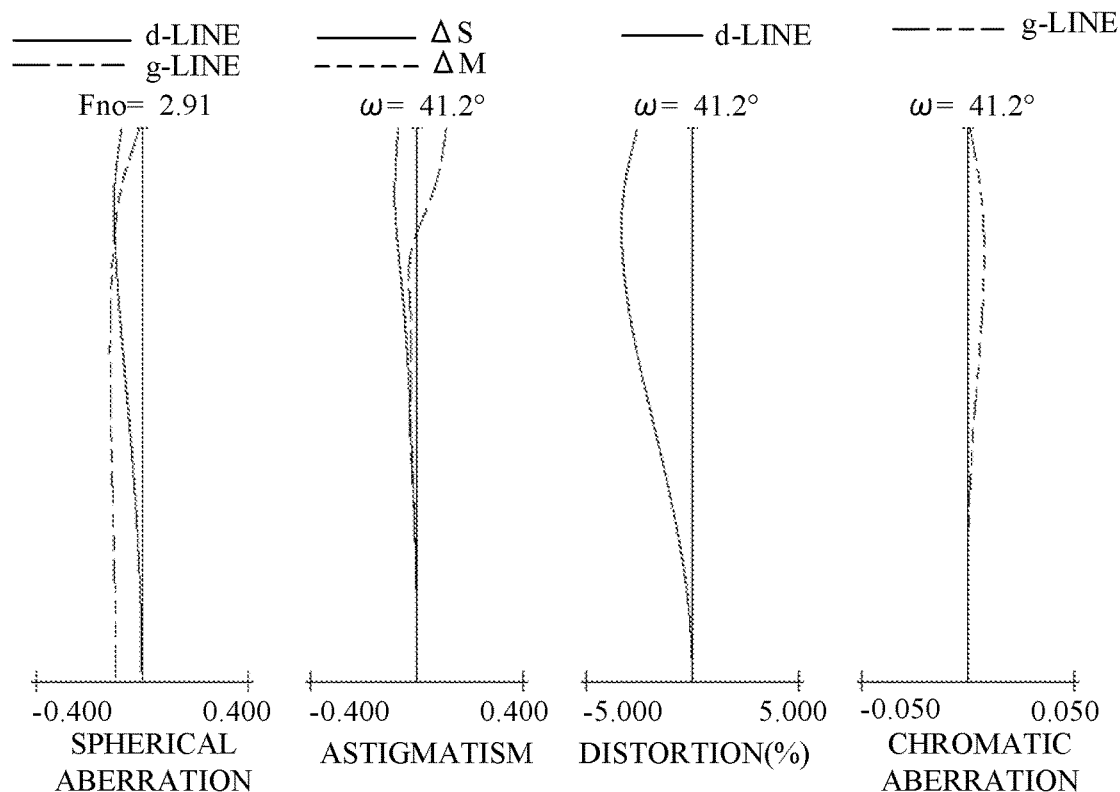
FIGS. 10A to 10C are longitudinal aberration diagrams at the wide-angle end, the middle zoom position, and the telephoto end according to Example 3.
Figure 10B:
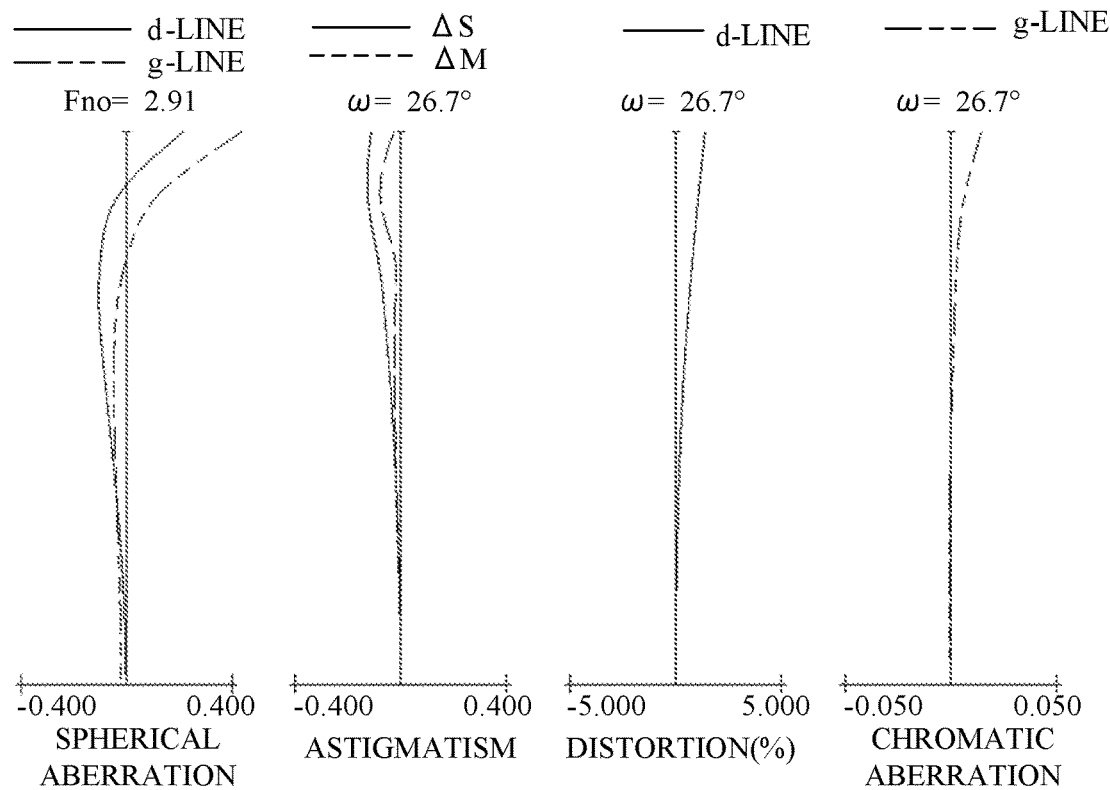
Figure 10C:
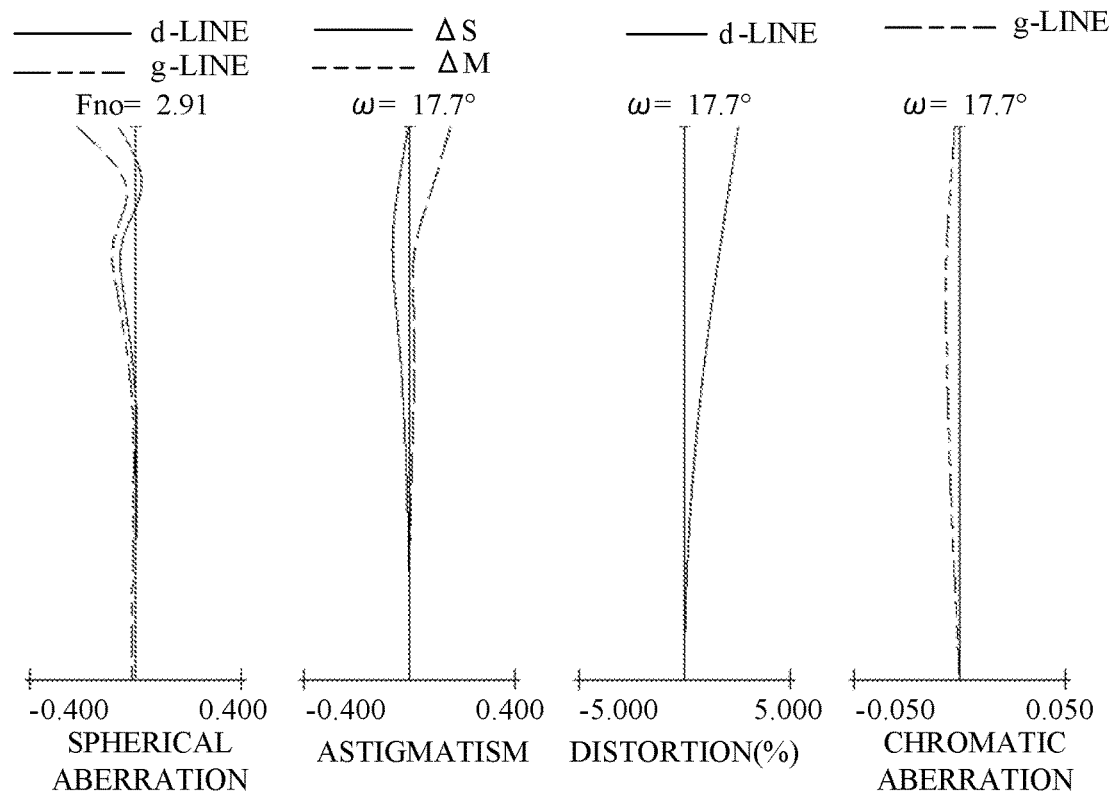
Figure 11A:
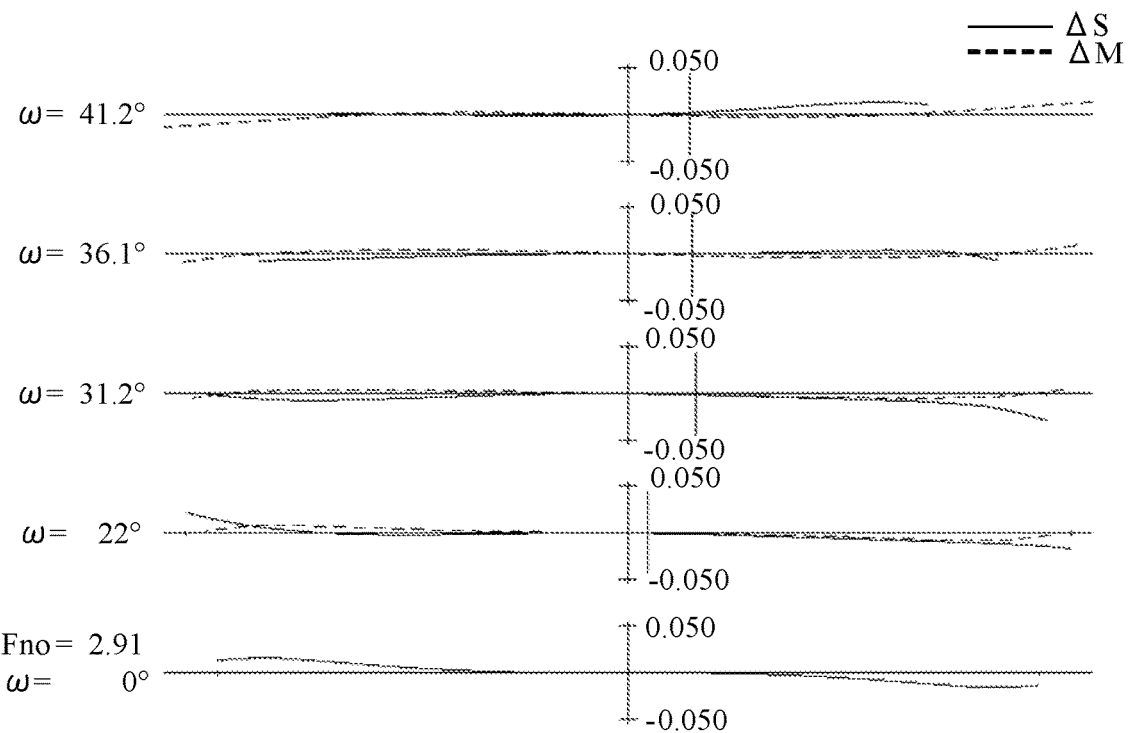
FIGS. 11A to 11C are lateral aberration diagrams at the wide-angle end, the middle zoom position, and the telephoto end according to Example 3.
Figure 11B:
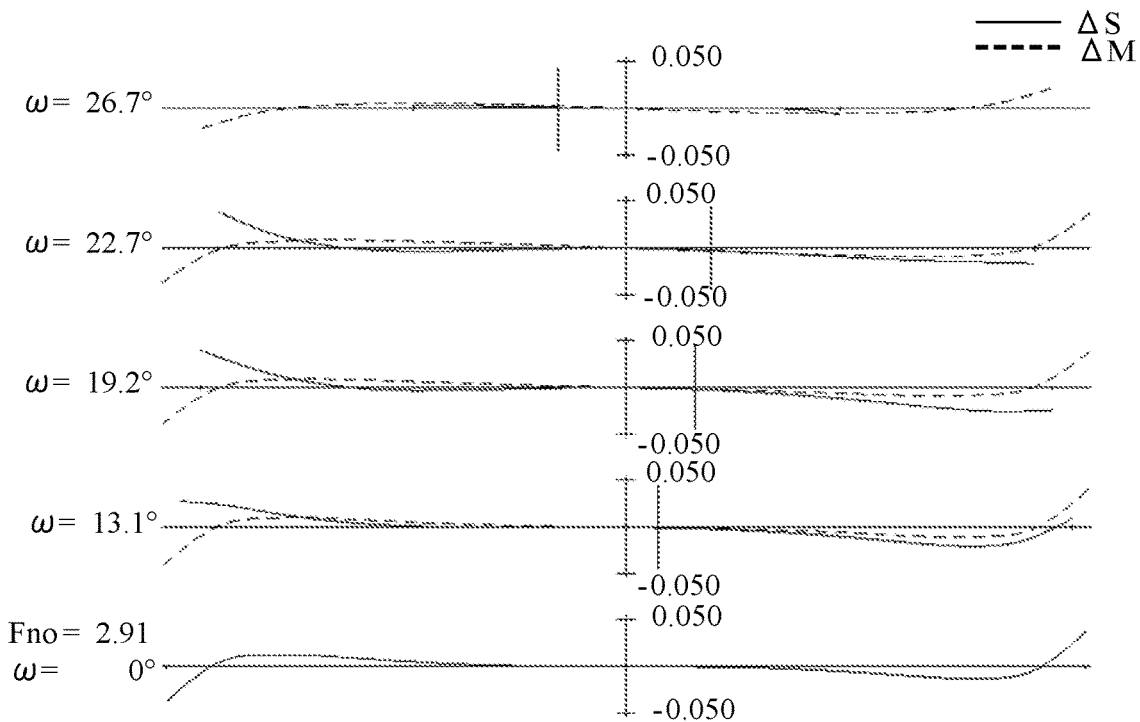
Figure 11C:
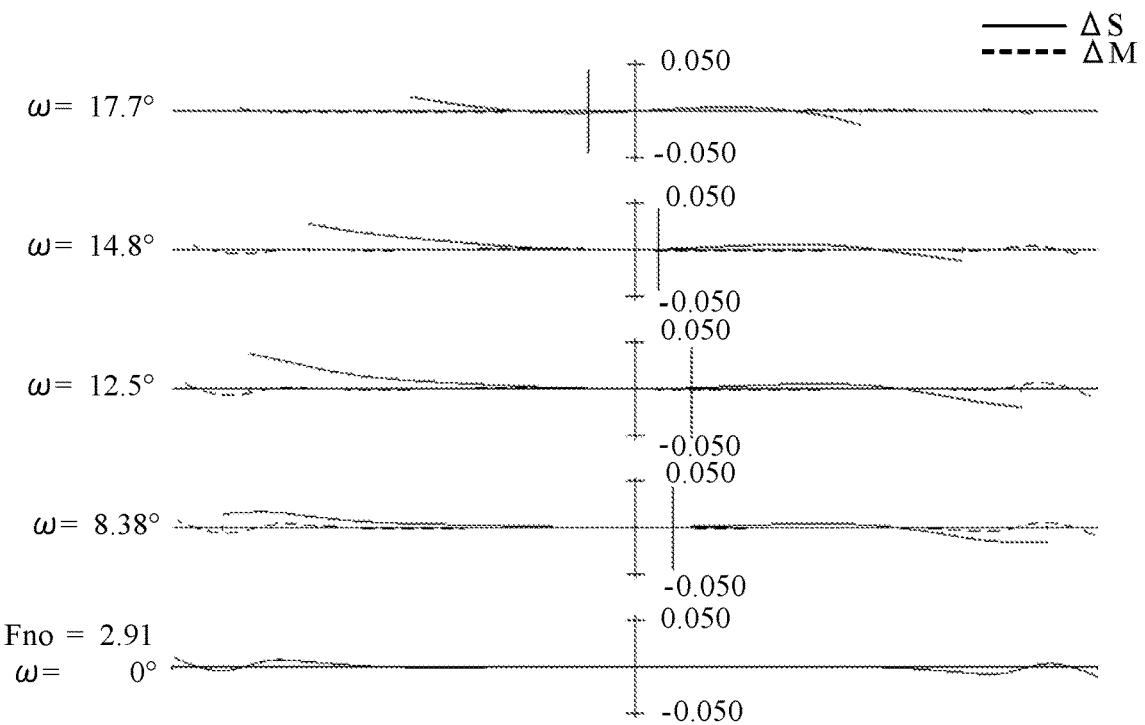
Figure 12A:
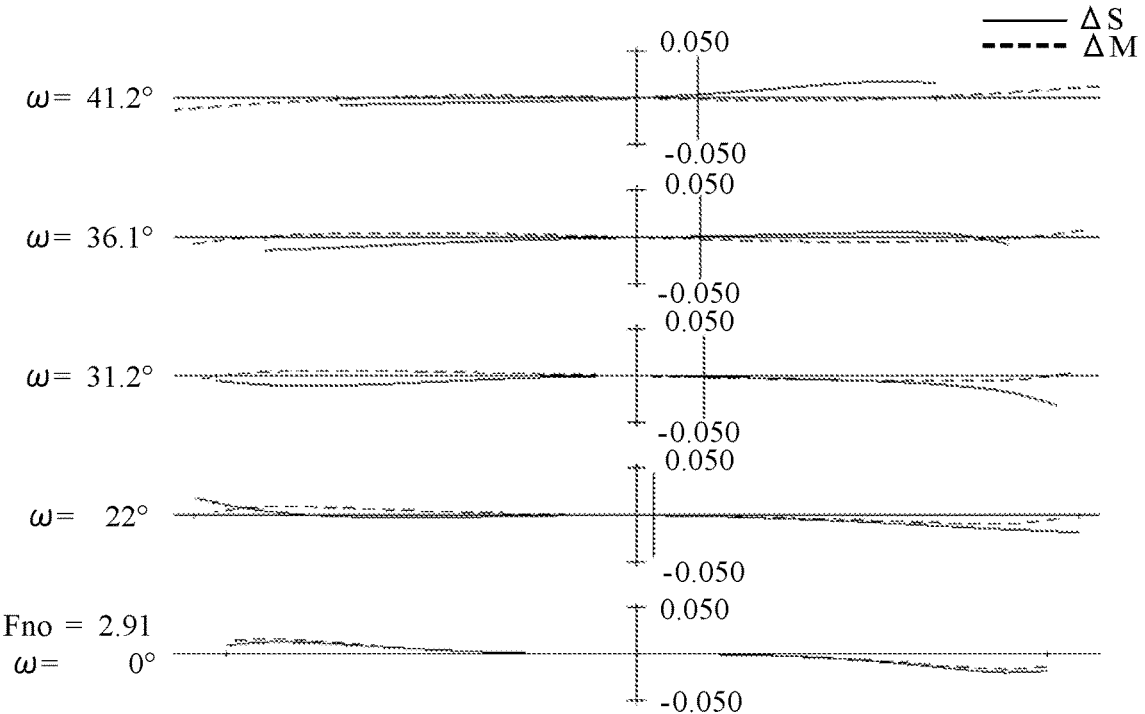
FIGS. 12A to 12C are lateral aberration diagrams at the wide-angle end, the middle zoom position, and the telephoto end during the 0.3° image stabilization according to Example 3.
Figure 12B:
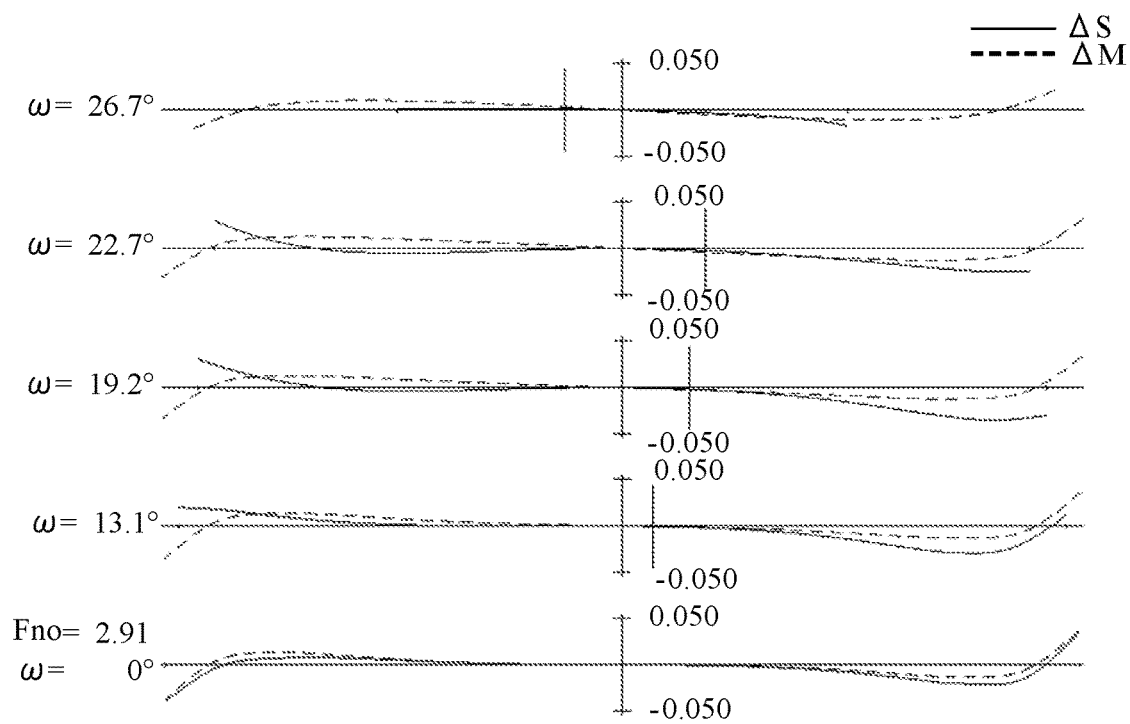
Figure 12C:
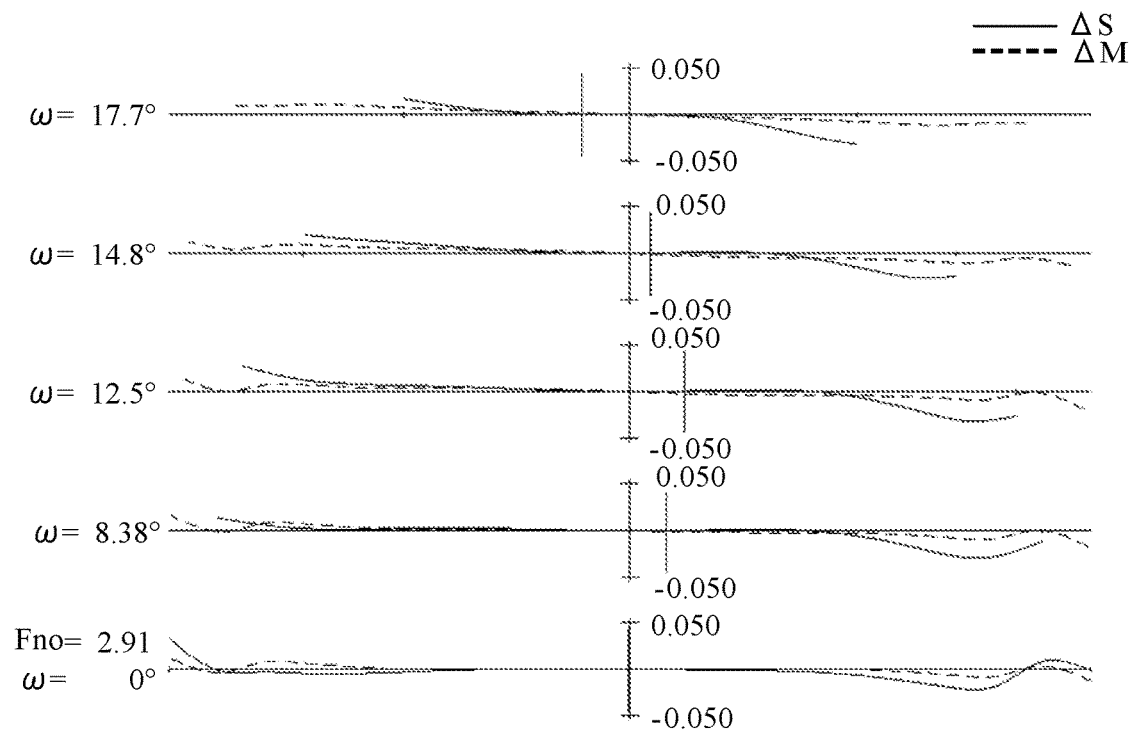

FIG. 9 is the lens sectional view at the wide-angle end of the zoom lens according to Example 3. FIGS. 10A to 10C are the longitudinal aberration diagrams at the wide-angle end, the middle zoom position, and the telephoto end, respectively, in the in-focus state on the infinity according to Example 3. FIGS. 11A to 11C are the lateral aberration diagrams at the wide-angle end, the middle zoom position, and the telephoto end, respectively, according to Example 3. FIGS. 12A to 12C are the lateral aberration diagrams at the wide-angle end, the middle zoom position, and the telephoto end, respectively, during the 0.3° image stabilization according to Example 3. The zoom lens according to Example 3 is a zoom lens with the zoom ratio of 2.75 and the F-number of 2.91.

Figure 13:
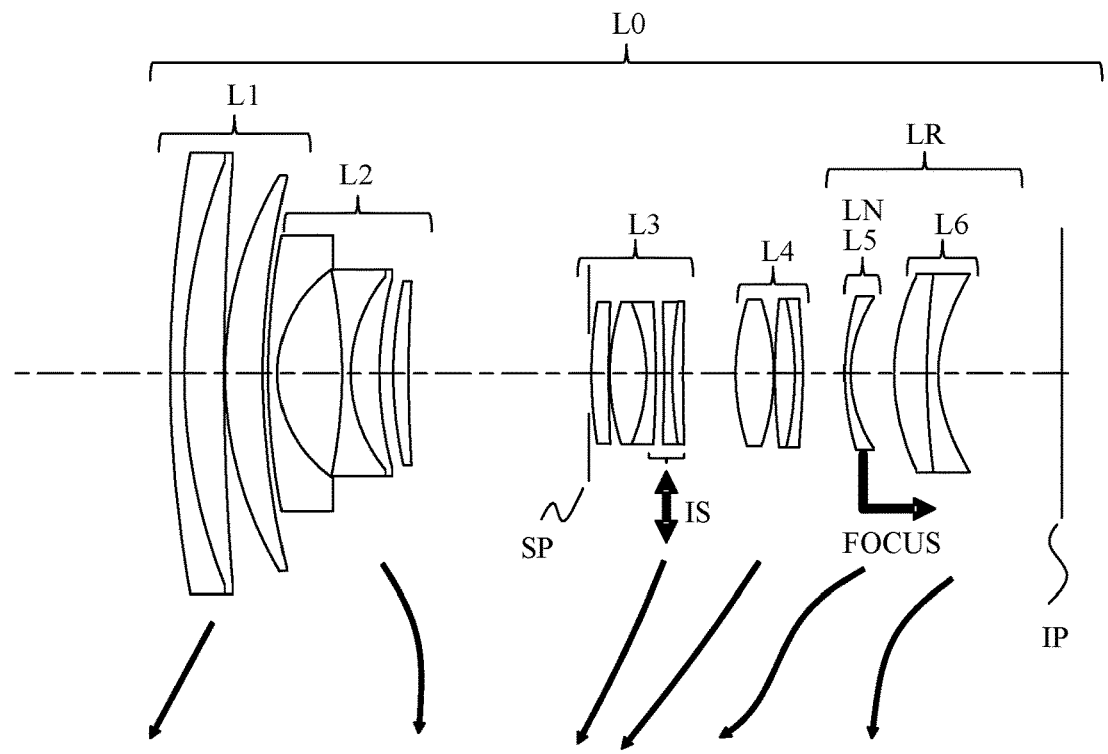
FIG. 13 is a lens sectional view at the wide-angle end of the zoom lens according to Example 4.
Figure 14A:
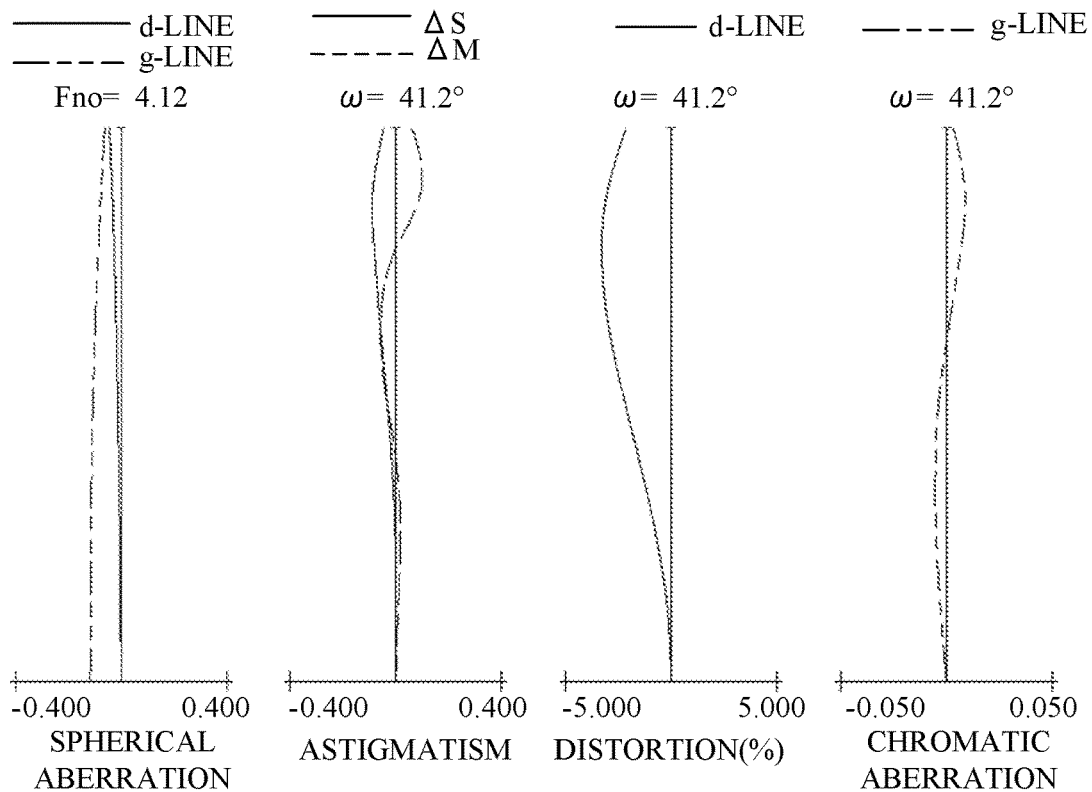
FIGS. 14A to 14C are longitudinal aberration diagrams at the wide-angle end, the middle zoom position, and the telephoto end according to Example 4.
Figure 14B:
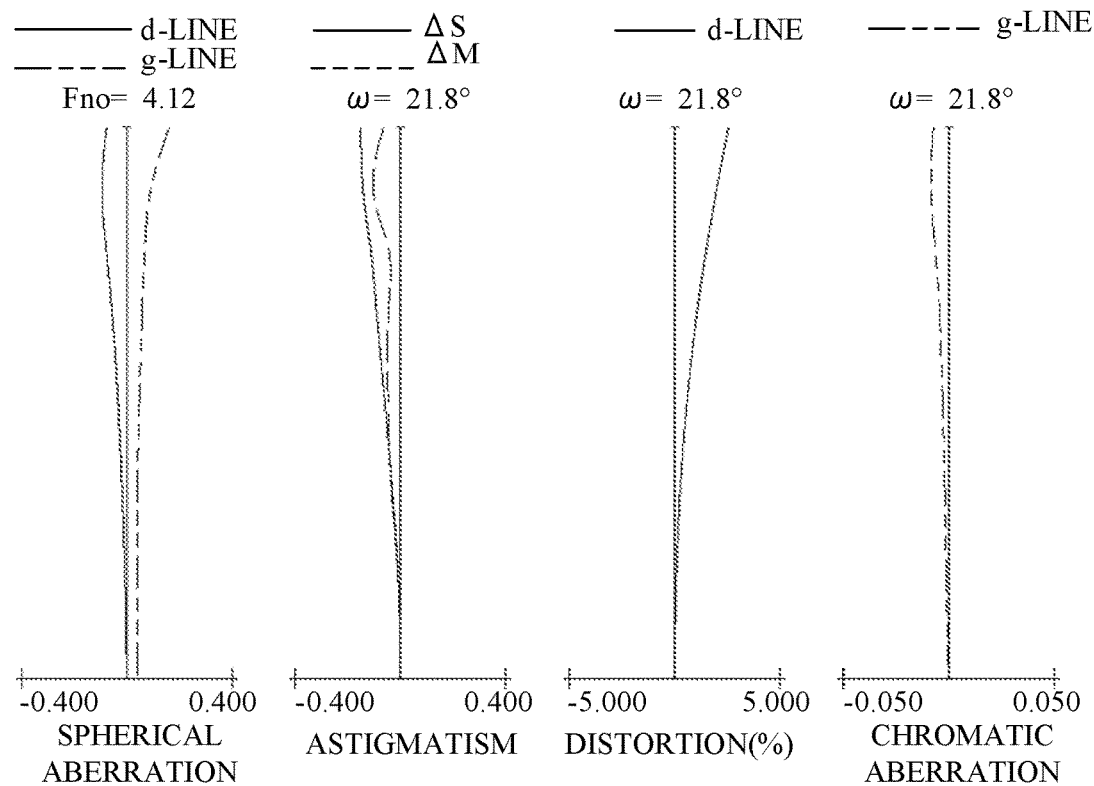
Figure 14C:
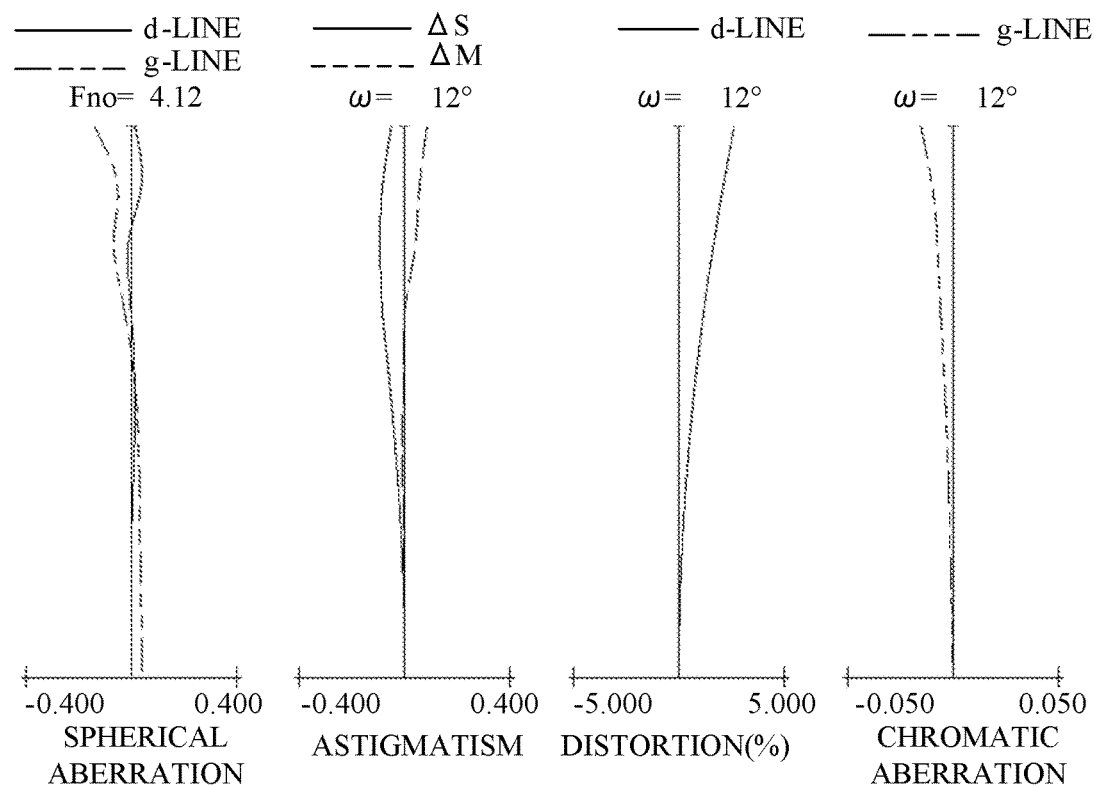
Figure 15A:
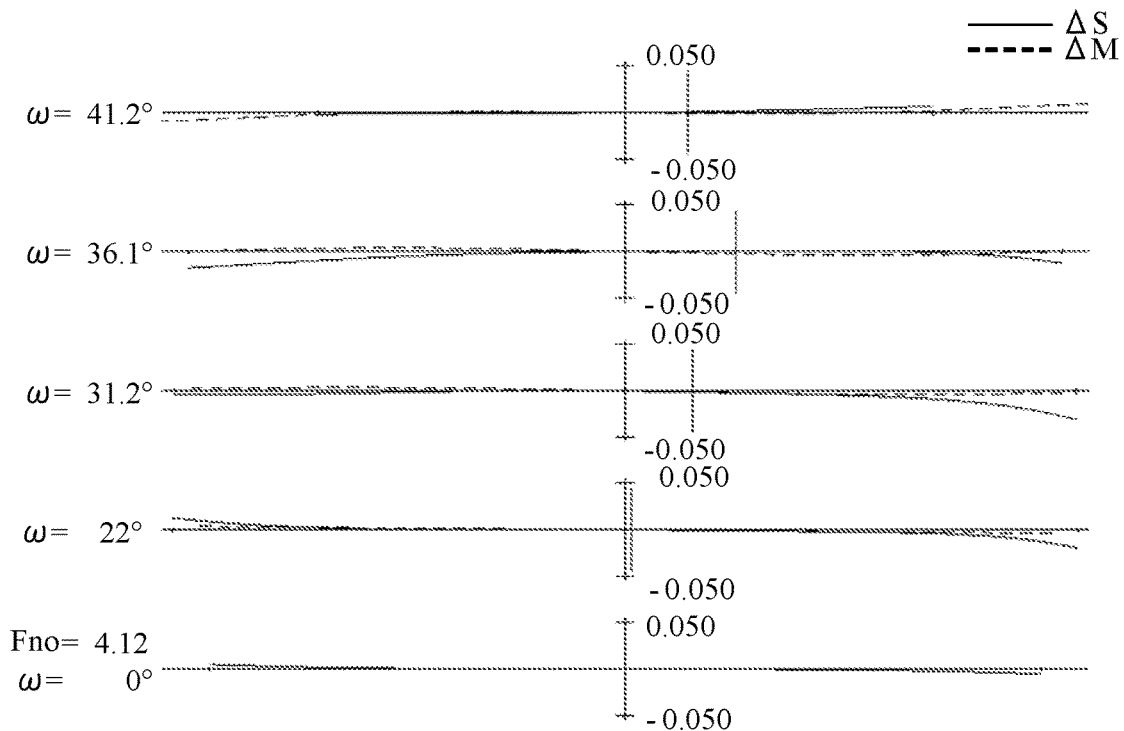
FIGS. 15A to 15C are lateral aberration diagrams at the wide-angle end, the middle zoom position, and the telephoto end according to Example 4.
Figure 15B:
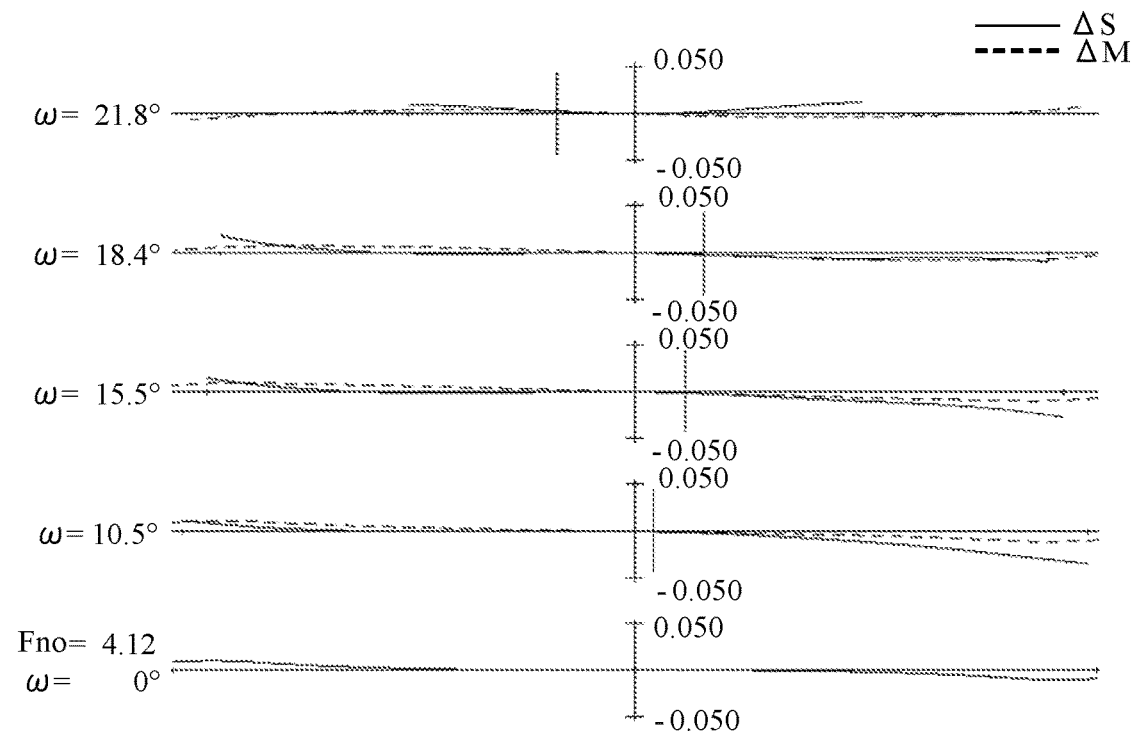
Figure 15C:
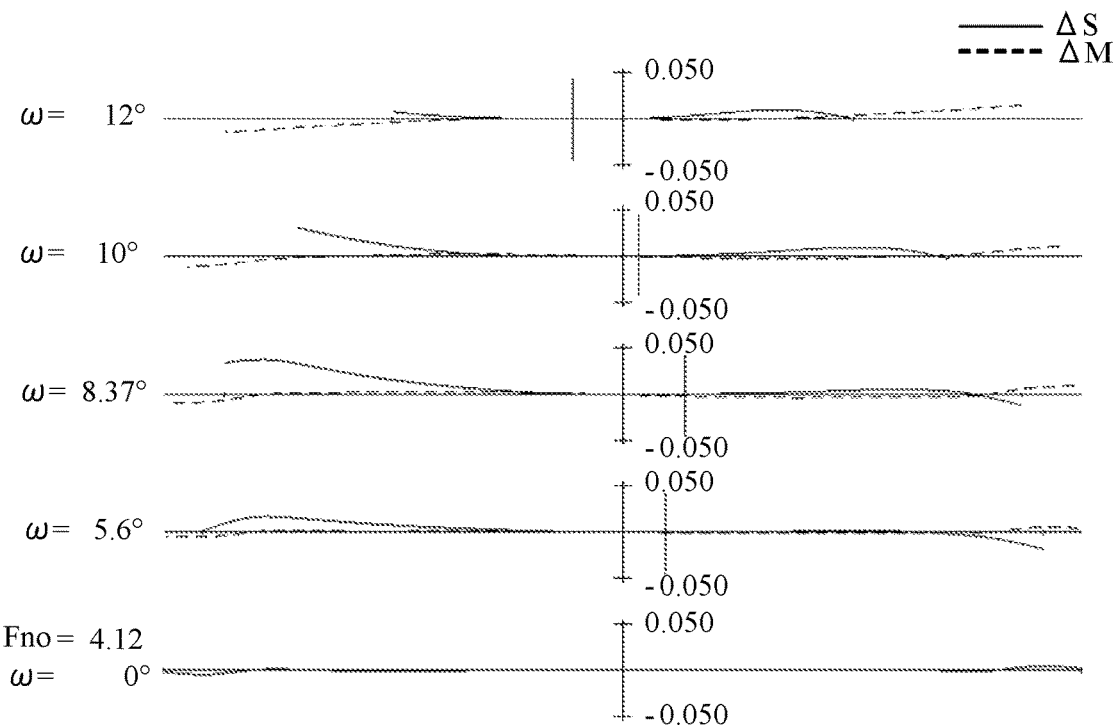
Figure 16A:
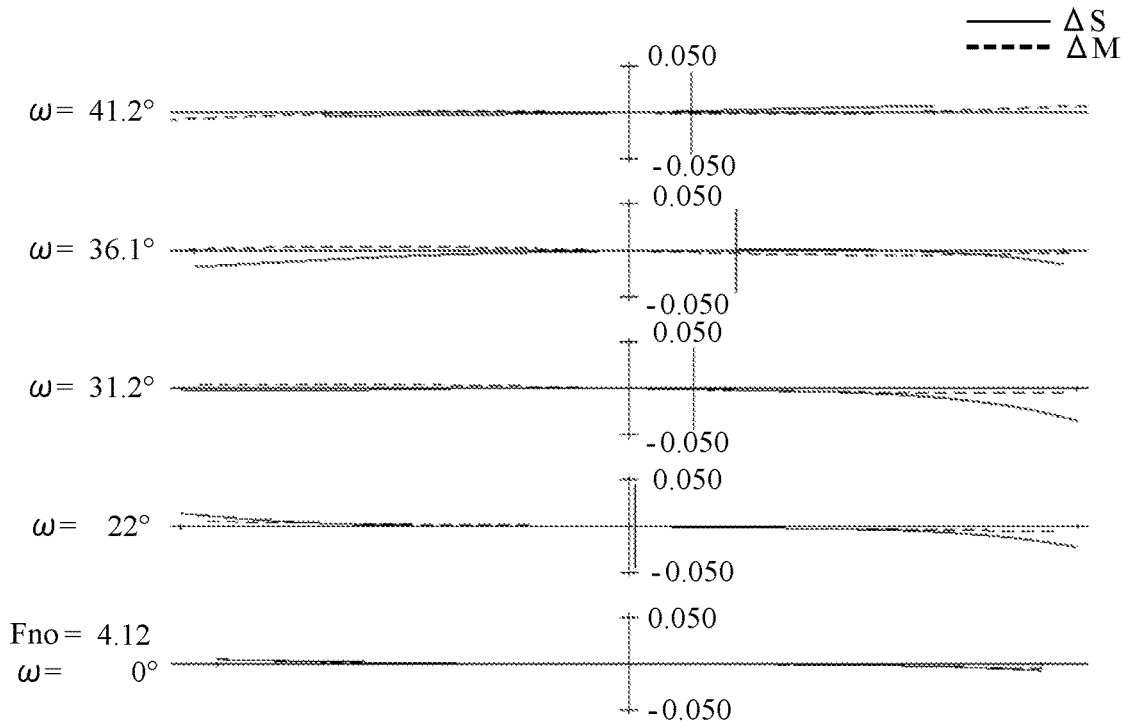
FIGS. 16A to 16C are lateral aberration diagrams at the wide-angle end, the middle zoom position, and the telephoto end during the 0.3° image stabilization according to Example 4.
Figure 16B:
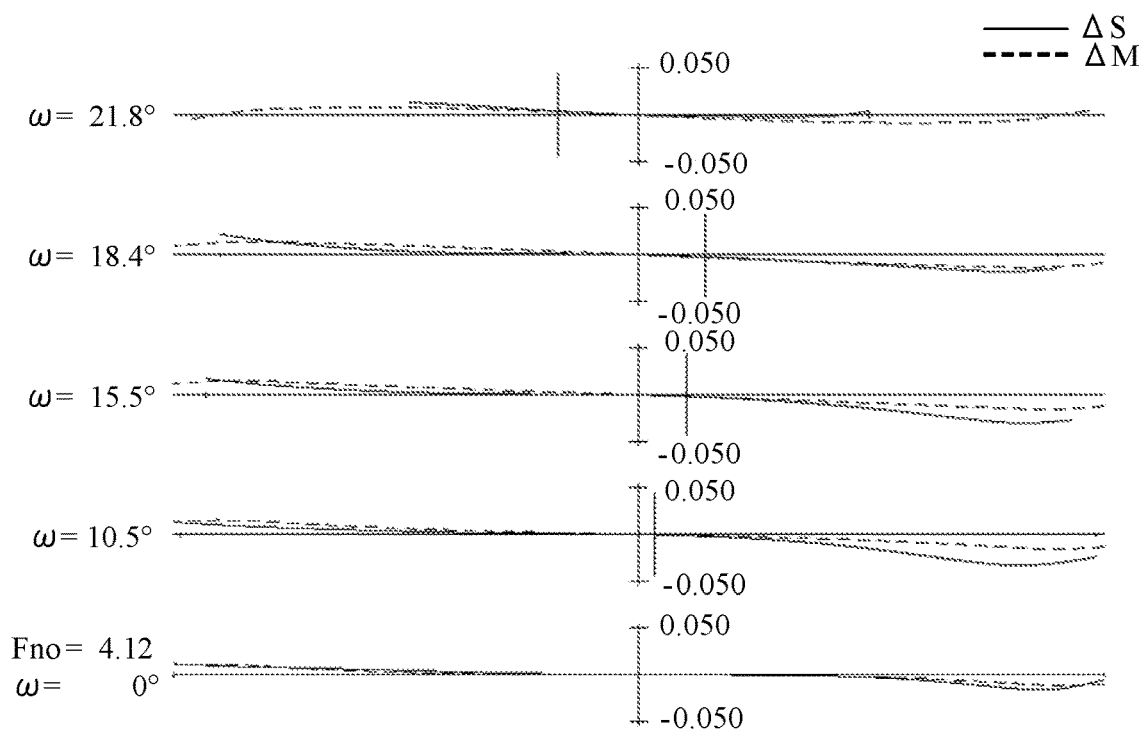
Figure 16C:
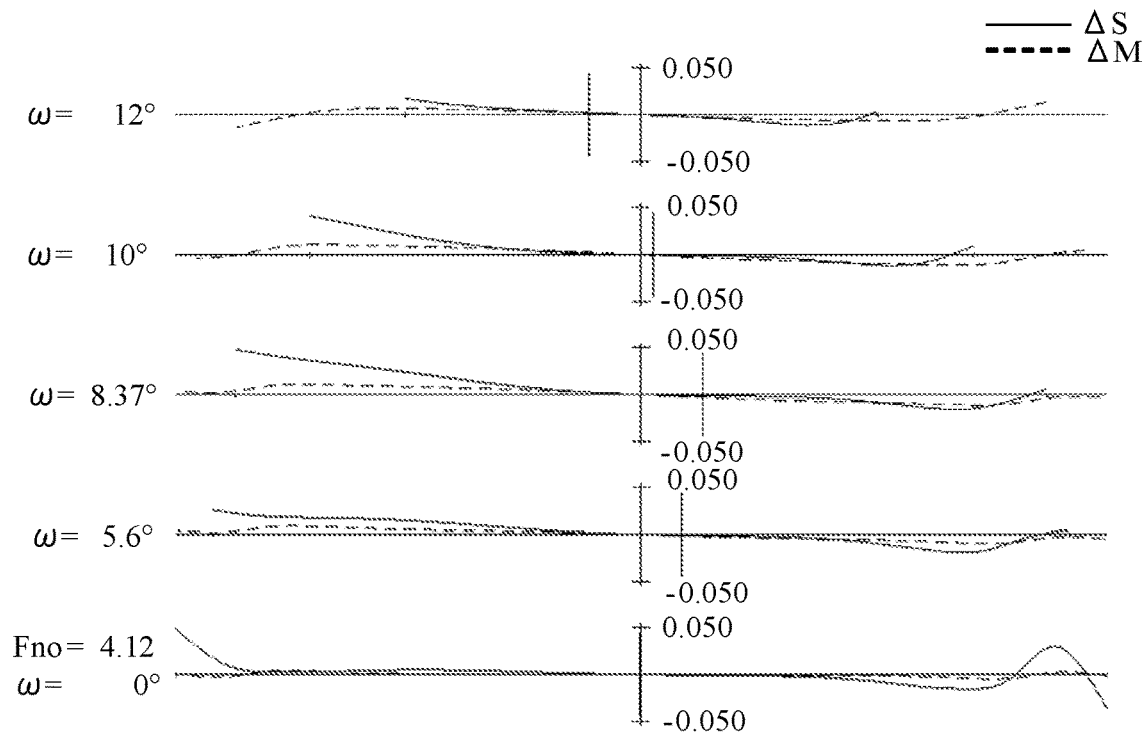

FIG. 13 is the lens sectional view at the wide-angle end of the zoom lens according to Example 4. FIGS. 14A to 14C are the longitudinal aberration diagrams at the wide-angle end, the middle zoom position, and the telephoto end, respectively, in the in-focus state on the infinity according to Example 4. FIGS. 15A to 15C are the lateral aberration diagrams at the wide-angle end, the middle zoom position, and the telephoto end, respectively, according to Example 4. FIGS. 16A to 16C are the lateral aberration diagrams at the wide-angle end, the middle zoom position, and the telephoto end, respectively, during the 0.3° image stabilization according to Example 4. The zoom lens according to Example 4 is a zoom lens with the zoom ratio of 4.13 and the F-number of 4.12.

Figure 17:
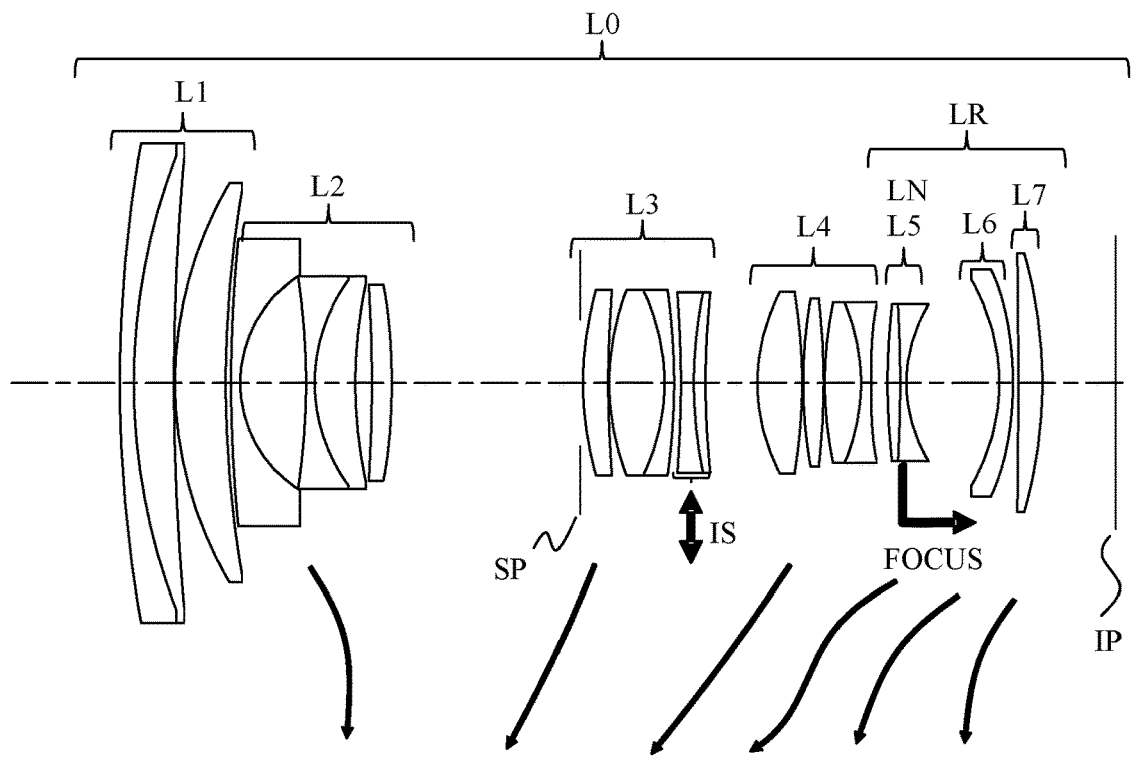
FIG. 17 is a lens sectional view at the wide-angle end of the zoom lens according to Example 5.
Figure 18A:
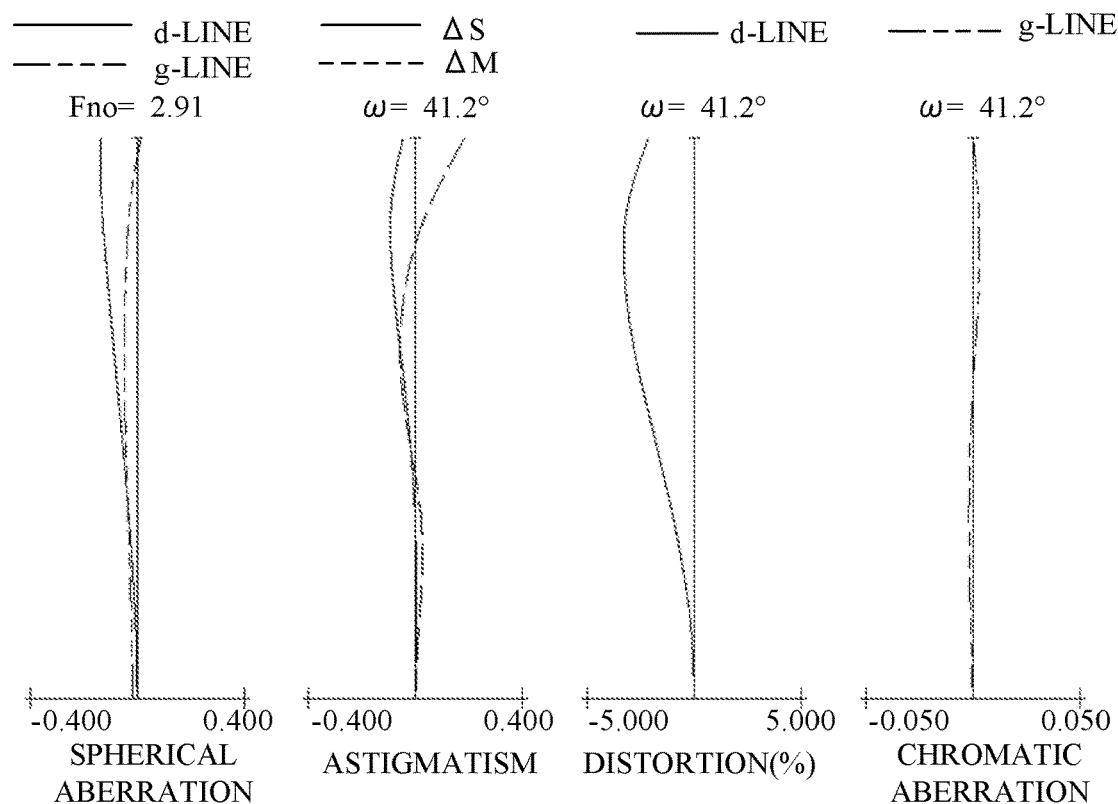
FIGS. 18A to 18C are longitudinal aberration diagrams at the wide-angle end, the middle zoom position, and the telephoto end according to Example 5.
Figure 18B:
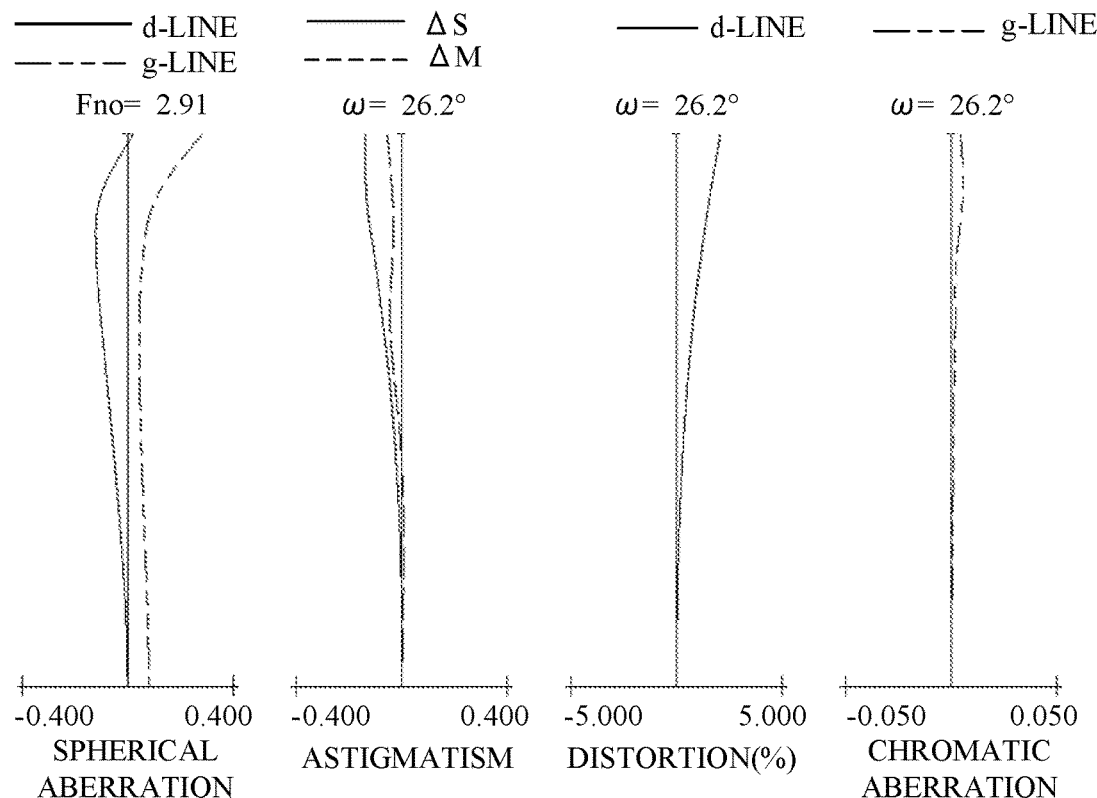
Figure 18C:
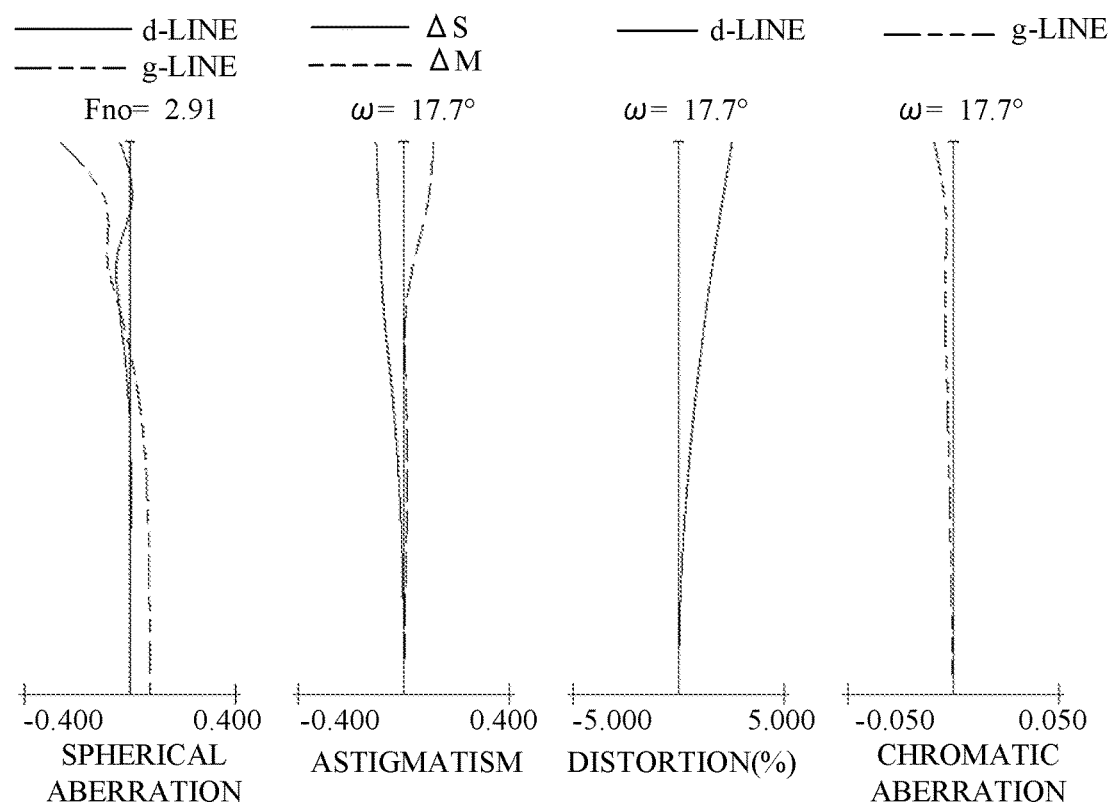
Figure 19A:
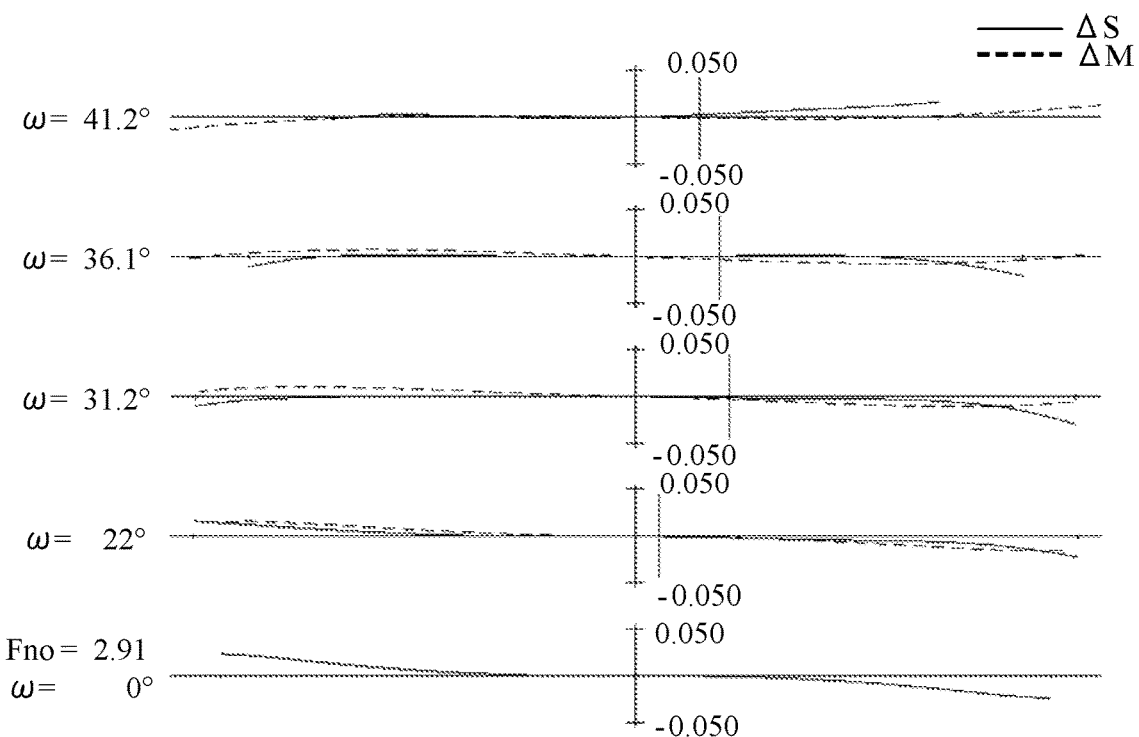
FIGS. 19A to 19C are lateral aberration diagrams at the wide-angle end, the middle zoom position, and the telephoto end according to Example 5.
Figure 19B:
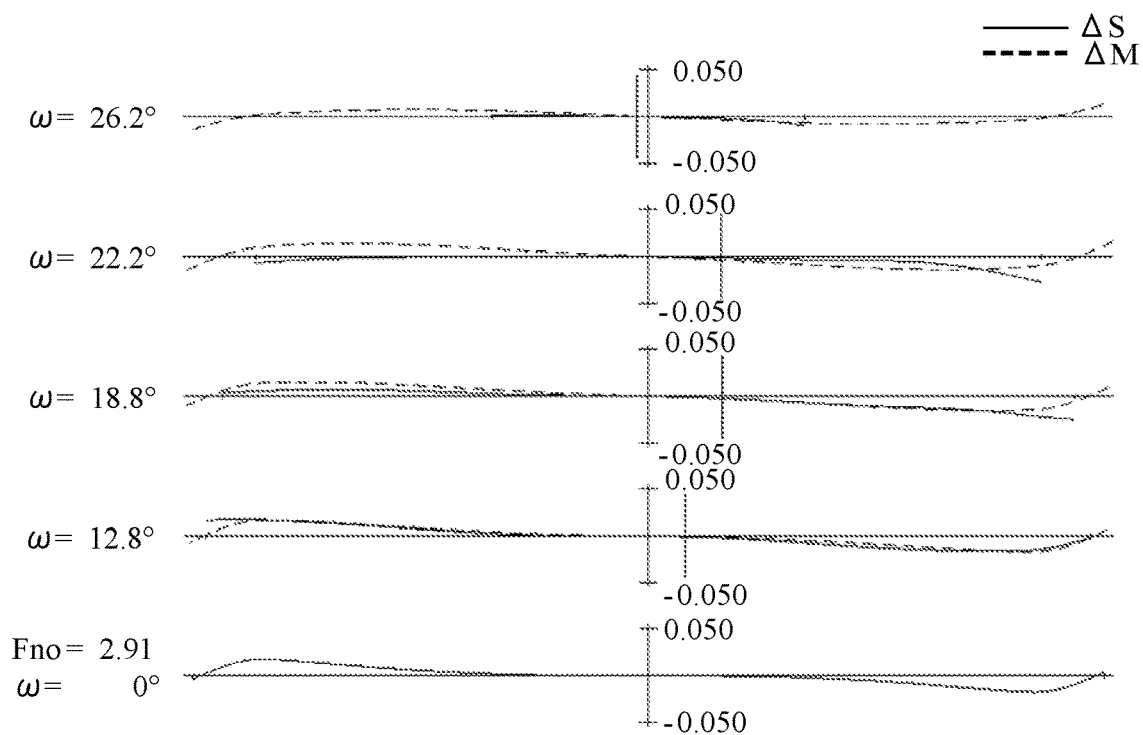
Figure 19C:
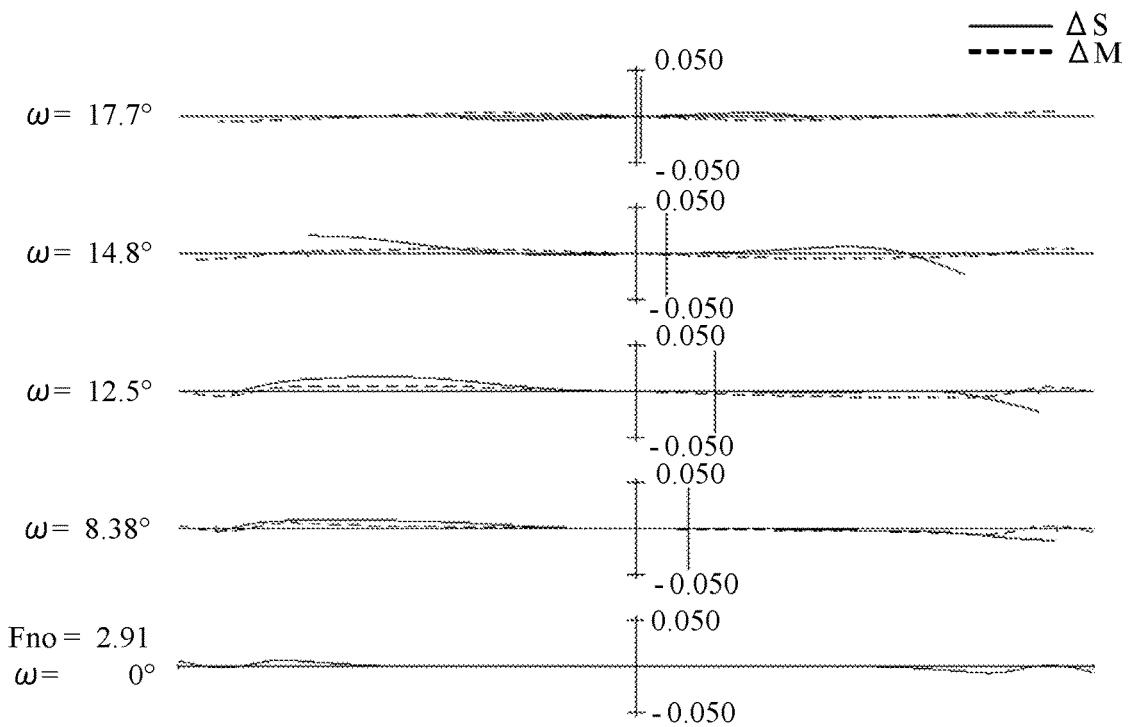
Figure 20A:
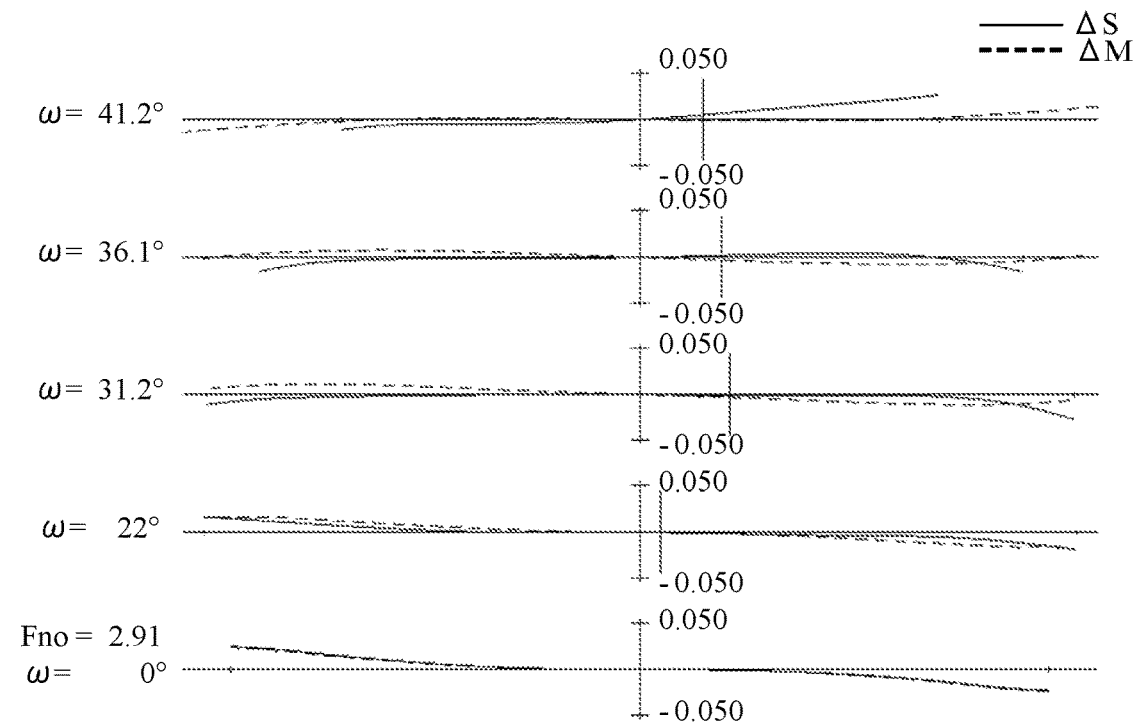
FIGS. 20A to 20C are lateral aberration diagrams at the wide-angle end, the middle zoom position, and the telephoto end during the 0.3° image stabilization according to Example 5.
Figure 20B:
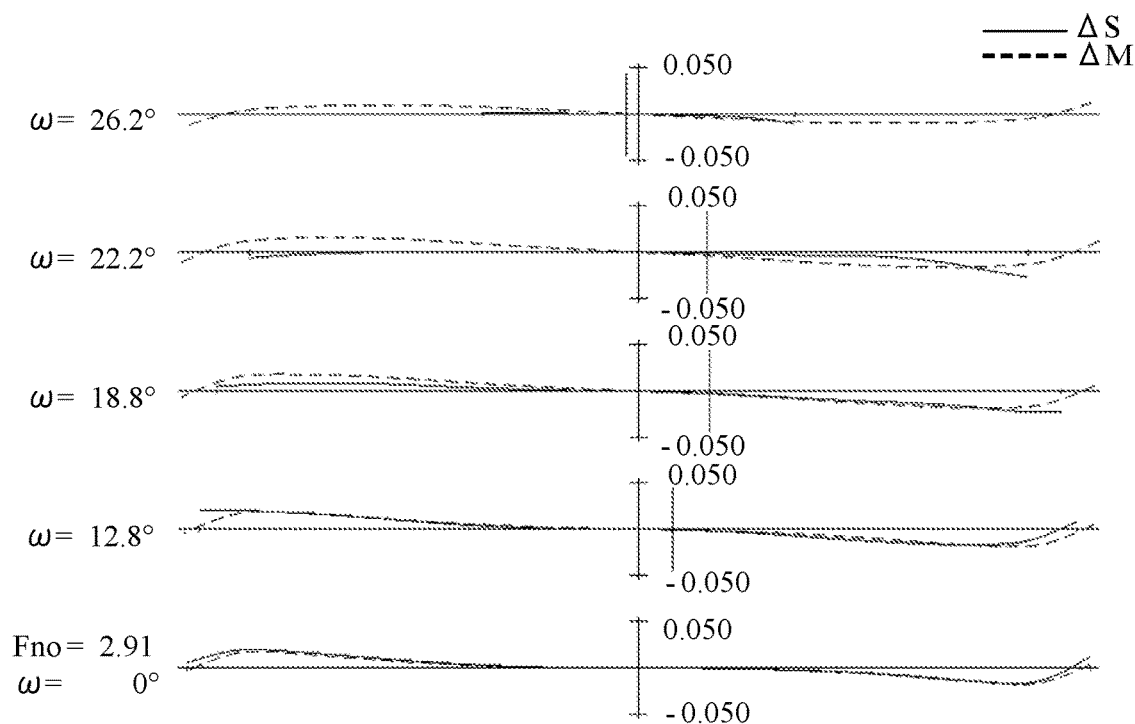
Figure 20C:
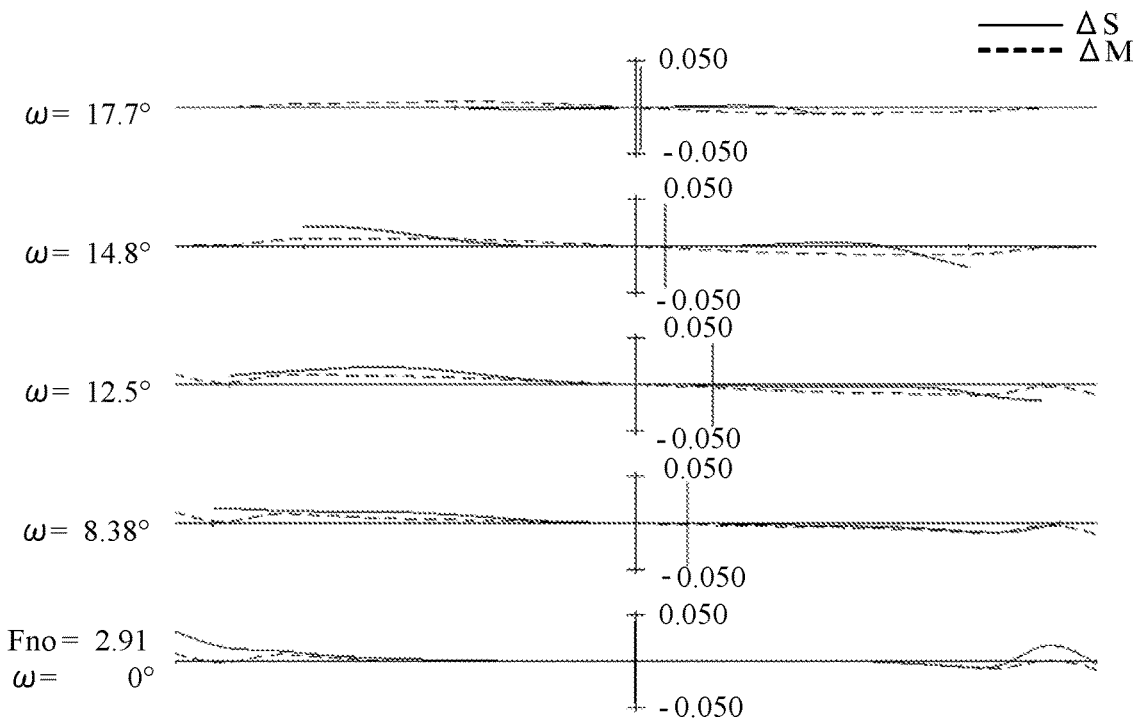

FIG. 17 is the lens sectional view at the wide-angle end of the zoom lens according to Example 5. FIGS. 18A to 18C are the longitudinal aberration diagrams at the wide-angle end, the middle zoom position, and the telephoto end, respectively, in the in-focus state on the infinity according to Example 5. FIGS. 19A to 19C are the are the lateral aberration diagrams at the wide-angle end, the middle zoom position, and the telephoto end, respectively, according to Example 5. FIGS. 20A to 20C are the lateral aberration diagrams at the wide-angle end, the middle zoom position, and the telephoto end, respectively, during the 0.3° image stabilization according to Example 5. The zoom lens according to Example 5 is a zoom lens with the zoom ratio of 2.91 and the F-number of 2.91.

Figure 21:
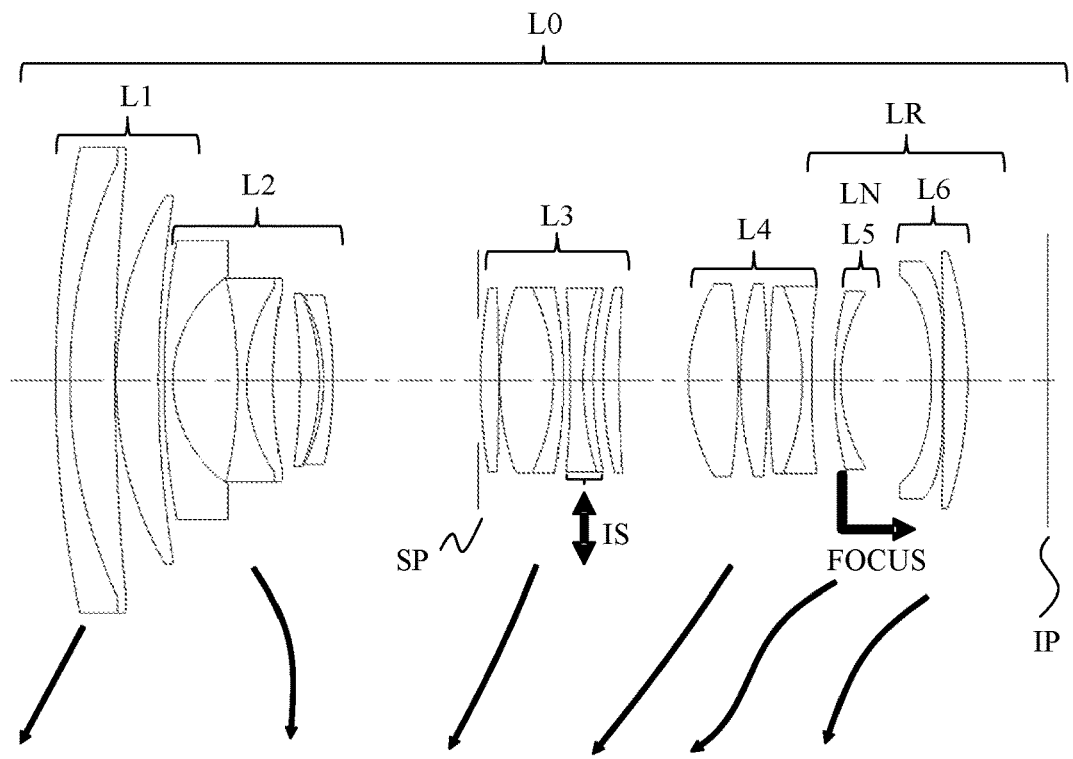
FIG. 21 is a lens sectional view at the wide-angle end of the zoom lens according to Example 6.
Figure 22A:
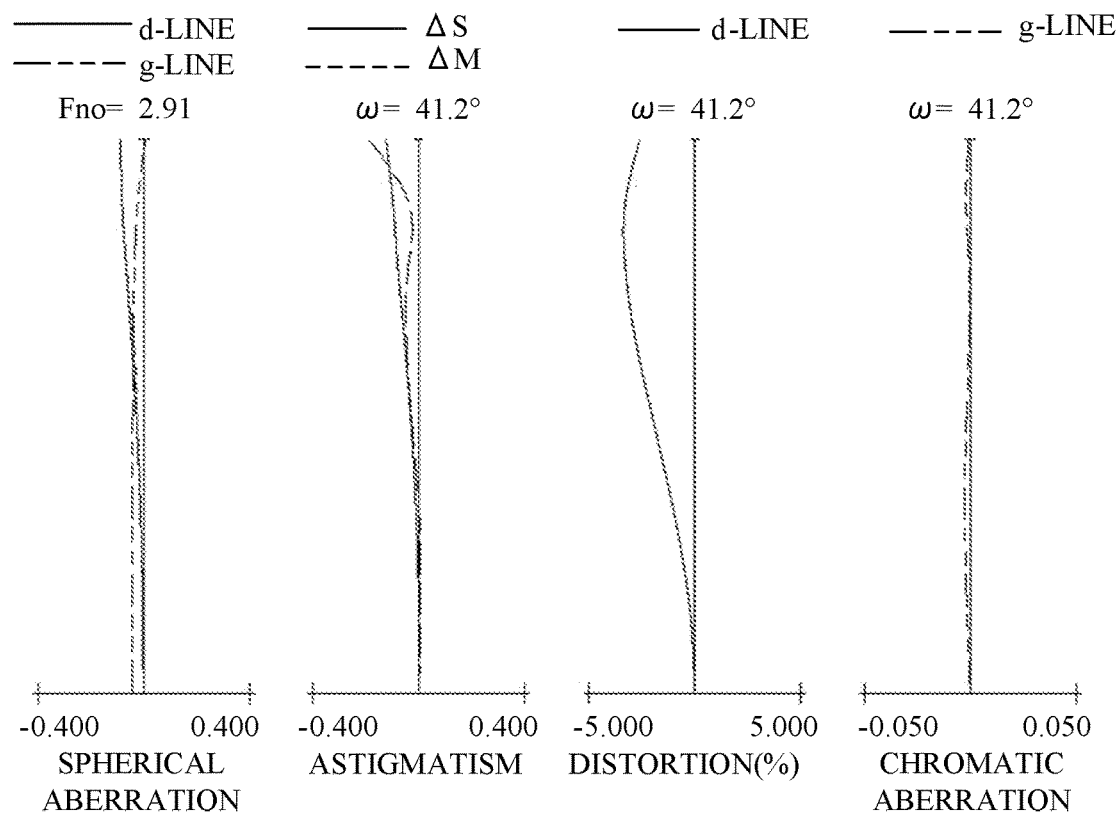
FIGS. 22A to 22C are longitudinal aberration diagrams at the wide-angle end, the middle zoom position, and the telephoto end according to Example 6.
Figure 22B:
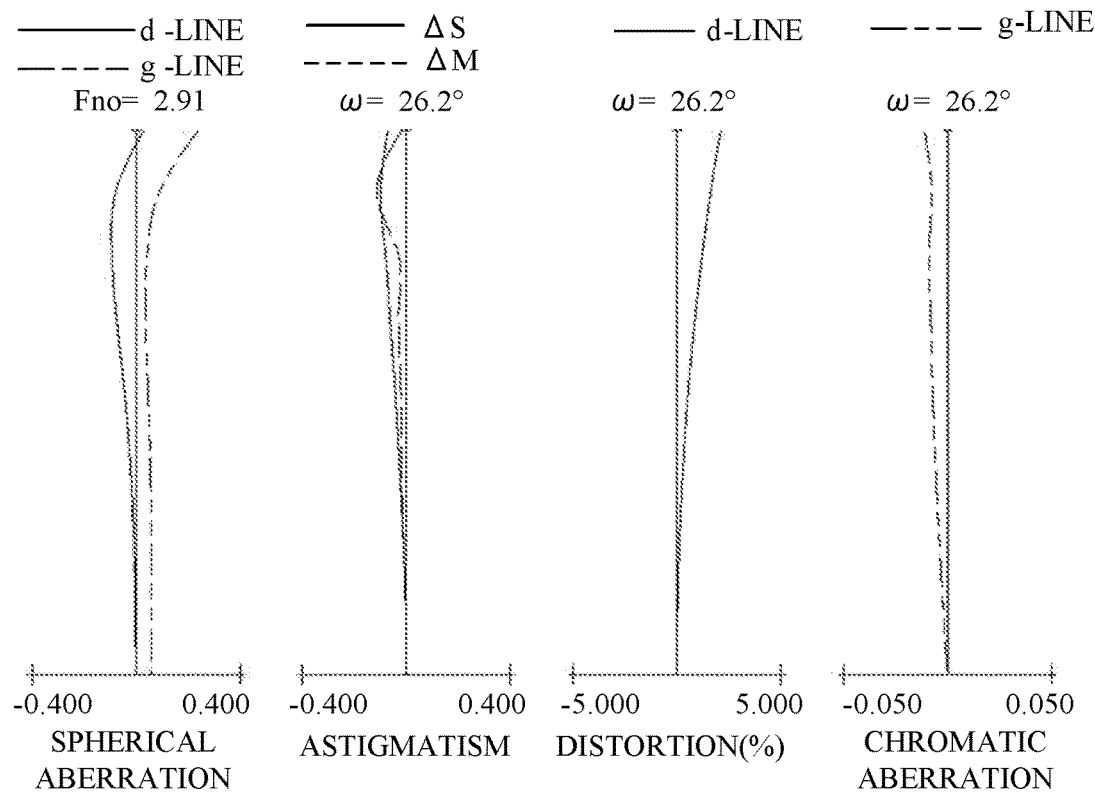
Figure 22C:
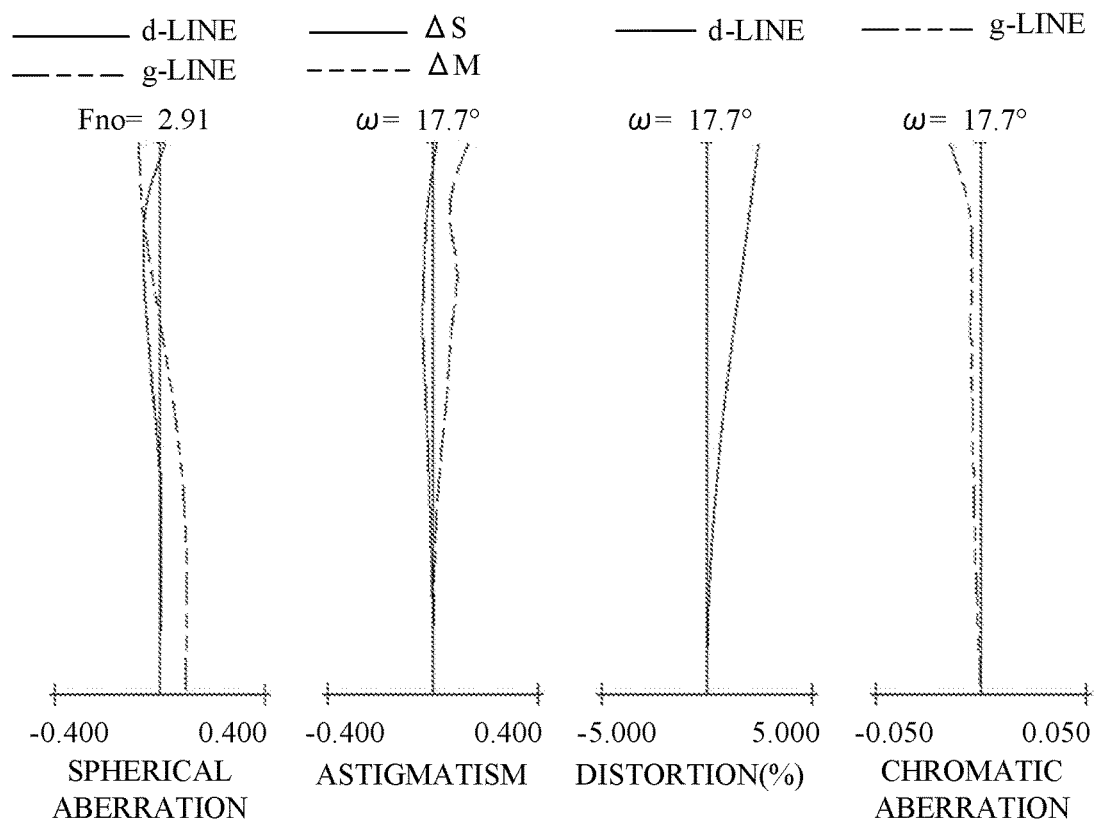
Figure 23A:
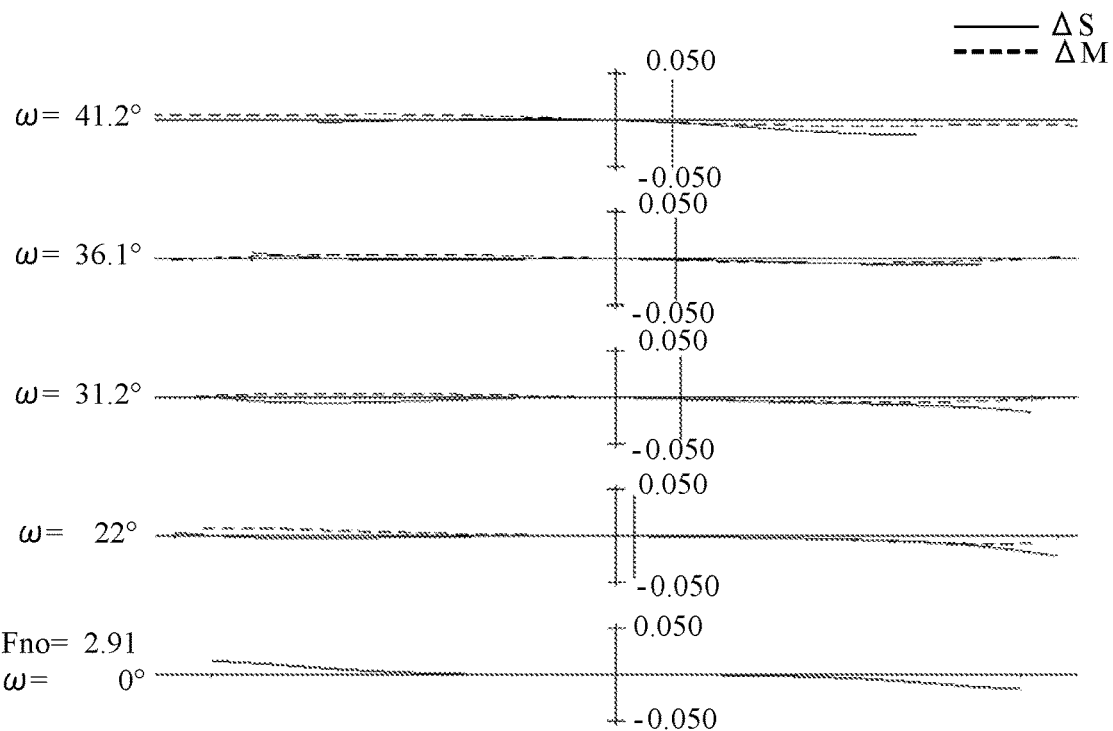
FIGS. 23A to 23C are lateral aberration diagrams at the wide-angle end, the middle zoom position, and the telephoto end according to Example 6.
Figure 23B:
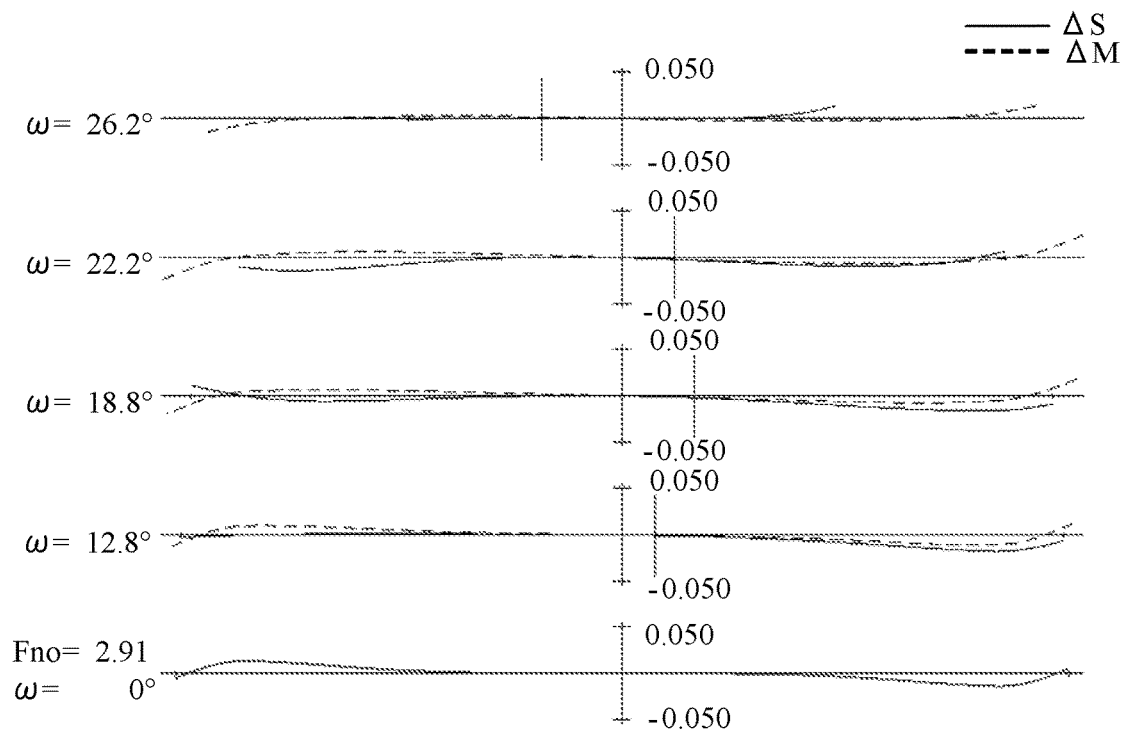
Figure 23C:
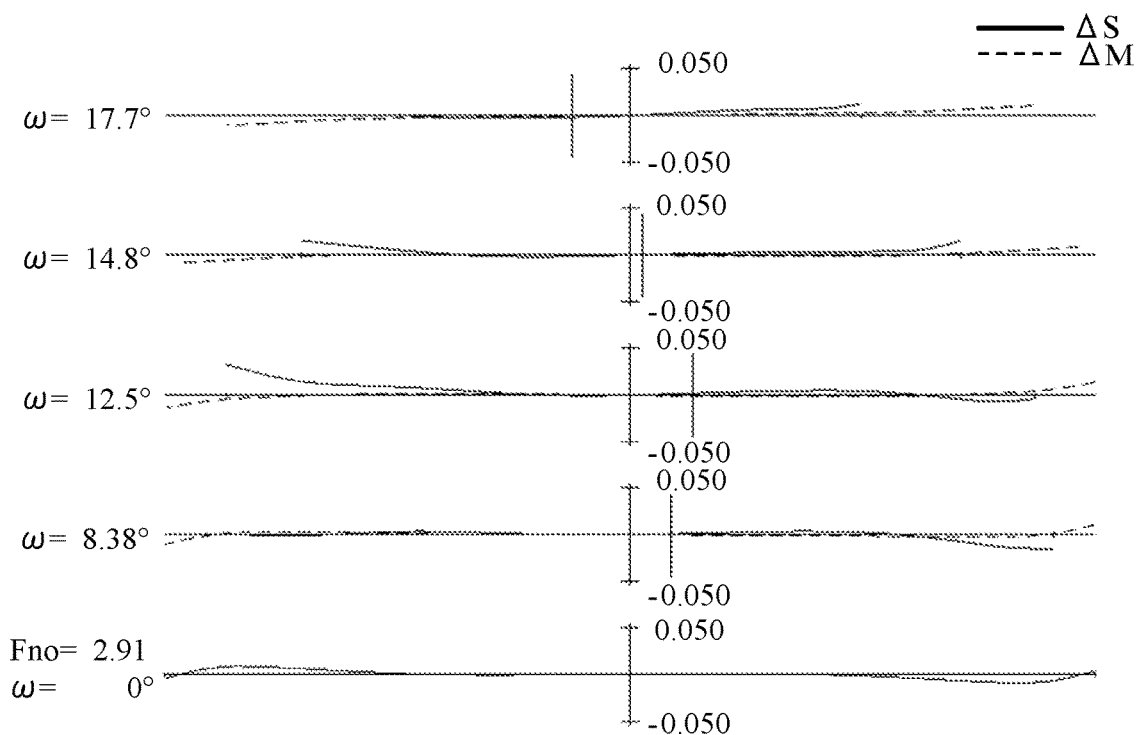
Figure 24A:
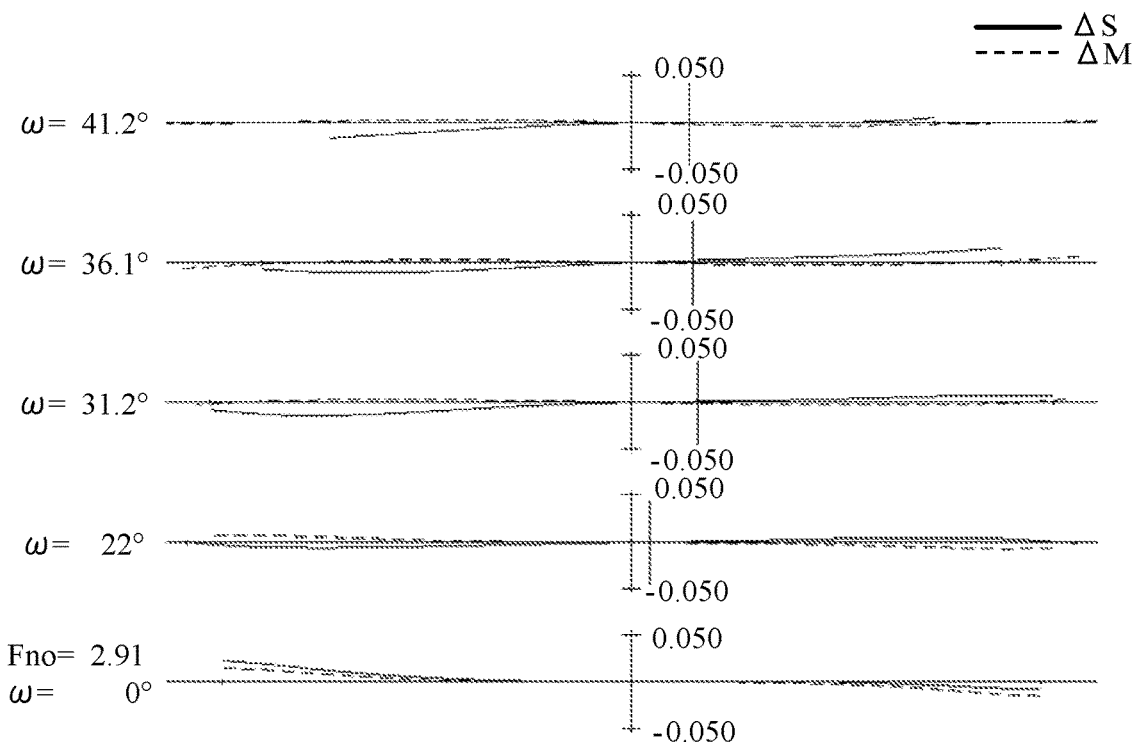
FIGS. 24A to 24C are lateral aberration diagrams at the wide-angle end, the middle zoom position, and the telephoto end during the 0.3° image stabilization according to Example 6.
Figure 24B:
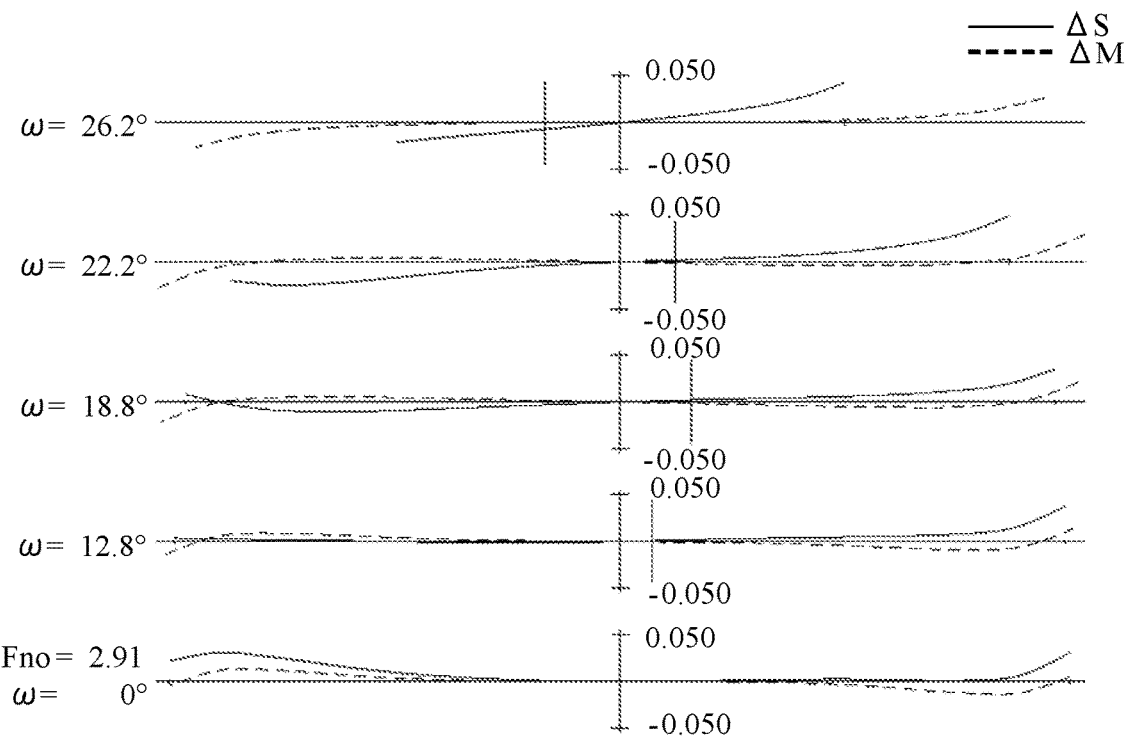
Figure 24C:
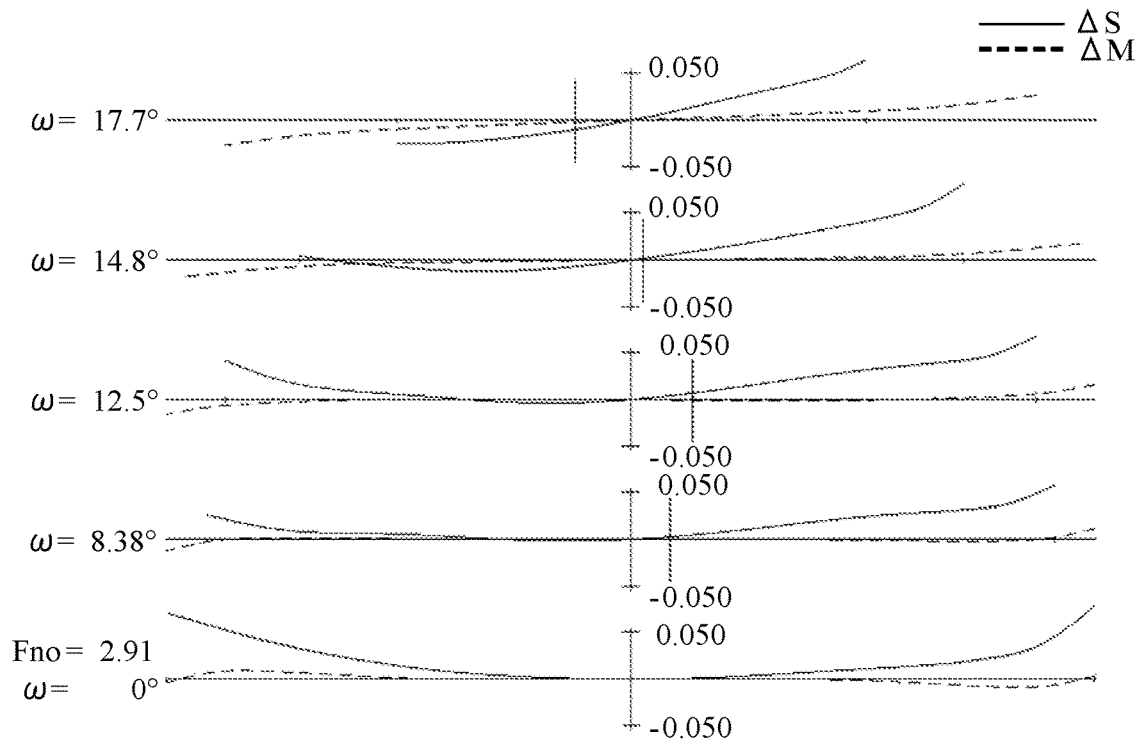

FIG. 21 is the lens sectional view at the wide-angle end of the zoom lens according to Example 6. FIGS. 22A to 22C are the longitudinal aberration diagrams at the wide-angle end, the middle zoom position, and the telephoto end, respectively, in the in-focus state on the infinity according to Example 6. FIGS. 23A to 23C are the lateral aberration diagrams at the wide-angle end, the middle zoom position, and the telephoto end, respectively, according to Example 6. FIGS. 24A to 24C are the lateral aberration diagrams at the wide-angle end, the middle zoom position, and the telephoto end, respectively, during the 0.3° image stabilization according to Example 6. The zoom lens according to Example 6 is a zoom lens with the zoom ratio of 2.91 and the F-number of 2.91.

Figure 25:
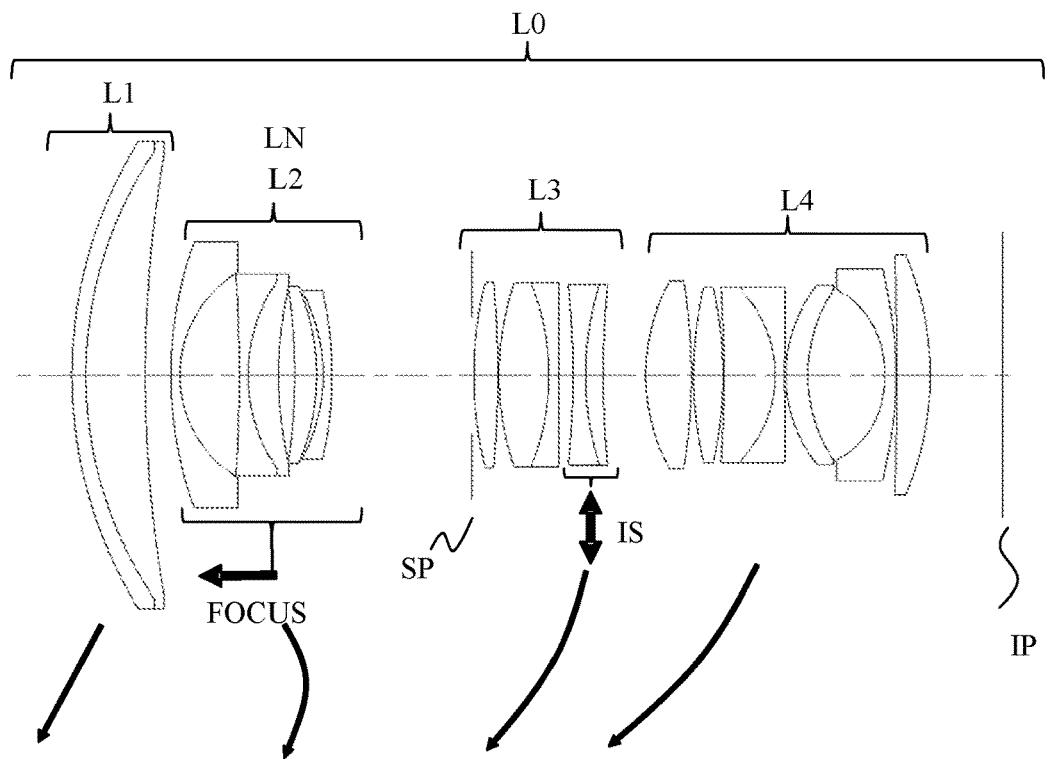
FIG. 25 is a lens sectional view at the wide-angle end of the zoom lens according to Example 7.
Figure 26A:
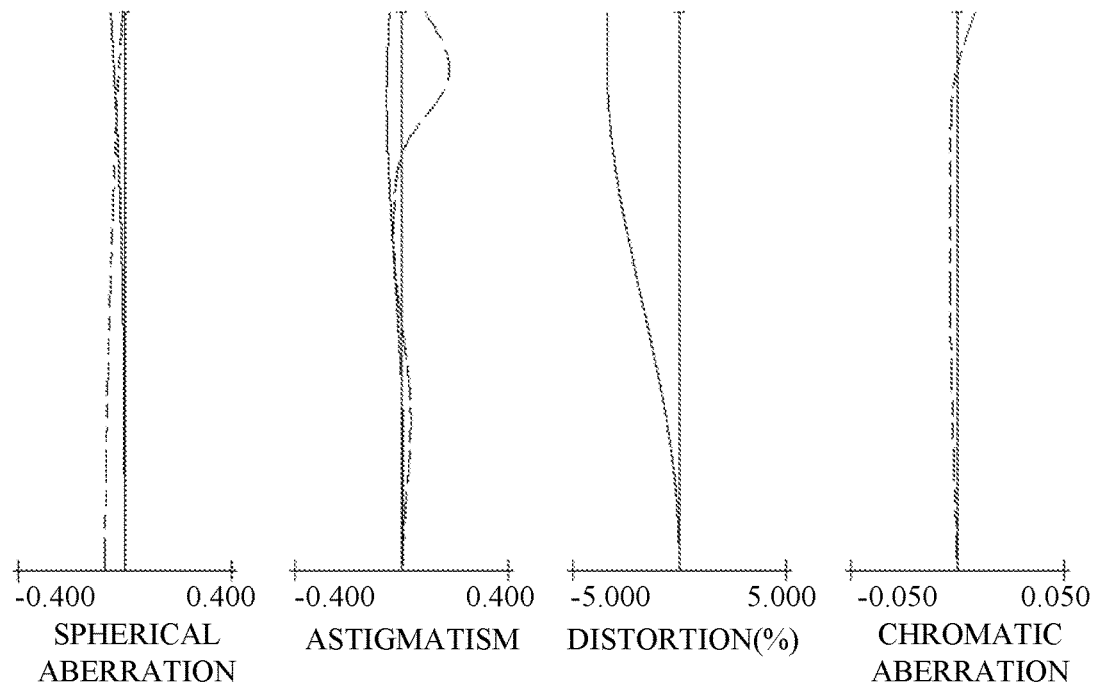
FIGS. 26A to 26C are longitudinal aberration diagrams at the wide-angle end, the middle zoom position, and the telephoto end according to Example 7.
Figure 26B:
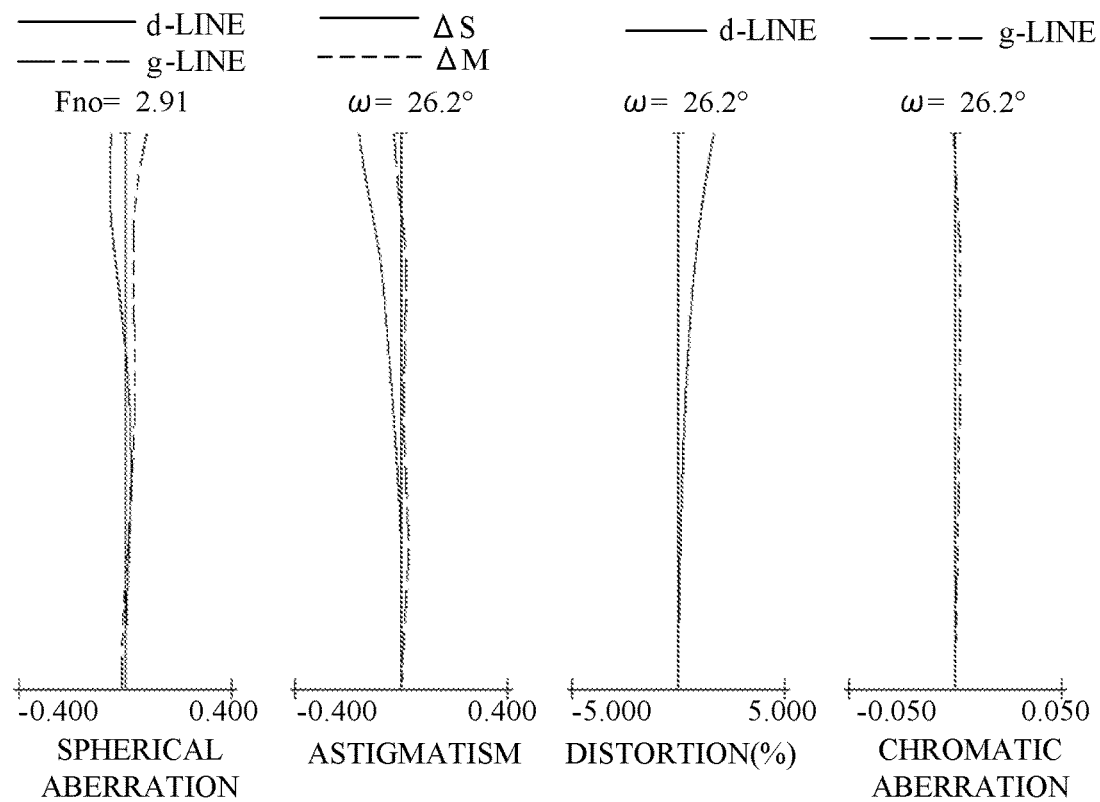
Figure 26C:
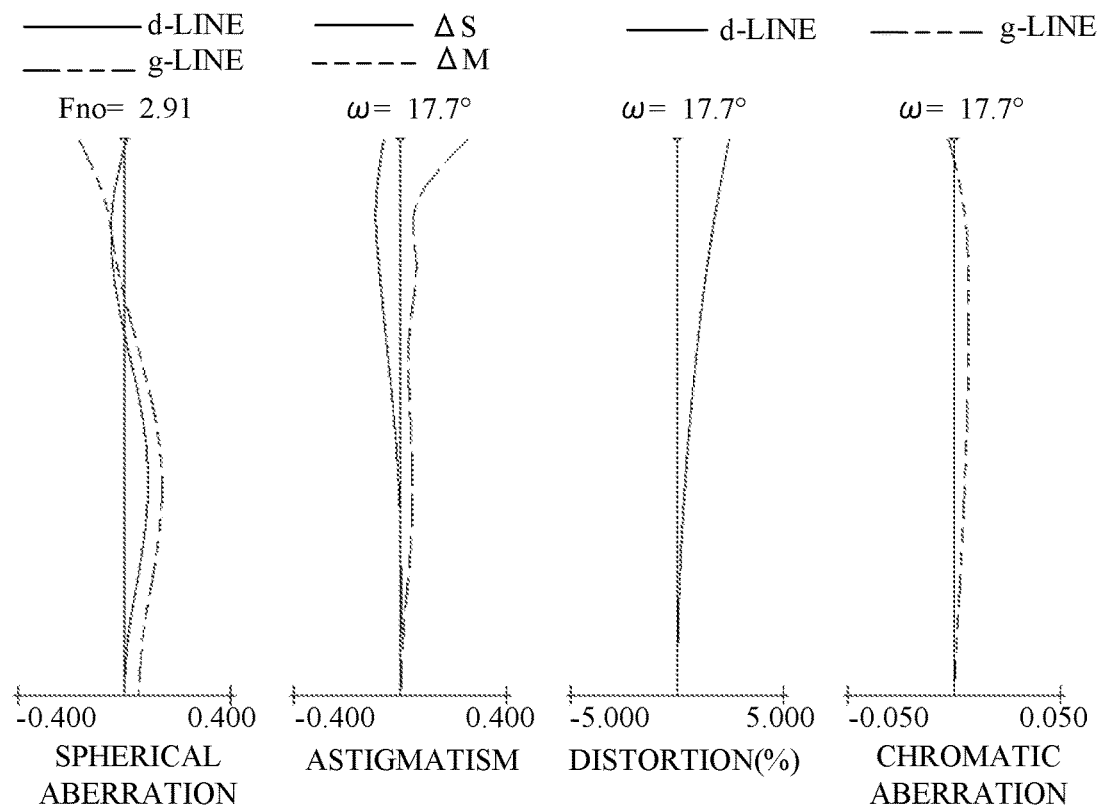
Figure 27A:
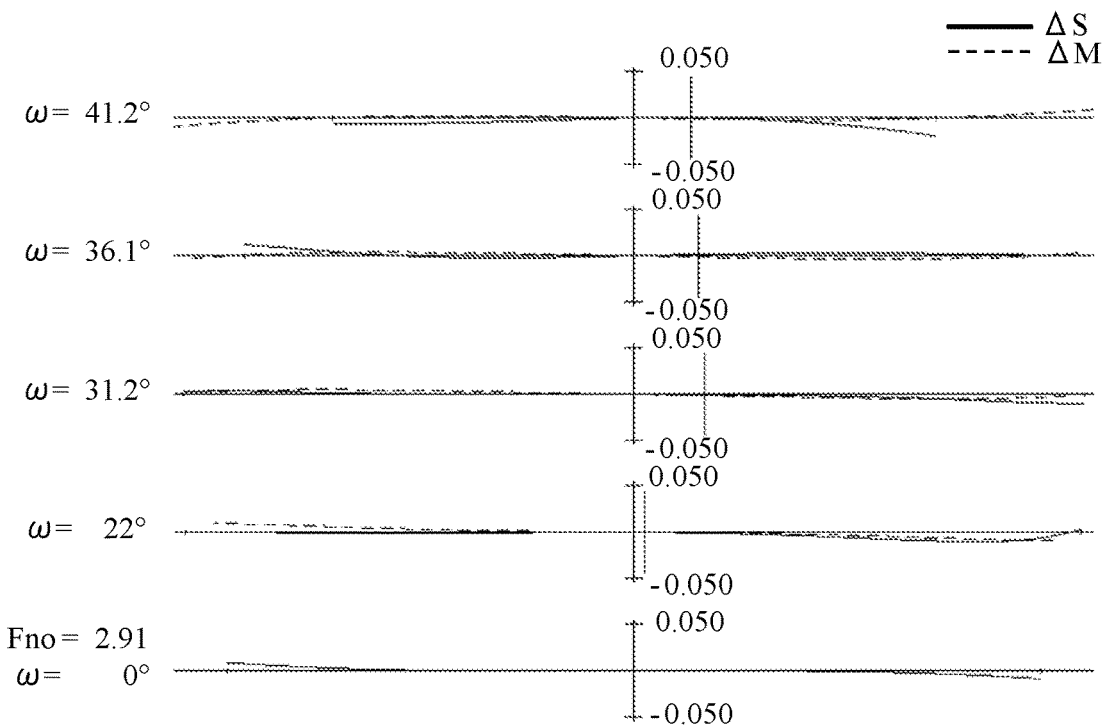
FIGS. 27A to 27C are lateral aberration diagrams at the wide-angle end, the middle zoom position, and the telephoto end according to Example 7.
Figure 27B:
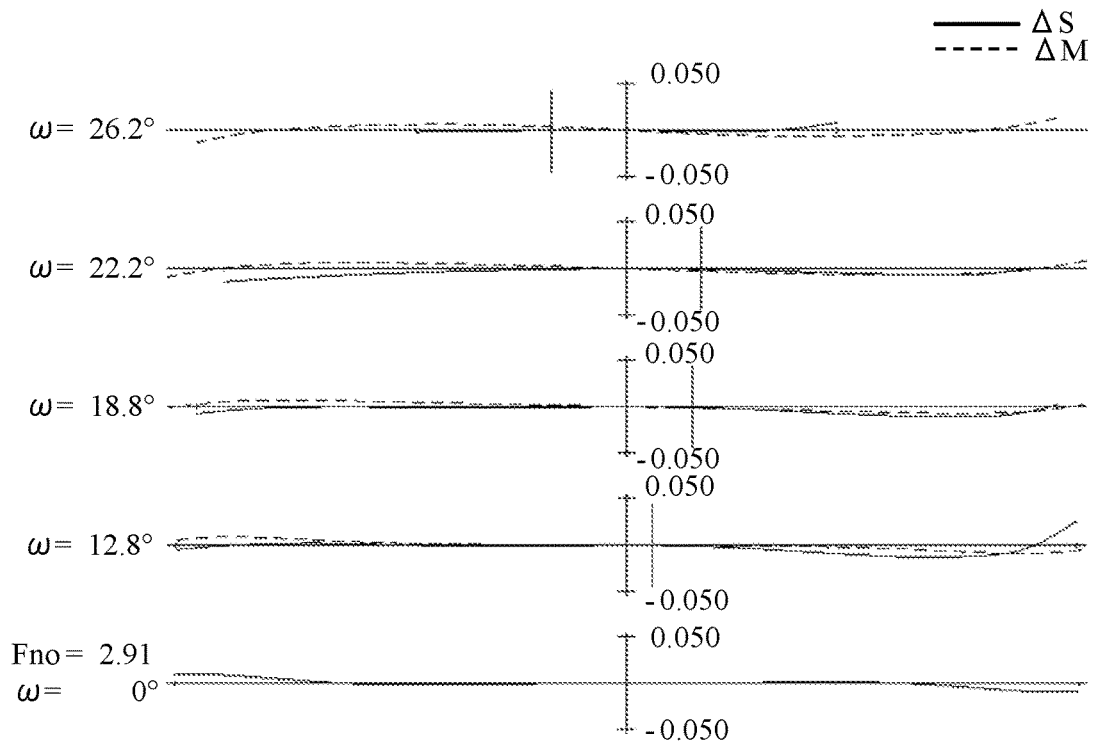
Figure 27C:
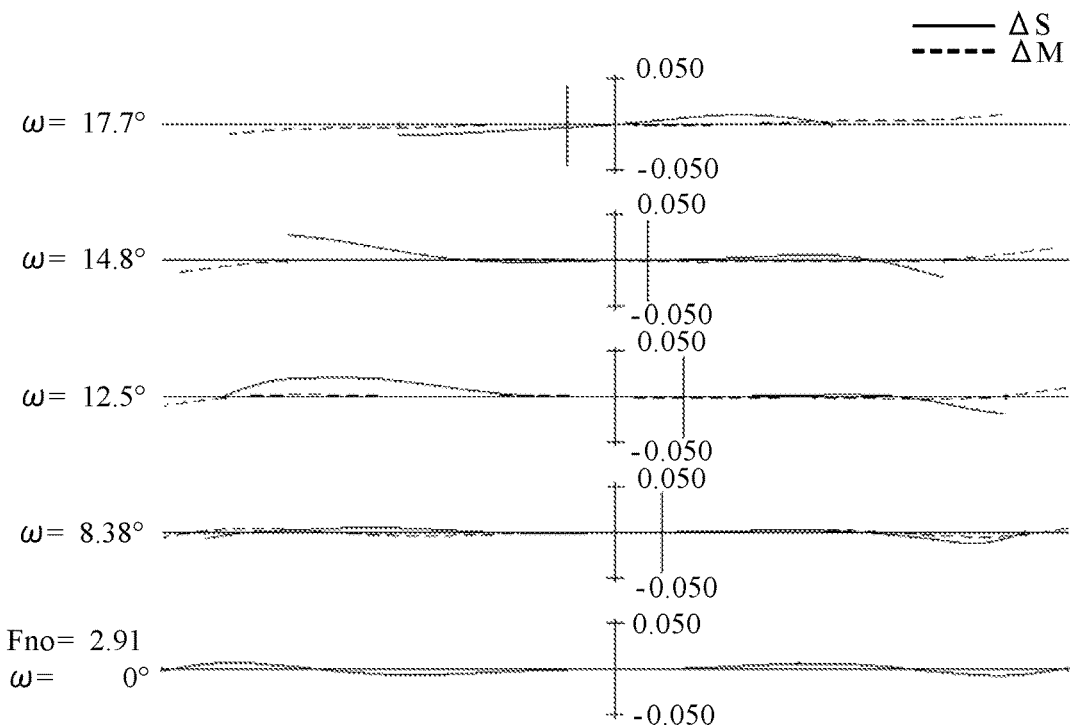
Figure 28A:
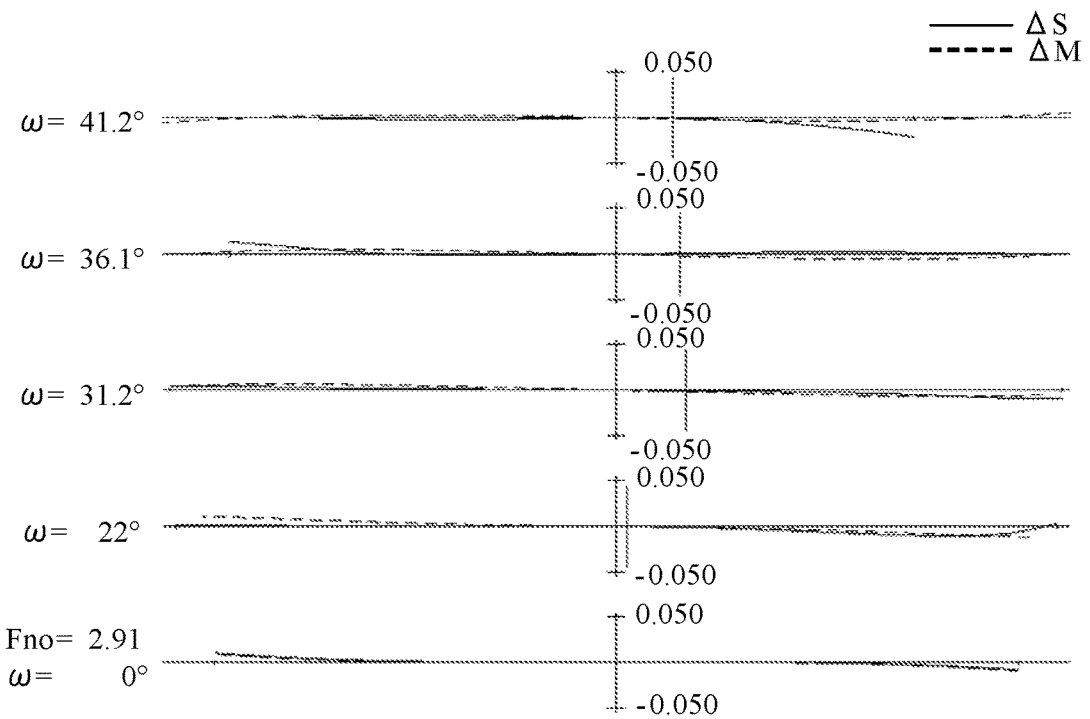
FIGS. 28A to 28C are lateral aberration diagrams at the wide-angle end, the middle zoom position, and the telephoto end during the 0.3° image stabilization according to Example 7.
Figure 28B:
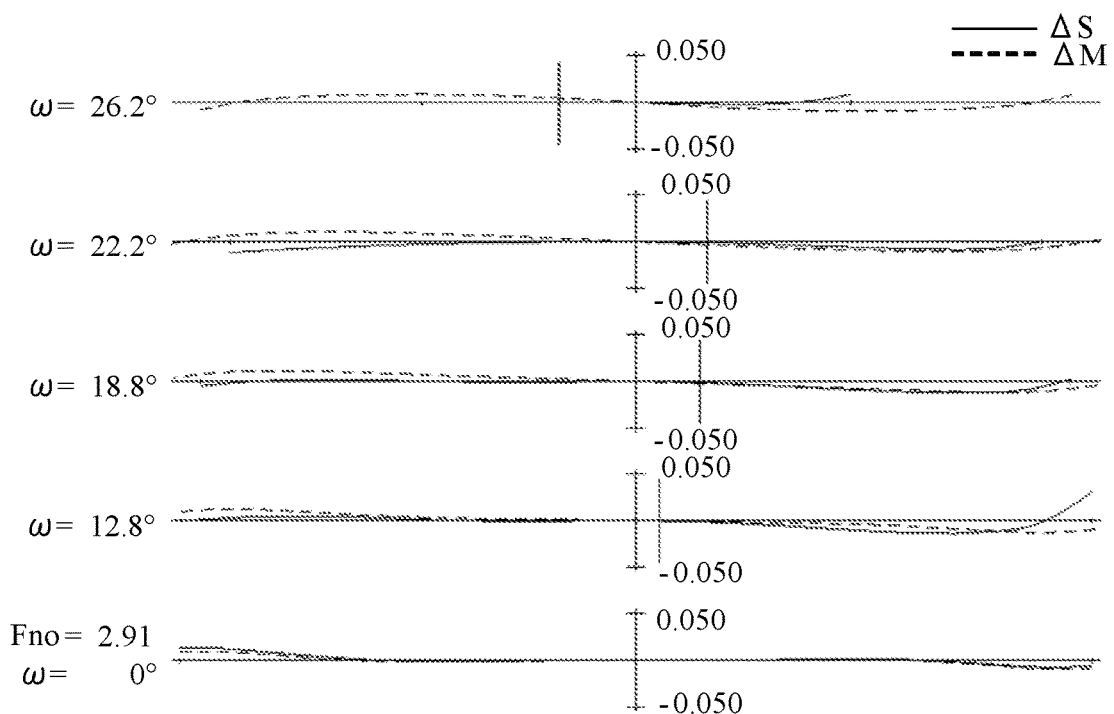
Figure 28C:
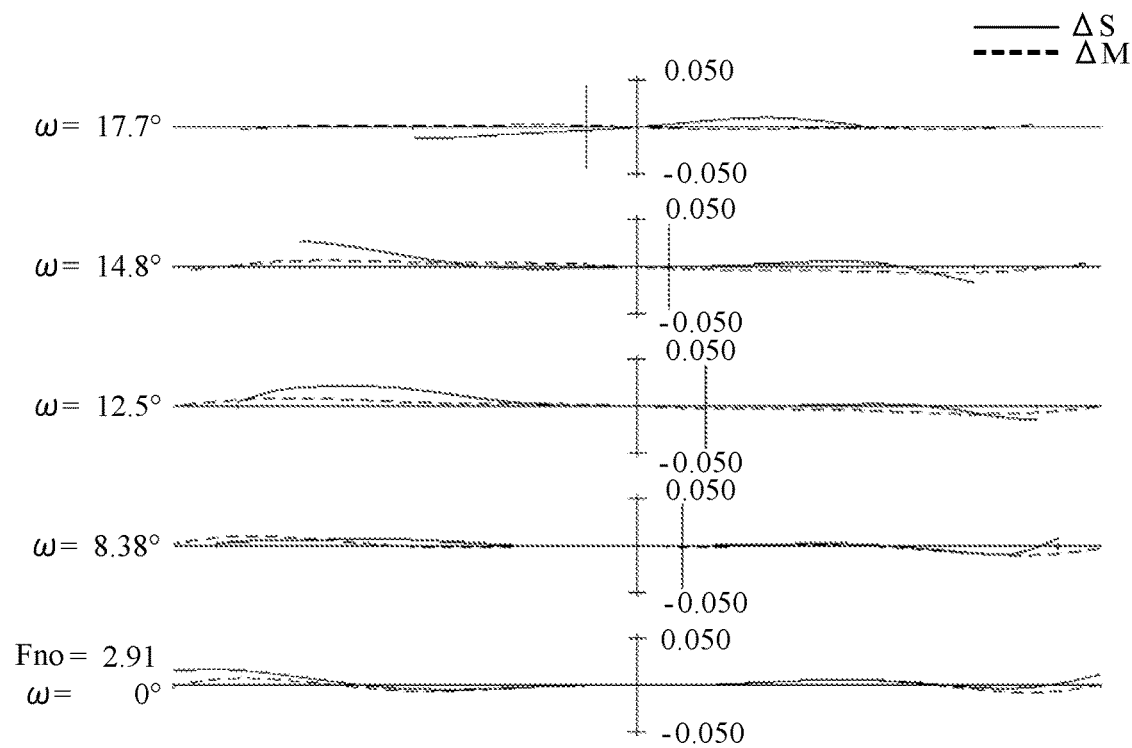

FIG. 25 is the lens sectional view at the wide-angle end of the zoom lens according to Example 7. FIGS. 26A to 26C are the longitudinal aberration diagrams at the wide-angle end, the middle zoom position, and the telephoto end, respectively, in the in-focus state on the infinity according to Example 7. FIGS. 27A to 27C are the lateral aberration diagrams at the wide-angle end, the middle zoom position, and the telephoto end, respectively, according to Example 7. FIGS. 28A to 28C are the lateral aberration diagrams at the wide-angle end, the middle zoom position, and the telephoto end, respectively, during the 0.3° image stabilization according to Example 7. The zoom lens according to Example 7 is a zoom lens with the zoom ratio of 2.91 and the F-number of 2.91.

The zoom lens in each example is the imaging optical system used for the imaging apparatus such as the digital still camera, the video camera, or the TV camera. The zoom lens in each example may also be used as a projection optical system for a projection apparatus (projector).

In each lens sectional view, the left side is the object side (front), and the right side is the image side (rear). In each lens sectional view, L0 is the zoom lens. When i is an order of the lens unit from the object side, Li represents an i-th lens unit. LR is a rear unit. LN is a lens unit having a negative refractive power included in the rear unit LR.

SP is an aperture stop (diaphragm) that determines (restricts) a light beam of an open F-number (Fno). IS an image stabilizing unit. IP is an image plane, at which an imaging plane of a solid-state image sensor (photoelectric conversion element) such as a CCD sensor and a CMOS sensor is placed, when the zoom lens L0 according to each example is used as the imaging optical system for the digital still camera or the video camera. An arrow indicates a moving trajectories of each lens unit during zooming from the wide-angle end to the telephoto end.

The arrow relating to focusing (FOCUS) indicates the moving direction of the lens unit during focusing from the infinity to a short distance.

In the aberration diagrams, Fno is the F-number, and ω is a half angle of view (degrees) that is an angle of view based on a ray tracing value. Spherical aberration diagrams illustrate spherical aberration amounts for the d-line (with a wavelength of 587.6 nm) and g-line (with a wavelength of 435.8 nm). In astigmatism diagrams, ΔS is a sagittal image plane for the d-line, and ΔM of a broken line is a meridional image plane for the d-line. Distortion diagrams illustrate distortion amounts for the d-line. Chromatic aberration diagrams illustrate chromatic aberration amounts for the g-line.

The zoom lens L0 according to each example includes, in order from the object side to the image side, a first lens unit L1 having a positive refractive power, a second lens unit L2 having a negative refractive power, a third lens unit L3 having a positive refractive power, and a fourth lens unit L4 having a positive refractive power. The zoom lenses L0 according to Examples 1 to 6 include a rear unit LR on the image side of the fourth lens unit. An image stabilizing unit IS that is a sub-unit having a negative refractive power as a whole in the third lens unit L3, compensates the image blur (camera shake) by moving orthogonally to the optical axis. An N-th lens unit LN moves during focusing.

In the positive lead type zoom lens, for effective use of the backfocus and a small overall lens length, the negative refractive powers of the lens units having the negative refractive powers disposed on the object side of the aperture stop SP may be weakened to some extent. Moreover, the positive refractive powers of the lens units having the positive refractive powers disposed on the image side of the aperture stop SP may be increased. Such setting would easily ensure the satisfactory optical performance over the entire zoom range.

In the zoom lens having a large aperture ratio, in order to obtain a satisfactory image stabilizing performance while the overall lens length and the lens barrel diameter are reduced, it is effective to perform the image stabilization using the image stabilizing unit IS in the third lens unit L3. This is particularly effective for the zoom lens having the aperture ratio (F-number) that exceeds 2.8.

It is advantageous for the smaller image stabilizing unit IS and the narrower light beam width entering the image stabilizing unit IS to set to be relatively weak, the negative refractive power of the second lens unit L2 which is a magnification varying lens unit and to increase the positive refractive power of the third lens unit.

Next follows a lens configuration of each example.

The zoom lens L0 according to Example 1 is a six-unit zoom lens that includes, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power. The third lens unit L3 includes an image stabilizing unit IS having a negative refractive power as a whole, which is a cemented lens including a negative lens and a positive lens, and an aperture stop SP. A rear unit LR includes the fifth lens unit L5 having the negative refractive power and the sixth lens unit L6 having the positive refractive power. The fifth lens unit L5 is an N-th lens unit LN that moves to the image side during focusing from the infinity to the short distance (near) side.

During zooming from the wide-angle end to the telephoto end, the first lens unit L1 moves linearly toward the object side, and the second lens unit L2 moves along a convex trajectory toward the image side. The third lens unit L3 and the fourth lens unit L4 move to the object side, narrowing the interval.

In Example 2, the zoom type, such as number of the lens units, the signs of the refractive power of each lens unit, and a moving condition of each lens unit during zooming, is the same as that according to Example 1. The image stabilizing unit, and the focusing method such as the lens units that move during focusing and the moving direction are the same as those according to Example 1.

The zoom lens L0 according to Example 3 is a six-unit zoom lens that includes, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a negative refractive power. The third lens unit L3 includes an image stabilizing unit IS having a negative refractive power as a whole, which is the cemented lens including a negative lens and a positive lens, and an aperture stop SP. A rear unit LR includes the fifth lens unit L5 having the negative refractive power and the sixth lens unit L6 having the negative refractive power. The fifth lens unit L5 is an N-th lens unit LN that moves to the image side during focusing from the infinity to the short distance (near) side.

During zooming from the wide-angle end to the telephoto end, the first lens unit L1 moves linearly toward the object side, and the second lens unit L2 moves along the convex trajectory toward the image side. The third lens unit L3 and the fourth lens unit L4 move to the object side, narrowing the interval.

In Example 4, the zoom type is the same as that according to Example 3. The image stabilizing unit, and the focusing method such as the lens units that move during focusing and the moving direction are the same as those according to Example 3.

The zoom lens L0 according to Example 5 is a seven-unit zoom lens that includes, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, a sixth lens unit L6 having a negative refractive power, and a seventh lens unit L7 having a positive refractive power. The third lens unit L3 includes an image stabilizing unit IS having a negative refractive power as a whole, which is the cemented lens including a negative lens and a positive lens, and an aperture stop SP. A rear unit LR includes the fifth lens unit L5 having the negative refractive power, the sixth lens unit L6 having the negative refractive power, and the seventh lens unit L7 having the positive refractive power. The fifth lens unit L5 is an N-th lens unit LN that moves to the image side during focusing from the infinity to the short distance (near) side.

During zooming from the wide-angle end to the telephoto end, the first lens unit L1 moves linearly toward the object side, and the second lens unit L2 moves along the convex trajectory toward the image side. The third lens unit L3 and the fourth lens unit L4 move to the object side, narrowing the interval. The fifth lens unit L5 to the seventh lens unit L7 move to the object side while drawing different trajectories respectively during the zooming.

The zoom lens L0 according to Example 6 is a six-unit zoom lens that includes, in order from the object side to the image side, a first lens unit L1 having a positive refractive power, a second lens unit L2 having a negative refractive power, a third lens unit L3 having a positive refractive power, a fourth lens unit L4 having a positive refractive power, the fifth lens unit L5 having a negative refractive power, and a sixth lens unit L6 having a positive refractive power. The third lens unit L3 includes an image stabilizing unit IS having a negative refractive power as a whole, which is the cemented lens including a negative lens and a positive lens, and an aperture stop SP. A sub-unit having a positive refractive power is disposed on the image side of the image stabilizing unit IS. A rear unit LR includes the fifth lens unit L5 having the negative refractive power and the sixth lens unit L6 having the positive refractive power. The fifth lens unit L5 is an N-th lens unit LN that moves to the image side during focusing from the infinity to the short distance (near) side.

During zooming from the wide-angle end to the telephoto end, the first lens unit L1 moves linearly toward the object side, and the second lens unit L2 moves along the convex trajectory toward the image side. The third lens unit L3 and the fourth lens unit L4 move to the object side, narrowing the interval.

The zoom lens L0 according to Example 7 is a four-unit zoom lens that includes, in order from the object side to the image side, a first lens unit L1 having a positive refractive power, a second lens unit L2 having a negative refractive power, a third lens unit L3 having a positive refractive power, and a fourth lens unit L4 having a positive refractive power. The second lens unit L2 is a focus unit that moves toward the object during focusing from the infinity to the short distance side. The third lens unit L3 includes an image stabilizing unit IS having a negative refractive power as a whole, which is the cemented lens including a negative lens and a positive lens, and the aperture stop SP.

The zoom lens L0 in each example includes, in order from the object side to the image side, the first lens unit L1 having the positive refractive power, the second lens unit L2 having the negative refractive power, the third lens unit L3 having the positive refractive power, and the fourth lens unit L4 having the positive refractive power. During zooming, the interval changes between adjacent lens units, and each of the first to fourth lens units moves. The image stabilizing unit IS in the third lens unit L3 moves orthogonally to the optical axis during the image stabilization.

The following conditional expressions are satisfied:

$$0.2 < f2^2/(f3 \times f4) < 1.0 \tag{1}$$

$$2.0 < \beta 4t/\beta 4w < 10.0 \tag{2}$$

where f2 is a focal length of the second lens unit L2, f3 is a focal length of the third lens unit L3, f4 is a focal length of the fourth lens unit L4, and β4w and β4t are lateral magnifications of the fourth lens unit L4 at the wide-angle end and the telephoto end.

A description will be given of technical significances of the conditional expressions (1) and (2). The conditional expression (1) sets the focal lengths of the second lens unit L2, the third lens unit L3, and the fourth lens unit L4 in order to reduce the overall lens length and the size of the image stabilizing unit IS.

If the negative focal length f2 is so large that the value is higher than the upper limit of the conditional expression (1), the negative refractive power of the second lens unit L2 becomes so weak that it is difficult to ensure a desired backfocus. If the negative refractive power of the second lens unit L2 is too weak, the Petzval sum of the entire lens system takes a large positive value and it is difficult to correct the field curvature and the astigmatism.

If the focal length f3 of the third lens unit L3 and the focal length f4 of the fourth lens unit L4 is so small that the value is higher than the upper limit of the conditional expression (1), the positive refractive powers of the third lens unit L3 and the fourth lens unit L4 become too strong that it is difficult to correct the image plane variation during zooming.

If the negative focal length f2 is so small that the value is lower than the lower limit of the conditional expression (1), the negative refractive power of the second lens unit L2 is too strong and the light beam diameter entering the third lens unit L3 becomes large. Thus, it is difficult especially for the zoom lens having the large aperture ratio to correct the high-order spherical aberration at the telephoto end. Further, if the negative refractive power of the second lens unit L2 is too strong, the backfocus becomes long, which may increase the overall lens length.

If the focal lengths of the third lens unit L3 and the fourth lens unit L4 are so large that the value is lower than the lower limit of the conditional expression (1), the positive refractive powers of the third lens unit L3 and the fourth lens unit L4 is too weak. Thus, it is necessary for a desired zoom ratio to ensure a large moving amount, which may increase the overall lens length.

The conditional expression (2) sets a ratio (magnification variation share ratio in zooming) of the lateral magnification β4w at the wide-angle end and the lateral magnification β4t at the telephoto end of the fourth lens unit L4 in order to reduce the diameter of the image stabilizing unit IS.

A large magnification variation share ratio of the fourth lens unit L4 causing the value to be higher than the upper limit of the conditional expression (2) is advantageous to a miniaturization of each unit on the image side of the image stabilizing unit IS, but the positive refractive power of the lens unit L4 increases and thus it is difficult to correct the spherical aberration and to suppress the image plane variation during the zooming. In addition, it becomes necessary to ensure a large moving amount for the fourth lens unit L4 during zooming, which may increase the overall lens length. The magnification variation share ratio of the third lens unit L3 becomes relatively small and the positive refractive power of the third lens unit L3 runs short, which may increase the size of the image stabilizing unit IS.

If the magnification variation share ratio of the fourth lens unit L4 is so small that the value is lower than the lower limit of the conditional expression (2), it is necessary for the desired zoom ratio to increase the magnification variation share ratio of another unit, such as the third lens unit L3. It is thus difficult to correct the aberrations within each unit. Since the positive refractive power of the third lens unit L3 can be made relatively larger, it is advantageous to reduce the size of the image stabilizing unit IS but during the image stabilization, the variation in the coma and the like become too large, which may degrade the image stabilization performance.

In each example, one or more of the following conditional expressions may be satisfied. Herein, fw and ft are focal lengths at the wide-angle end and the telephoto end of the zoom lens L0, respectively, fN is a focal length of the N-th lens unit, f1 is a focal length of the first lens unit L1, and skw is a backfocus at the wide-angle end. TTDw is a distance from the object side surface to the image plane at the wide-angle end of the first lens unit L1, and m3 and m4 are moving amounts during zooming from the wide-angle end to the telephoto end of the third lens unit L3 and the fourth lens unit L4, respectively. In addition, fis is a focal length of the image stabilizing unit IS, βist a lateral magnification of the image stabilizing unit IS at the telephoto end, and βrt is a combined lateral magnification at the telephoto end of all the lens units on the image side of the image stabilization group IS.

$$-1.5 < f2/fw < -0.7 \tag{3}$$

$$2.0 < f1/fw < 10.0 \tag{4}$$

$$0.1 < f4/ft < 0.7 \tag{5}$$

$$3.0 < TTDw/skw < 20.0 \tag{6}$$

$$0.3 < m3/m4 < 1.0 \tag{7}$$

$$1.5 < f3/fw < 8.0 \tag{8}$$

$$-10.0 < fis/f3 < -0.5 \tag{9}$$

$$-3.0 < (1-\beta ist)\beta rt < -0.35 \tag{10}$$

Next follows a description of the technical significances of the conditional expressions (3) to (10). The conditional expression (3) properly sets the focal length f2 of the second lens unit L2 having the negative refractive power that is the magnification varying lens unit, so as to obtain a high optical performance while reducing the overall lens length.

If the negative focal length f2 of the second lens unit L2 is so large that the value is lower than the lower limit of the conditional expression (3), the backfocus becomes short, but the moving amount of the second lens unit L2 and thus the overall lens length increase in order to obtain the desired zoom ratio. Since the negative refractive power of the entire system also becomes weaker, the Petzval sum becomes stronger in the positive direction and the astigmatism and the curvature of field increase.

If the focal length fw of the zoom lens L0 at the wide-angle end is so small that the value is lower than the lower limit of the conditional expression (3), the negative refractive power on the object side of the aperture stop SP increases for the wider angle of view, the optical performance decreases, and an effective diameter of the front lens increases.

If the negative focal length f2 of the second lens unit L2 is so small that the value is higher than the upper limit of the conditional expression (3), the negative refractive power of the second lens unit L2 is too strong, the outer diameter of the third lens unit L3 increases, and it becomes difficult to reduce the size of the zoom lens L0. If the negative focal length f2 of the second lens unit L2 is small, it is necessary to increase the positive refractive powers of the third lens unit L3 and the subsequent lens units more than necessary in order to reduce the overall lens length at the wide-angle end. As a result, the axial aberration such as the spherical aberration increases, and it becomes difficult to correct this aberration.

The conditional expression (4) specifies the focal length fw of the zoom lens L0 at the wide-angle end and the focal length f1 of the first lens unit L1 in order to obtain a necessary zoom ratio.

If the positive focal length f1 of the first lens unit L1 is so large that the value is higher than the upper limit of the conditional expression (4), it is easy to correct a lateral chromatic aberration at the wide-angle end and an on-axis chromatic aberration at the telephoto end. However, the moving amount of the first lens unit L1 increases during zooming, and thus the overall lens length increases.

If the positive focal length f1 of the first lens unit L1 is so small that the value is lower than the lower limit of the conditional expression (4), it is easy to reduce the size of the zoom lens L0, but it is difficult to well correct the spherical aberration, the coma aberration, or the like, with small number of lenses.

If the focal length fw of the zoom lens L0 at the wide-angle end is so large that the value is lower than the lower limit of the conditional expression (4), it is difficult to ensure the desired zoom ratio.

The conditional expression (5) specifies the focal length f4 of the fourth lens unit L4 in order to obtain the necessary zoom ratio and the small focus lens unit.

If the focal length f4 of the fourth lens unit L4 is so large that the value is higher than the upper limit of the conditional expression (5), the positive refractive power of the fourth lens unit L4 is too weak, the incident light beam entering the following N-th lens unit LN becomes wider, and thus it is difficult to make smaller the N-th lens unit LN. Further, in order to obtain a desired zoom magnification, it is necessary to ensure the long moving amount for the fourth lens unit L4 during zooming, which may increase the overall lens length.

If the focal length ft at the telephoto end of the zoom lens L0 is so small that the value is higher than the upper limit of the conditional expression (5), it is difficult to obtain a desired field of view at the telephoto end.

If the focal length f4 of the fourth lens unit L4 is so small that the value is lower than the lower limit of the conditional expression (5), the positive refractive power of the fourth lens unit L4 increase and contribute to the miniaturization of the following N-th lens unit LN, but the aberration generated in the fourth lens unit L4 increases. In particular, in order to correct the spherical aberration, it is necessary to increase the number of lenses in the fourth lens unit L4, which may increase the size of the zoom lens L0.

The conditional expression (6) is a conditional expression for properly setting the overall lens length and the backfocus in order to obtain the zoom lens having a short overall lens length.

If the overall lens length at the wide-angle end is so large that the value is higher than the upper limit of the conditional expression (6), it may increase the overall lens length.

If the backfocus skw is so small that the value is higher than the upper limit of the conditional expression (6), it is difficult to mechanically dispose the connection between the zoom lens and the camera.

If the overall lens length at the wide-angle end is so small that the value is lower than the lower limit of the conditional expression (6), the positive refractive power of the entire zoom lens L0 is too high, making it difficult to control the Petzval sum and to obtain the desired optical performance.

If the backfocus skw is so large that the value is lower than the lower limit of the conditional expression (6), it may increase the overall lens length.

The conditional expression (7) specifies the ratio of the moving amount of the third lens unit L3 and the fourth lens unit L4 during zooming in order to maintain the satisfactory optical performance over the entire zoom range.

If the moving amount m3 of the third lens unit L3 is so large that the value is higher than the upper limit of the conditional expression (7), the third lens unit L3 and the fourth lens unit L4 move in the spreading direction toward the telephoto end, which may not maintain the desired zoom ratio.

If the moving amount m3 of the third lens unit L3 is so small that the value is lower than the lower limit of the conditional expression (7), it is easy to control the variation of the field curvature that occurs during zooming. However, the third lens unit L3 and the fourth lens unit L4 need to be separated greatly at the wide-angle end, which may increase the overall lens length.

The conditional expression (8) specifies the refractive power of the third lens unit L3 in order to reduce the overall lens length and the lens diameter of the image stabilizing unit IS.

If the focal length f3 of the third lens unit L3 is so large that the value is higher than the upper limit of the conditional expression (8), the light beam that enters the image stabilizing unit IS having the negative refractive power does not sufficiently converge, and the lens diameter of the image stabilizing unit IS increases, which may increase the zoom lens L0. In addition, in order to obtain the desired zoom magnification, it is necessary to increase the moving amount of the third lens unit L3 during zooming, which may increase the overall lens length.

If the focal length fw of the zoom lens L0 at the wide-angle end is so small that the value is higher than the upper limit of the conditional expression (8), the front lens diameter may increase.

If the focal length f3 of the third lens unit L3 is so small that the value is lower than the lower limit of the conditional expression (8), the refractive power of the third lens unit L3 is too strong. Although the lens diameter of the image stabilizing unit IS becomes smaller, the spherical aberration and the coma aberration generated in the third lens unit L3 may not be corrected in the entire lens system. Since the light beam entering the image stabilizing unit IS has a steep angle, it is difficult to ensure the image stabilizing performance.

If the focal length fw of the zoom lens L0 at the wide-angle end is so large that the value is lower than the lower limit of the conditional expression (8), it is difficult to obtain the desired field of view at the wide-angle end.

The conditional expression (9) specifies the focal length fis of the image stabilizing unit IS and the focal length f3 of the third lens unit L3 in order to acquire the compact image stabilizing unit IS having the satisfactory performance during the image stabilization.

If the focal length fis of the image stabilizing unit IS is so small that the value is higher than the upper limit of the conditional expression (9), the refractive power of the image stabilizing unit IS is too strong to suppress the coma aberration and the field curvature variations generated during the image stabilization.

If the focal length f3 of the third lens unit L3 is so large that the value is higher than the upper limit of the conditional expression (9), the refractive power of the third lens unit L3 becomes weaker, the magnification varying effect smaller, the overall length may increase.

If the focal length fis of the image stabilizing unit IS is so large that the value is lower than the lower limit of the conditional expression (9), the image stabilizing unit IS needs to increase the moving amount in the orthogonal direction to the optical axis during the image stabilization and it is difficult to reduce the size of the zoom lens L0.

If the focal length f3 of the third lens unit L3 is so small that the value is lower than the lower limit of the conditional expression (9), the refractive power of the third lens unit L3 becomes too strong, the spherical aberration and the coma aberration become remarkably large, and it becomes difficult to obtain the satisfactory optical performance.

The conditional expression (10) specifies the lateral magnification $\beta is$ of the image stabilizing unit IS at the telephoto end and the combined lateral magnification $\beta rt$ of all lens units on the image side of the image stabilizing unit IS at the telephoto end, in order to acquire the compact image stabilizing unit IS having the satisfactory performance during the image stabilization. The conditional expression (10) determines the decentering sensitivity that specifies a shift amount of the image on the image plane relative to the moving amount of the image stabilizing unit IS in the optical axis direction.

If the decentering sensitivity of the image stabilizing unit IS is so small that the value is lower than the lower limit of the conditional expression (10), the moving amount of the image stabilizing unit IS that moves orthogonal to the optical axis during the image stabilization is too large and the smaller lens barrel diameter may not be achieved.

If the decentering sensitivity of the image stabilizing unit IS is so large that the value is higher than the upper limit of the conditional expression (10), the moving amount of the image stabilizing unit IS that moves orthogonal to the optical axis during the image stabilization becomes smaller, it is advantageous for a smaller size of the image stabilizing unit IS but the coma aberration and the field curvature variation during the image stabilization becomes too large.

In each example, numerical ranges of the conditional expressions (1) to (10) may be set as in the following conditional expressions (1a) to (10a).

$$0.2 < f2^2/(f3 \times f4) < 0.5 \quad (1a)$$

$$2.0 < \ominus 4t/\beta 4w < 9.5 \quad (2a)$$

$$-1.3 < f2/fw < -0.6 \quad (3a)$$

$$2.8 < f1/fw < 8.0 \quad (4a)$$

$$0.15 < f4/ft < 0.65 \quad (5a)$$

$$4.0 < TTDw/skw < 17.0 \quad (6a)$$

$$0.4 < m3/m4 < 0.9 \quad (7a)$$

$$1.8 < f3/fw < 6.0 \quad (8a)$$

$$-5.0 < fis/f3 < -0.6 \quad (9a)$$

$$-2.00 < (1-\beta ist)\beta rt < -0.37 \quad (10a)$$

In each example, he numerical ranges of the conditional expressions (1) to (10) may be set as in the following conditional expressions (1b) to (10b).

$$0.21 < f2^2/(f3 \times f4) < 0.35 \quad (1b)$$

$$2.30 < \beta 4t/\beta 4w < 9.10 \quad (2b)$$

$$-1.2 < f2/fw < -0.5 \quad (3b)$$

$$3.2 < f1/fw < 7.5 \quad (4b)$$

$$0.2 < f4/ft < 0.6 \quad (5b)$$

$$6.0 < TTDw/skw < 15.0 \quad (6b)$$

$$0.60 < m3/m4 < 0.85 \quad (7b)$$

$$2.2 < f3/fw < 4.0 \quad (8b)$$

$$-2.5 < fis/f3 < -0.8 \quad (9b)$$

$$-1.5 < (1-\beta ist)\beta rt < -0.4 \quad (10b)$$

In order to suppress the chromatic aberration during the image stabilization, the image stabilizing unit IS may include at least one negative lens and one positive lens. For the reduced size of the image stabilizing unit IS, and suppressed amounts of the chromatic aberration variation, the coma aberration, and the field curvature variation during the image stabilization, the light beam which converges and enters the image stabilizing unit IS may be converted into substantially parallel light using the negative lens. Hence, the image stabilizing unit IS may be two-lens unit or the negative lens and the positive lens in order from the object side to the image side. The two-lens unit may be the cemented lens in order to simplify the image stabilizing unit IS.

In order to obtain the higher zoom ratio and the wider angle of view while the size of the zoom lens L0 is reduced, the number of lenses may be smaller in the first lens unit L1. Thereby, the incident height of the off-axis light beam passing through the first lens unit L1 decreases and can reduce the effective diameter of the first lens unit L1. Thus, in each example, the number of lenses of the first lens unit L1 may be three or less.

The second lens unit L2 may include, in order from the object side to the image side, two negative lenses and one positive lens for increasing the angle of view. The second lens unit L2 thus has the negative refractive power, making it easy to increase the angle of view.

This embodiment properly corrects a wide variety of off-axis aberrations, in particular, the astigmatism and the distortion, by properly setting the refractive power of the rear unit LR. The spherical aberration and the coma aberration are effectively corrected when the wider angle of view and the higher zoom ratio are attempted.

Each example configures each element as described above and provides a zoom lens having a high image stabilizing performance while reducing the overall lens length and the lens barrel diameter.

Now, numerical examples 1 to 7 corresponding to Examples 1 to 7 will be given. In surface data according to each numerical example, r represents a curvature radius of each optical surface, and d (mm) represents an on-axis interval (distance on the optical axis) between the m-th surface and the (m+1)-th surface, where m is the order of the surface counted from the light incident side. nd represents a refractive index of each optical member to the d-line, and vd represents an Abbe number of the optical element. Where Nd, NF, NC, and Ng are the refractive indexes to the Fraunhofer d-line (587.6 nm), F-line (486.1 nm), C-line (656.3 nm), and g-line (435.8 nm), the Abbe number vd of a certain material is expressed by the following expression:

$$vd=(Nd-1)/(NF-NC)$$

In each numerical example, d, the focal length (mm), the F-number, and the half angle of view (degree) are values when the optical system according to each example focuses on an object at infinity. "Backfocus" is a distance on the optical axis from a last lens surface (lens surface closest to the image side) to a paraxial image plane, expressed as air converted length. The "overall lens length" is a length obtained by adding the backfocus to a distance on the optical axis from the front lens surface (lens surface closest to the object side) to the last lens surface of the zoom lens. The "lens unit" is not limited to a meaning of a plurality of lenses, but includes a single lens.

When the optical surface is an aspherical surface, a symbol * is attached to the right side of the surface number. Where X is displacement amount from a surface vertex in the optical axis direction, h is a height from the optical axis in the direction orthogonal to the optical axis, R is a paraxial curvature radius, k is a conic constant, and A4, A6, A8, A10, and A12 are aspherical coefficients of respective orders, the aspherical shape will be expressed by the following expression:

$$x=(h^2/R)/[1+\{1-(1+k)(h/R)^2\}^{1/2}+A4 \times h^4+A6 \times h^6+A8 \times h^8+A10 \times h^{10}+A12 \times h^{12}$$

Note that "e±XX" in each aspheric coefficient indicates "×10±XX".

NUMERICAL EXAMPLE 1

UNIT mm
Surface Data

| Surface Number | r | d | nd | vd |
|---|---|---|---|---|
| 1 | 211.125 | 2.10 | 1.80810 | 22.8 |
| 2 | 80.660 | 6.03 | 1.77250 | 49.6 |
| 3 | 248.854 | 0.15 | | |
| 4 | 57.558 | 6.97 | 1.77250 | 49.6 |
| 5 | 160.440 | (Variable) | | |
| 6 | 66.217 | 1.40 | 1.88300 | 40.8 |
| 7 | 18.113 | 8.41 | | |
| 8 | −206.710 | 1.20 | 1.61800 | 63.4 |
| 9 | 22.688 | 4.36 | 1.85478 | 24.8 |
| 10 | 79.196 | 4.20 | | |
| 11 | −35.317 | 1.20 | 1.58313 | 59.4 |
| 12* | −312.513 | 0.43 | | |
| 13 | 910.041 | 5.47 | 1.59270 | 35.3 |
| 14 | −19.928 | 1.10 | 1.88300 | 40.8 |
| 15 | −47.138 | (Variable) | | |
| 16(Diaphragm) | ∞ | 0.40 | | |
| 17 | 81.194 | 4.45 | 1.83481 | 42.7 |
| 18 | −54.244 | 0.15 | | |
| 19 | 41.217 | 7.25 | 1.49700 | 81.5 |
| 20 | −32.257 | 1.10 | 2.00069 | 25.5 |
| 21 | −293.896 | 2.41 | | |
| 22* | −71.464 | 1.75 | 1.76802 | 49.2 |
| 23 | 64.990 | 1.91 | 1.80810 | 22.8 |
| 24 | 199.742 | (Variable) | | |
| 25 | 30.855 | 6.56 | 1.59522 | 67.7 |
| 26 | −85.643 | 0.35 | | |
| 27 | 38.493 | 1.20 | 1.73800 | 32.3 |
| 28 | 22.868 | 7.83 | 1.53775 | 74.7 |
| 29 | −71.877 | 0.15 | | |
| 30* | −4310.465 | 1.70 | 1.85400 | 40.4 |
| 31* | 109.508 | (Variable) | | |
| 32 | 53.194 | 0.90 | 1.80400 | 46.6 |
| 33 | 22.891 | (Variable) | | |
| 34* | −42.821 | 1.70 | 1.58313 | 59.4 |
| 35* | −2156.781 | 0.15 | | |
| 36 | 344.261 | 3.20 | 2.00100 | 29.1 |
| 37 | −88.670 | (Variable) | | |
| Image Plane | ∞ | | | |

Aspheric Data

Twelfth Surface $K = 0.00000e+000$ $A\,4 = -5.69442e-006$ $A\,6 = -2.29053e-009$ $A\,8 = -4.72363e-011$
$A10 = 4.65343e-013$ $A12 = -1.99227e-015$ Twenty-second Surface $K = 0.00000e+000$ $A\,4 = 1.87606e-006$ $A\,6 = 1.45872e-009$ $A\,8 = 2.78338e-011$
$A10 = -2.10980e-013$ $A12 = 3.98590e-016$ Thirties Surface $K = 0.00000e+000$ $A\,4 = -2.01869e-005$ $A\,6 = 6.17344e-008$ $A\,8 = -2.64177e-010$
$A10 = -2.98832e-013$ $A12 = 2.64092e-015$ Thirty-first Surface $K = 0.00000e+000$ $A\,4 = 1.63774e-006$ $A\,6 = 9.32838e-008$ $A\,8 = -2.34772e-010$
$A10 = -7.39973e-013$ $A12 = 4.51086e-015$ Thirty-fourth Surface $K = 0.00000e+000$ $A\,4 = -2.51719e-005$ $A\,6 = 1.25180e-007$ $A\,8 = -5.32709e-010$
$A10 = 5.08044e-013$ $A12 = 7.30860e-016$ Thirty-fifth Surface $K = 0.00000e+000$ $A\,4 = -2.60571e-005$ $A\,6 = 1.26402e-007$ $A\,8 = -6.23562e-010$
$A10 = 1.45147e-012$ $A12 = -1.39940e-015$

Various Data
Zoom Ratio 2.74

| | Wide Angle | Middle | Telephoto |
|---|---|---|---|
| Focal Length | 24.72 | 43.75 | 67.65 |
| F-number | 2.91 | 2.91 | 2.91 |

-continued

| UNIT mm | | | |
|---|---|---|---|
| Surface Data | | | |
| Half Angle of View | 41.19 | 26.31 | 17.74 |
| Image Height | 21.64 | 21.64 | 21.64 |
| Overall Lens Length | 144.34 | 158.19 | 172.04 |
| BF | 14.31 | 25.73 | 35.97 |
| d 5 | 0.80 | 17.81 | 28.91 |
| d15 | 16.54 | 8.10 | 2.46 |
| d24 | 11.55 | 5.41 | 3.56 |
| d31 | 2.38 | 1.11 | 0.91 |
| d33 | 12.58 | 13.85 | 14.04 |
| d37 | 14.31 | 25.73 | 35.97 |

| Zoom Lens Unit Data | | |
|---|---|---|
| Unit | Starting Surface | Focal Length |
| 1 | 1 | 110.39 |
| 2 | 6 | −18.97 |
| 3 | 16 | 57.70 |
| 4 | 25 | 28.23 |
| 5 | 32 | −50.65 |
| 6 | 34 | 783.07 |

NUMERICAL EXAMPLE 2

| UNIT mm | | | | |
|---|---|---|---|---|
| Surface Data | | | | |
| Surface Number | r | d | nd | vd |
| 1 | 161.515 | 2.10 | 1.80809 | 22.8 |
| 2 | 79.872 | 6.59 | 1.77250 | 49.6 |
| 3 | 333.053 | 0.15 | | |
| 4 | 54.361 | 6.22 | 1.72916 | 54.7 |
| 5 | 156.778 | (Variable) | | |
| 6 | 130.015 | 1.35 | 1.88300 | 40.8 |
| 7 | 18.616 | 9.25 | | |
| 8 | −89.388 | 1.30 | 1.53775 | 74.7 |
| 9 | 23.767 | 4.12 | 1.85478 | 24.8 |
| 10 | 60.588 | 4.64 | | |
| 11 | −65.476 | 2.66 | 1.88300 | 40.8 |
| 12 | −32.068 | 0.69 | | |
| 13 | −26.771 | 1.35 | 1.76802 | 49.2 |
| 14* | −50.891 | (Variable) | | |
| 15(Diaphragm) | ∞ | 0.40 | | |
| 16 | 91.577 | 2.48 | 1.88300 | 40.8 |
| 17 | −304.082 | 0.15 | | |
| 18 | 37.554 | 8.52 | 1.49700 | 81.5 |
| 19 | −28.731 | 1.40 | 1.95375 | 32.3 |
| 20 | −63.707 | 1.02 | | |
| 21* | −96.704 | 1.90 | 1.76802 | 49.2 |
| 22 | 65.000 | 1.78 | 1.90366 | 31.3 |
| 23 | 132.291 | (Variable) | | |
| 24 | 27.626 | 6.95 | 1.49700 | 81.5 |
| 25 | −102.616 | 0.35 | | |
| 26 | 83.438 | 3.31 | 1.59522 | 67.7 |
| 27 | −92.579 | 0.15 | | |
| 28 | 74.322 | 5.83 | 1.53775 | 74.7 |
| 29 | −29.356 | 1.45 | 1.85400 | 40.4 |
| 30* | 10000.000 | (Variable) | | |
| 31 | 69.619 | 0.88 | 1.95375 | 32.3 |
| 32 | 26.524 | (Variable) | | |
| 33* | −44.805 | 1.70 | 1.58313 | 59.4 |
| 34* | −3044.392 | 0.15 | | |
| 35 | −500.000 | 3.83 | 2.00069 | 25.5 |
| 36 | −56.199 | (Variable) | | |
| Image Plane | ∞ | | | |

-continued

UNIT mm
Surface Data

Aspheric Data

Fourteenth surface

K = 0.00000e+000 A 4 = −3.55372e−006 A 6 = −4.44156e−009 A 8 = 2.42864e−011
A10 = −2.55074e−013 A12 = 5.39868e−016
Twenty-first surface K = 0.00000e+000 A 4 = 1.70448e−006 A 6 = 2.73805e−010 A 8 = 3.65782e−011
A10 = −2.55152e−013 A12 = 4.67611e−016
Thirties surface K = 0.00000e+000 A 4 = 2.15407e−005 A 6 = 3.68704e−010 A 8 = 1.79757e−010
A10 = −8.43371e−013 A12 = 2.53994e−015
Thirty-third surface K = 0.00000e+000 A 4 = −3.02830e−005 A 6 = 4.59403e−008 A 8 = −1.39878e−010
A10 = −1.16192e−012 A12 = 2.72442e−015
Thirty-fourth surface K = 0.00000e+000 A 4 = −3.07871e−005 A 6 = 8.23526e−008 A 8 = −3.67006e−010
A10 = 5.94084e−013 A12 = −2.60605e−016

VARIOUS DATA
Zoom ratio 2.75

|  | Wide Angle | Middle | Telephoto |
|---|---|---|---|
| Focal length | 24.72 | 44.00 | 67.90 |
| F-number | 2.91 | 2.91 | 2.91 |
| Half angle of view | 41.19 | 26.18 | 17.67 |
| Image height | 21.64 | 21.64 | 21.64 |
| Overall lens length | 145.95 | 153.27 | 160.58 |
| BF | 12.45 | 26.49 | 31.69 |
| d 5 | 0.80 | 14.02 | 22.83 |
| d14 | 22.28 | 9.96 | 2.40 |
| d23 | 11.13 | 5.98 | 3.38 |
| d30 | 3.14 | 1.60 | 1.50 |
| d32 | 13.48 | 12.55 | 16.12 |
| d36 | 12.45 | 26.49 | 31.69 |

Zoom Lens Unit Data

| Unit | Starting Surface | Focal Length |
|---|---|---|
| 1 | 1 | 90.00 |
| 2 | 6 | −20.93 |
| 3 | 15 | 68.32 |
| 4 | 24 | 30.32 |
| 5 | 31 | −45.38 |
| 6 | 33 | 267.26 |

NUMERICAL EXAMPLE 3

UNIT mm
Surface Data

| Surface Number | r | d | nd | vd |
|---|---|---|---|---|
| 1 | 200.000 | 2.10 | 1.80809 | 22.8 |
| 2 | 79.285 | 7.12 | 1.77250 | 49.6 |
| 3 | 418.295 | 0.15 |  |  |
| 4 | 51.172 | 6.46 | 1.72916 | 54.7 |
| 5 | 115.687 | (Variable) |  |  |
| 6 | 104.876 | 1.35 | 1.88300 | 40.8 |
| 7 | 18.183 | 10.29 |  |  |
| 8 | −78.319 | 1.30 | 1.53775 | 74.7 |
| 9 | 25.899 | 4.28 | 1.85478 | 24.8 |
| 10 | 78.908 | 3.85 |  |  |
| 11 | 245.224 | 4.38 | 1.88300 | 40.8 |
| 12 | −43.197 | 1.35 | 1.76802 | 49.2 |
| 13* | 182.315 | (Variable) |  |  |

-continued

| UNIT mm Surface Data | | | | |
|---|---|---|---|---|
| 14(Diaphragm) | ∞ | 0.40 | | |
| 15 | 52.693 | 2.82 | 1.88300 | 40.8 |
| 16 | 333.826 | 0.15 | | |
| 17 | 40.931 | 9.18 | 1.49700 | 81.5 |
| 18 | −29.811 | 1.40 | 1.95375 | 32.3 |
| 19 | −115.074 | 1.02 | | |
| 20* | −202.910 | 1.90 | 1.76802 | 49.2 |
| 21 | 65.000 | 1.56 | 1.90366 | 31.3 |
| 22 | 107.749 | (Variable) | | |
| 23 | 27.055 | 7.30 | 1.49700 | 81.5 |
| 24 | −86.200 | 0.15 | | |
| 25 | 78.034 | 3.24 | 1.59522 | 67.7 |
| 26 | −103.467 | 0.15 | | |
| 27 | 84.902 | 4.37 | 1.53775 | 74.7 |
| 28 | −38.525 | 1.45 | 1.85400 | 40.4 |
| 29* | −1848.701 | (Variable) | | |
| 30 | 37.828 | 0.88 | 1.95375 | 32.3 |
| 31 | 21.967 | (Variable) | | |
| 32 | 218.008 | 4.67 | 1.66680 | 33.0 |
| 33 | −40.214 | 1.70 | 1.55332 | 71.7 |
| 34* | 55.356 | (Variable) | | |
| Image Plane | ∞ | | | |

Aspheric Data

Thirtieth surface

K = 0.00000e+000 A 4 = −2.73965e−006 A 6 = −1.69162e−009 A 8 = −2.49633e−011
A10 = 3.44870e−014 A12 = −9.82913e−017

Twentieth surface

K = 0.00000e+000 A 4 = 1.56342e−006 A 6 = 4.17422e−009 A 8 = 1.65347e−011
A10 = −3.31421e−013 A12 = 8.61220e−016

Twenty-ninth surface

K = 0.00000e+000 A 4 = 2.39106e−005 A 6 = 2.07325e−008 A 8 = 5.03201e−011
A10 = 9.52529e−014 A12 = 4.59360e−016

Thirty-fourth surface

K = 0.00000e+000 A 4 = −6.17719e−006 A 6 = −4.13751e−009 A 8 = −5.99556e−011
A10 = 2.95904e−013 A 12 = −5.94251e-016

| VARIOUS DATA Zoom ratio 2.75 | | | |
|---|---|---|---|
| | Wide Angle | Middle | Telephoto |
| Focal length | 24.72 | 42.99 | 67.89 |
| F-number | 2.91 | 2.91 | 2.91 |
| Half angle of view | 41.19 | 26.72 | 17.67 |
| Image height | 21.64 | 21.64 | 21.64 |
| Overall lens length | 145.95 | 154.51 | 163.06 |
| BF | 17.52 | 24.59 | 30.66 |
| d 5 | 0.80 | 15.29 | 26.19 |
| d13 | 23.36 | 12.52 | 4.66 |
| d22 | 7.61 | 3.55 | 1.51 |
| d29 | 2.82 | 1.60 | 1.50 |
| d31 | 8.87 | 11.97 | 13.57 |
| d34 | 17.52 | 24.59 | 30.66 |

| Zoom Lens Unit Data | | |
|---|---|---|
| Unit | Starting Surface | Focal Length |
| 1 | 1 | 100.55 |
| 2 | 6 | −22.21 |
| 3 | 14 | 79.75 |
| 4 | 23 | 28.50 |
| 5 | 30 | −56.46 |
| 6 | 32 | −250.65 |

NUMERICAL EXAMPLE 4

| UNIT mm | | | | |
|---|---|---|---|---|
| Surface Data | | | | |
| Surface Number | r | d | nd | vd |
| 1 | 180.824 | 2.10 | 1.80809 | 22.8 |
| 2 | 85.891 | 5.95 | 1.77250 | 49.6 |
| 3 | 376.338 | 0.15 | | |
| 4 | 57.750 | 5.66 | 1.72916 | 54.7 |
| 5 | 121.459 | (Variable) | | |
| 6 | 107.116 | 1.35 | 1.88300 | 40.8 |
| 7 | 18.976 | 9.66 | | |
| 8 | −74.468 | 1.30 | 1.53775 | 74.7 |
| 9 | 22.631 | 4.30 | 1.85478 | 24.8 |
| 10 | 52.540 | 2.08 | | |
| 11 | 61.952 | 2.28 | 1.88300 | 40.8 |
| 12 | 205.264 | (Variable) | | |
| 13(Diaphragm) | ∞ | 0.40 | | |
| 14 | 63.944 | 2.58 | 1.88300 | 40.8 |
| 15 | 242.963 | 0.15 | | |
| 16 | 32.864 | 5.51 | 1.49700 | 81.5 |
| 17 | −26.177 | 1.40 | 1.95375 | 32.3 |
| 18 | −152.899 | 1.26 | | |
| 19* | −254.605 | 1.20 | 1.76802 | 49.2 |
| 20 | 65.000 | 0.00 | | |
| 21 | 65.000 | 1.63 | 1.76182 | 26.5 |
| 22 | 336.267 | (Variable) | | |
| 23 | 35.515 | 5.72 | 1.49700 | 81.5 |
| 24 | −32.768 | 0.15 | | |
| 25 | 92.018 | 3.02 | 1.49700 | 81.5 |
| 26 | −47.866 | 1.20 | 1.85400 | 40.4 |
| 27* | −69.489 | (Variable) | | |
| 28 | 39.516 | 0.88 | 1.95375 | 32.3 |
| 29 | 19.940 | (Variable) | | |
| 30 | 32.993 | 4.92 | 1.69895 | 30.1 |
| 31 | 112.565 | 1.70 | 1.55332 | 71.7 |
| 32* | 21.166 | (Variable) | | |
| Image Plane | ∞ | | | |

Aspheric Data

Nineteenth surface $K = 0.00000e+000$ $A4 = 8.46983e-007$ $A6 = -2.67211e-009$ $A8 = 2.35466e-010$
$A10 = -2.95314e-012$ $A12 = 1.05704e-014$ Twenty-seventh surface $K = 0.00000e+000$ $A4 = 2.15030e-005$ $A6 = -1.26345e-008$ $A8 = 1.98666e-010$
$A10 = -1.31987e-012$ $A12 = 3.82284e-015$ Thirty-second surface $K = 0.00000e+000$ $A4 = -2.40648e-005$ $A6 = -1.36335e-009$ $A8 = -6.57029e-011$
$A10 = 1.11094e-013$ $A12 = -4.19164e-016$

VARIOUS DATA
Zoom ratio 4.13

| | Wide Angle | Middle | Telephoto |
|---|---|---|---|
| Focal length | 24.72 | 53.96 | 102.00 |
| F-number | 4.12 | 4.12 | 4.12 |
| Half angle of view | 41.19 | 21.85 | 11.98 |
| Image height | 21.64 | 21.64 | 21.64 |
| Overall lens length | 133.43 | 152.26 | 171.08 |
| BF | 18.51 | 32.77 | 43.74 |
| d 5 | 0.80 | 23.06 | 41.96 |
| d12 | 26.96 | 12.42 | 2.40 |
| d22 | 7.90 | 4.36 | 3.25 |
| d27 | 6.20 | 3.16 | 1.50 |
| d29 | 6.51 | 9.93 | 11.69 |
| d32 | 18.51 | 32.77 | 43.74 |

Zoom Lens Unit Data

| Unit | Starting Surface | Focal Length |
|---|---|---|
| 1 | 1 | 113.35 |
| 2 | 6 | −27.36 |

-continued

| | UNIT mm Surface Data | | |
|---|---|---|---|
| 3 | 13 | 95.41 | |
| 4 | 23 | 26.70 | |
| 5 | 28 | −43.15 | |
| 6 | 30 | −250.35 | |

NUMERICAL EXAMPLE 5

| | UNIT mm Surface Data | | | |
|---|---|---|---|---|
| Surface Number | r | d | nd | vd |
| 1 | 200.000 | 2.10 | 1.80809 | 22.8 |
| 2 | 92.909 | 5.94 | 1.77250 | 49.6 |
| 3 | 369.700 | 0.15 | | |
| 4 | 58.021 | 7.51 | 1.72916 | 54.7 |
| 5 | 167.674 | (Variable) | | |
| 6 | 206.797 | 1.35 | 1.88300 | 40.8 |
| 7 | 18.816 | 9.65 | | |
| 8 | −106.150 | 1.30 | 1.53775 | 74.7 |
| 9 | 25.609 | 6.02 | 1.85478 | 24.8 |
| 10 | 70.006 | 2.45 | | |
| 11 | −221.640 | 2.95 | 1.85400 | 40.4 |
| 12* | −99.731 | (Variable) | | |
| 13(Diaphragm) | ∞ | 0.40 | | |
| 14 | 49.441 | 3.72 | 1.88300 | 40.8 |
| 15 | 163.827 | 0.15 | | |
| 16 | 37.488 | 8.23 | 1.49700 | 81.5 |
| 17 | −30.900 | 1.40 | 1.95375 | 32.3 |
| 18 | −95.459 | 1.02 | | |
| 19* | −155.610 | 1.90 | 1.76802 | 49.2 |
| 20 | 65.000 | 1.71 | 1.90366 | 31.3 |
| 21 | 123.887 | (Variable) | | |
| 22 | 28.654 | 6.65 | 1.49700 | 81.5 |
| 23 | −77.933 | 0.15 | | |
| 24 | 72.759 | 3.04 | 1.59522 | 67.7 |
| 25 | −105.134 | 0.15 | | |
| 26 | 58.408 | 5.30 | 1.53775 | 74.7 |
| 27 | −29.821 | 1.45 | 1.85400 | 40.4 |
| 28* | 168.702 | (Variable) | | |
| 29 | 100.707 | 1.90 | 1.88300 | 40.8 |
| 30 | −200.000 | 0.90 | 1.72493 | 43.3 |
| 31 | 22.011 | (Variable) | | |
| 32 | −30.000 | 2.00 | 1.58313 | 59.4 |
| 33* | −53.407 | (Variable) | | |
| 34 | −1263.205 | 3.58 | 2.05090 | 26.9 |
| 35 | −69.134 | (Variable) | | |
| Image Plane | ∞ | | | |

| Aspheric Data |
|---|

Twelfth surface

K = 0.00000e+000 A 4 = −3.32723e−006 A 6 = −8.11631e−009 A 8 = 3.31457e−011
A10 = −2.01651e−013 A12 = 3.05887e−016
Nineteenth surface K = 0.00000e+000 A 4 = 1.51660e−006 A 6 = −6.19820e−009 A 8 = 1.09651e−010
A10 = −7.26807e−013 A12 = 1.58997e−015
Twenty-eighth surface K = 0.00000e+000 A 4 = 2.27530e−005 A 6 = −2.75454e−010 A 8 = 5.08670e−010
A10 = −3.58809e−012 A12 = 1.05766e−014
Thirty-third surface K = 0.00000e+000 A 4 = −3.65611e−006 A 6 = −7.97771e−009 A 8 = −1.77502e−011
A10 = 8.82983e−014 A12 = −3.07075e−016

-continued

| UNIT mm |
| --- |
| Surface Data |

| VARIOUS DATA |
| --- |
| Zoom ratio 2.75 |

|  | Wide Angle | Middle | Telephoto |
| --- | --- | --- | --- |
| Focal length | 24.72 | 44.00 | 67.90 |
| F-number | 2.91 | 2.91 | 2.91 |
| Half angle of view | 41.19 | 26.18 | 17.67 |
| Image height | 21.64 | 21.64 | 21.64 |
| Overall lens length | 147.28 | 154.72 | 162.16 |
| BF | 10.83 | 15.81 | 20.79 |
| d 5 | 0.80 | 16.33 | 26.39 |
| d12 | 27.84 | 14.26 | 5.01 |
| d21 | 7.70 | 3.34 | 1.65 |
| d28 | 2.45 | 1.60 | 1.81 |
| d31 | 13.79 | 17.76 | 18.44 |
| d33 | 0.80 | 2.55 | 5.00 |
| d35 | 10.83 | 15.81 | 20.79 |

| Zoom Lens Unit Data | | |
| --- | --- | --- |
| Unit | Starting Surface | Focal Length |
| 1 | 1 | 100.55 |
| 2 | 6 | −23.82 |
| 3 | 13 | 73.64 |
| 4 | 22 | 30.68 |
| 5 | 29 | −43.61 |
| 6 | 32 | −121.20 |
| 7 | 34 | 69.49 |

NUMERICAL EXAMPLE 6

| UNIT mm |
| --- |
| Surface Data |

| Surface Number | r | d | nd | vd |
| --- | --- | --- | --- | --- |
| 1 | 163.747 | 2.10 | 1.80809 | 22.8 |
| 2 | 76.393 | 6.66 | 1.77250 | 49.6 |
| 3 | 314.611 | 0.15 | | |
| 4 | 54.215 | 6.25 | 1.72916 | 54.7 |
| 5 | 163.896 | (Variable) | | |
| 6 | 110.644 | 1.35 | 1.88300 | 40.8 |
| 7 | 18.492 | 9.51 | | |
| 8 | −66.950 | 1.30 | 1.53775 | 74.7 |
| 9 | 24.452 | 3.92 | 1.85478 | 24.8 |
| 10 | 69.659 | 3.89 | | |
| 11 | −87.715 | 2.80 | 1.88300 | 40.8 |
| 12 | −33.772 | 0.67 | | |
| 13 | −27.851 | 1.35 | 1.76802 | 49.2 |
| 14* | −66.782 | (Variable) | | |
| 15(Diaphragm) | ∞ | 0.40 | | |
| 16 | 77.594 | 2.67 | 1.88300 | 40.8 |
| 17 | −350.928 | 0.15 | | |
| 18 | 40.469 | 7.90 | 1.49700 | 81.5 |
| 19 | −30.926 | 1.40 | 1.95375 | 32.3 |
| 20 | −75.206 | 1.02 | | |
| 21* | −136.054 | 1.90 | 1.76802 | 49.2 |
| 22 | 46.997 | 1.47 | 1.90366 | 31.3 |
| 23 | 62.061 | 1.50 | | |
| 24 | 56.911 | 2.32 | 1.53775 | 74.7 |
| 25 | 190.495 | (Variable) | | |
| 26 | 28.522 | 7.27 | 1.49700 | 81.5 |
| 27 | −98.413 | 0.35 | | |
| 28 | 52.030 | 4.03 | 1.59522 | 67.7 |
| 29 | −140.294 | 0.15 | | |
| 30 | 140.912 | 4.93 | 1.53775 | 74.7 |
| 31 | −34.429 | 1.45 | 1.85400 | 40.4 |
| 32* | 10000.000 | (Variable) | | |
| 33 | 55.873 | 0.88 | 1.95375 | 32.3 |
| 34 | 24.522 | (Variable) | | |

-continued

| | UNIT mm Surface Data | | | |
|---|---|---|---|---|
| 35* | −46.075 | 1.70 | 1.58313 | 59.4 |
| 36* | −3044.392 | 0.15 | | |
| 37 | −500.000 | 3.50 | 2.00069 | 25.5 |
| 38 | −61.899 | (Variable) | | |
| Image Plane | ∞ | | | |

Aspheric Data

Fourteenth surface

K = 0.00000e+000 A 4 = −3.09311e−006 A 6 = −6.65217e−009 A 8 = 7.68245e−011
A10 = −6.17793e−013 A12 = 1.41111e−015
Twenty-first surface K = 0.00000e+000 A 4 = 1.04987e−006 A 6 = 2.57585e−009 A 8 = 1.19022e−011
A10 = −1.58862e−013 A12 = 3.31359e−016
Thirty-second surface K = 0.00000e+000 A 4 = 2.12494e−005 A 6 = −4.06724e−009 A 8 = 1.71519e−010
A10 = −8.20748e−013 A12 = 2.23488e−015
Thirty-fifth surface K = 0.00000e+000 A 4 = −1.88097e−005 A 6 = −7.50395e−008 A 8 = 2.69885e−010
A10 = −3.87404e−013 A12 = −3.53425e−015
Thirty-sixth surface K = 0.00000e+000 A 4 = −2.16693e−005 A 6 = −4.38370e−008 A 8 = 2.90076e−010
A10 = −1.04223e−012 A12 = 8.31587e−016

VARIOUS DATA
Zoom ratio 2.75

| | Wide Angle | Middle | Telephoto |
|---|---|---|---|
| Focal length | 24.72 | 44.00 | 67.89 |
| F-number | 2.91 | 2.91 | 2.91 |
| Half angle of view | 41.19 | 26.18 | 17.67 |
| Image height | 21.64 | 21.64 | 21.64 |
| Overall lens length | 145.95 | 153.98 | 162.01 |
| BF | 11.81 | 25.49 | 32.56 |
| d 5 | 0.80 | 13.68 | 22.79 |
| d14 | 21.38 | 9.79 | 2.40 |
| d25 | 10.26 | 5.13 | 2.92 |
| d32 | 3.26 | 1.60 | 1.52 |
| d34 | 13.34 | 13.18 | 14.72 |
| d38 | 11.81 | 25.49 | 32.56 |

Zoom Lens Unit Data

| Unit | Starting Surface | Focal Length |
|---|---|---|
| 1 | 1 | 90.00 |
| 2 | 6 | −20.43 |
| 3 | 15 | 64.24 |
| 4 | 26 | 30.65 |
| 5 | 33 | −46.46 |
| 6 | 35 | 428.91 |

NUMERICAL EXAMPLE 7

| | UNIT mm Surface Data | | | |
|---|---|---|---|---|
| Surface Number | r | d | nd | vd |
| 1 | 67.006 | 2.10 | 1.95906 | 17.5 |
| 2 | 60.331 | 9.01 | 1.59522 | 67.7 |
| 3 | 198.540 | (Variable) | | |
| 4 | 59.070 | 1.35 | 1.88300 | 40.8 |
| 5 | 18.104 | 9.02 | | |
| 6 | −216.041 | 1.30 | 1.53775 | 74.7 |
| 7 | 25.192 | 4.55 | 1.85478 | 24.8 |

-continued

| | UNIT mm Surface Data | | | |
|---|---|---|---|---|
| 8 | 60.145 | 2.45 | | |
| 9 | −86.799 | 3.31 | 1.77057 | 44.1 |
| 10 | −33.649 | 0.97 | | |
| 11 | −26.699 | 1.35 | 1.76802 | 49.2 |
| 12* | −62.122 | (Variable) | | |
| 13(Diaphragm) | ∞ | 0.40 | | |
| 14 | 57.862 | 3.64 | 1.88300 | 40.8 |
| 15 | −153.541 | 0.15 | | |
| 16 | 42.763 | 7.57 | 1.49700 | 81.5 |
| 17 | −36.569 | 1.40 | 1.95375 | 32.3 |
| 18 | −1769.678 | 2.16 | | |
| 19* | −123.208 | 1.90 | 1.76802 | 49.2 |
| 20 | 45.450 | 0.00 | | |
| 21 | 45.450 | 2.69 | 1.83481 | 42.7 |
| 22 | 139.787 | (Variable) | | |
| 23 | 29.547 | 6.92 | 1.49700 | 81.5 |
| 24 | −85.458 | 0.35 | | |
| 25 | 59.720 | 4.44 | 1.59522 | 67.7 |
| 26 | −59.673 | 0.15 | | |
| 27 | −173.304 | 7.74 | 1.53775 | 74.7 |
| 28 | −18.458 | 1.45 | 1.85400 | 40.4 |
| 29* | 405.638 | 0.15 | | |
| 30 | 21.790 | 3.35 | 1.71219 | 60.6 |
| 31 | 23.273 | 11.55 | | |
| 32* | −18.346 | 1.70 | 1.65793 | 49.8 |
| 33* | −73.971 | 0.15 | | |
| 34 | −500.000 | 5.02 | 2.05090 | 26.9 |
| 35 | −46.069 | (Variable) | | |
| Image Plane | ∞ | | | |

Aspheric Data

Twelfth surface

K = 0.00000e+000 A 4 = −4.89176e−006 A 6 = −1.89448e−008 A 8 = 1.42066e−010
A10 = −8.42108e−013 A12 = 1.77119e−015
Nineteenth surface K = 0.00000e+000 A 4 = 1.50785e−006 A 6 = −1.41761e−009 A 8 = 1.89887e−011
A10 = −1.18817e−013 A12 = 2.50179e−016
Twenty-ninth surface K = 0.00000e+000 A 4 = 5.25648e−006 A 6 = −5.61156e−008 A 8 = 1.99826e−010
A10 = −2.39535e−012 A12 = 4.13183e−015
Thirty-second surface K = 0.00000e+000 A 4 = −5.62391e−005 A 6 = 1.35545e−007 A 8 = −1.56451e−009
A10 = 2.30257e−012 A12 = −1.16786e−014
Thirty-third surface K = 0.00000e+000 A 4 = −3.23321e−005 A 6 = 2.46379e−007 A 8 = −1.19054e−009
A10 = 4.12685e−012 A12 = −5.89605e−015

VARIOUS DATA
Zoom ratio 2.75

| | Wide Angle | Middle | Telephoto |
|---|---|---|---|
| Focal length | 24.72 | 44.01 | 67.89 |
| F-number | 2.91 | 2.91 | 2.91 |
| Half angle of view | 41.19 | 26.18 | 17.68 |
| Image height | 21.64 | 21.64 | 21.64 |
| Overall lens length | 140.65 | 159.45 | 178.25 |
| BF | 11.03 | 22.11 | 33.33 |
| d 3 | 3.86 | 27.58 | 43.23 |
| d12 | 21.08 | 8.53 | 1.80 |
| d22 | 6.42 | 2.97 | 1.63 |
| d35 | 11.03 | 22.11 | 33.33 |

Zoom Lens Unit Data

| Unit | Starting Surface | Focal Length |
|---|---|---|
| 1 | 1 | 179.70 |
| 2 | 4 | −23.87 |

-continued

UNIT mm
Surface Data

| 3 | 13 | 67.81 |
|---|----|-------|
| 4 | 23 | 39.13 |

TABLE 1

| | | EXAMPLE | | | | | | |
|---|---|---|---|---|---|---|---|---|
| | | 1 | 2 | 3 | 4 | 5 | 6 | 7 |
| Expression | (1) | 0.221 | 0.211 | 0.217 | 0.294 | 0.251 | 0.212 | 0.215 |
| | (2) | 2.981 | 5.617 | 2.399 | 2.050 | 8.376 | 9.000 | 4.290 |
| | (3) | −0.768 | −0.847 | −0.898 | −1.107 | −0.964 | −0.826 | −0.966 |
| | (4) | 4.466 | 3.641 | 4.067 | 4.585 | 4.067 | 3.641 | 7.270 |
| | (5) | 0.417 | 0.447 | 0.420 | 0.262 | 0.452 | 0.451 | 0.576 |
| | (6) | 10.088 | 11.722 | 8.331 | 7.208 | 13.594 | 12.362 | 12.751 |
| | (7) | 0.631 | 0.617 | 0.676 | 0.819 | 0.690 | 0.640 | 0.785 |
| | (8) | 2.334 | 2.764 | 3.226 | 3.860 | 2.979 | 2.599 | 2.743 |
| | (9) | −1.216 | −1.147 | −1.239 | −1.945 | −1.333 | −0.893 | −1.365 |
| | (10) | −0.996 | −0.894 | −0.707 | −0.419 | −0.694 | −1.205 | −0.750 |
| f1 | | 110.394 | 90.000 | 100.547 | 113.346 | 100.547 | 90.000 | 179.703 |
| f2 | | −18.973 | −20.929 | −22.210 | −27.358 | −23.820 | −20.428 | −23.875 |
| f3 | | 57.697 | 68.325 | 79.753 | 95.412 | 73.636 | 64.244 | 67.806 |
| f4 | | 28.229 | 30.321 | 28.495 | 26.700 | 30.683 | 30.651 | 39.130 |
| fw | | 24.720 | 24.720 | 24.720 | 24.720 | 24.720 | 24.720 | 24.720 |
| ft | | 67.648 | 67.895 | 67.895 | 101.996 | 67.898 | 67.895 | 67.891 |
| β4t | | −0.311 | −0.206 | −0.273 | −0.216 | −0.180 | −0.190 | −0.743 |
| β4w | | −0.104 | −0.037 | −0.114 | −0.082 | −0.022 | −0.021 | −0.173 |
| TTDw | | 144.337 | 145.950 | 145.950 | 133.433 | 147.280 | 145.952 | 140.648 |
| skw | | 14.307 | 12.451 | 17.520 | 18.511 | 10.834 | 11.807 | 11.030 |
| m3 | | −13.676 | −12.476 | −11.169 | −21.059 | −12.533 | −13.054 | −17.514 |
| m4 | | −21.658 | −20.232 | −16.518 | −25.704 | −18.165 | −20.394 | −22.304 |
| fis | | −70.147 | −78.347 | −98.792 | −185.571 | −98.142 | −57.401 | −92.526 |
| βist | | −0.599 | −1.192 | −0.301 | 0.043 | −1.019 | −0.423 | −0.009 |
| βrt | | −0.621 | −0.408 | −0.544 | −0.438 | −0.344 | −0.847 | −0.743 |

Imaging Apparatus

Figure 29:
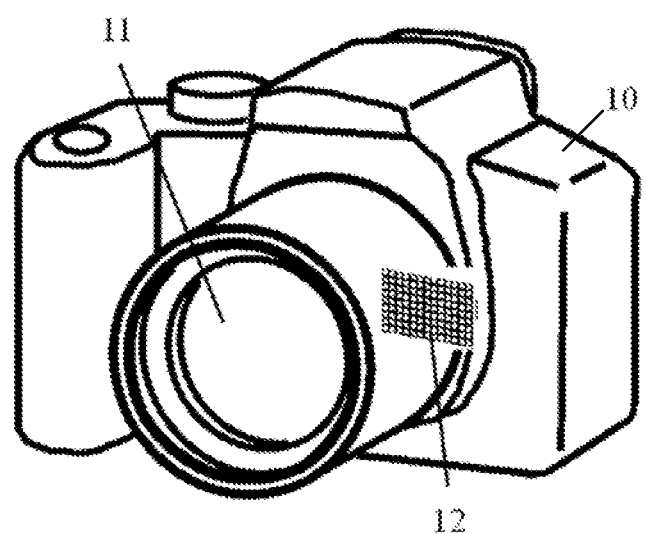
FIG. 29 is the schematic diagram of principal part in an imaging apparatus according to the present invention.

Referring now to FIG. 29, a description will be given of an embodiment of a digital still camera (imaging apparatus) using the zoom lens according to the present invention for the imaging optical system. FIG. 29 is the schematic diagram of the principal part of the imaging apparatus according to the present invention. In FIG. 29, reference numeral 10 denotes a camera body and reference numeral 11 denotes an imaging optical system including any of the zoom lenses according to Examples 1 to 7. Reference numeral 12 denotes a solid-state image sensor (photoelectric converter) such as a CCD sensor or a CMOS sensor that is built in the camera body and receives and photoelectrically converts the optical image formed by the imaging optical system 11. The camera body 10 may be a so-called single-lens reflex camera having a quick turn mirror or a so-called mirrorless camera having no quick turn mirror.

By applying the zoom lens according to this embodiment to the imaging apparatus such as the digital still camera, the imaging apparatus has a smaller overall length and lens system and a higher focusing performance.

Imaging System

An imaging system (monitoring camera system) may include the zoom lens according to each example and a controller configured to control the zoom lens. In this case, the controller controls the zoom lens in order that each lens unit moves as described above during zooming, focusing, and image stabilization. The controller does not need to be integrated with the zoom lens, and may be configured separately from the zoom lens. For example, the controller (control apparatus), that is remotely disposed from a driver configured to drive each lens of the zoom lens, includes a transmitter configured to send a control signal (command) for controlling the zoom lens. Such controller may perform a remote control over the zoom lens.

The controller may include an operation unit such as a controller or a button for a remote control of the zoom lens in accordance with the input by the user through the operation unit. For example, the controller may include an enlargement button and a reduction button as the operation unit and may be configured to send a signal to the driver of the zoom lens in order that the zoom lens magnification increases when the user presses the enlargement button, and the zoom lens magnification reduces when the user presses the reduction button.

The imaging system may include a display unit such as a liquid crystal panel that displays information (moving state) on zooming of the zoom lens. The information on the zooming of the zoom lens is, for example, the zoom magnification (zooming state) and the moving amount of each lens unit (moving state). In this case, the user would be able to remotely control the zoom lens via the operation unit while viewing the information on the zooming of the zoom lens displayed on the display unit. The display unit and the operation unit may be integrated by adopting, for example, a touch panel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the embodiment, the third lens unit L3 includes a sub-unit that moves in a direction orthogonal to the optical axis for image blur correcting but the sub-unit may move in a direction including a component orthogonally to an optical axis for image blur correcting.

The above examples can provide the zoom lens, the imaging apparatus, and the imaging system, each of which can easily obtain a higher optical performance over the entire zoom range during the image stabilization while reducing the overall lens length and the size of the lens barrel diameter, and an imaging apparatus and the imaging system having the same.

This application claims the benefit of Japanese Patent Application No. 2019-021641, filed on Feb. 8, 2019, which is hereby incorporated by reference herein in its entirety.

What is claimed is:

1. A zoom lens comprising, in order from an object side to an image side:
    a first lens unit having a positive refractive power;
    a second lens unit having a negative refractive power;
    a third lens unit having a positive refractive power; and
    a fourth lens unit having a positive refractive power,
    wherein an interval between adjacent lens units is changed and the first to fourth lens units move during zooming,
    wherein the fourth lens unit is disposed immediately next to the third lens unit,
    wherein all elements constituting the fourth lens unit move as a whole during zooming,
    wherein the third lens unit includes a sub-unit having a negative refractive power,
    wherein the sub-unit moves in a direction including a component orthogonal to an optical axis for image blur correcting, and
    wherein the following conditional expressions are satisfied:

$$0.2<f2^2/(f3\times f4)<1.0$$

$$2.0<\beta 4t/\beta w<10.0$$

where f2 is a focal length of the second lens unit, f3 is a focal length of the third lens unit, f4 is a focal length of the fourth lens unit, and $\beta 4w$ and $\beta 4t$ are lateral magnifications at a wide-angle end and a telephoto end of the fourth lens unit.

2. The zoom lens according to claim 1, wherein the following conditional expression is satisfied:

$$-1.5<f2/fw<-0.5$$

where fw is a focal length at the wide-angle end of the zoom lens.

3. The zoom lens according to claim 1, wherein the following conditional expression is satisfied:

$$2.0<f1/fw<10.0$$

where f1 is a focal length of the first lens unit, and fw is a focal length at the wide-angle end of the zoom lens.

4. The zoom lens according to claim 1, wherein the following conditional expression is satisfied:

$$01<f4/ft<0.7$$

where ft is a focal length at the telephoto end of the zoom lens.

5. The zoom lens according to claim 1, wherein the following conditional expression is satisfied:

$$3.0<TTDw/skw<20.0$$

where TTDw is a distance from an object side surface of a lens closest to the object side to an image plane at the wide-angle end, and skw is a backfocus at the wide-angle end.

6. The zoom lens according to claim 1, wherein the following conditional expression is satisfied:

$$0.3<m3/m4<1.0$$

where m3 is a moving amount of the third lens unit and m4 is a moving amount of the fourth lens unit during zooming from the wide-angle end to the telephoto end.

7. The zoom lens according to claim 1, wherein the following conditional expression is satisfied:

$$1.5<f3/fw<8.0$$

where fw is a focal length at the wide-angle end of the zoom lens.

8. The zoom lens according to claim 1, wherein the following conditional expression is satisfied:

$$-10.0<fis/f3<-0.5$$

where fis is a focal length of the sub-unit.

9. The zoom lens according to claim 1, wherein the following conditional expression is satisfied:

$$-3.0<(1-\beta ist)\beta rt<-0.35$$

where $\beta ist$ a lateral magnification at the telephoto end of the sub-unit, and $\beta rt$ is a combined lateral magnification at the telephoto end of all the lens units located on an image side of the sub-unit.

10. The zoom lens according to claim 1, wherein the sub-unit includes two lenses including a negative lens and a positive lens.

11. The zoom lens according to claim 10, wherein the sub-unit includes a cemented lens of a negative lens and a positive lens in order from the object side to the image side.

12. The zoom lens according to claim 1, further comprising, in order from the object side to the image side, a fifth lens unit having a negative refractive power and a sixth lens unit having a positive refractive power.

13. The zoom lens according to claim 1, further comprising, in order from the object side to the image side, a fifth lens unit having a negative refractive power and a sixth lens unit having a negative refractive power.

14. The zoom lens according to claim 1, further comprising, in order from the object side to the image side, a fifth lens unit having a negative refractive power, a sixth lens unit having a negative refractive power, and a seventh lens unit having a positive refractive power.

15. The zoom lens according to claim 1, wherein the zoom lens performs focusing in a lens unit on an image side of the fourth lens unit.

16. An imaging apparatus comprising:
    the zoom lens according to claim 1; and
    an image sensor configured to receive light of an image formed by the zoom lens.

17. An imaging system comprising:
    the zoom lens according to claim 1; and
    a controller configured to control the zoom lens during zooming.

18. The imaging system according to claim 17, wherein the controller is configured separately from the zoom lens, and includes a transmitter configured to transmit a control signal for controlling the zoom lens.

19. The imaging system according to claim 17, wherein the controller is configured separately from the zoom lens, and includes an operation unit configured to operate the zoom lens.

20. The imaging system according to claim 17, further comprising a display unit configured to display information on zooming of the zoom lens.

* * * * *